US009675907B2

(12) United States Patent
Deskins

(10) Patent No.: US 9,675,907 B2
(45) Date of Patent: Jun. 13, 2017

(54) QUICK-DRY FILTER DEWATERING MOBILE PROCESS AND APPARATUS

(71) Applicant: F.D. Deskins, Inc., Fishers, IN (US)

(72) Inventor: Franklin David Deskins, Fishers, IN (US)

(*) Notice: Subject to any disclaimer, the term of this patent is extended or adjusted under 35 U.S.C. 154(b) by 120 days.

(21) Appl. No.: 14/354,509

(22) PCT Filed: Oct. 24, 2012

(86) PCT No.: PCT/US2012/061683
§ 371 (c)(1),
(2) Date: Apr. 25, 2014

(87) PCT Pub. No.: WO2013/063107
PCT Pub. Date: May 2, 2013

(65) Prior Publication Data
US 2014/0305856 A1    Oct. 16, 2014

Related U.S. Application Data

(60) Provisional application No. 61/628,245, filed on Oct. 27, 2011.

(51) Int. Cl.
*B01D 24/00* (2006.01)
*B01D 37/03* (2006.01)
(Continued)

(52) U.S. Cl.
CPC .......... *B01D 24/007* (2013.01); *B01D 24/22* (2013.01); *B01D 24/40* (2013.01); *B01D 37/03* (2013.01);
(Continued)

(58) Field of Classification Search
CPC .......... C02F 24/20; C02F 24/22; C02F 24/24; C02F 2201/007; C02F 11/121;
(Continued)

(56) References Cited

U.S. PATENT DOCUMENTS 2,616,565 A    11/1952    Morgan et al.
3,357,561 A    12/1967    Schmid et al.
(Continued)

OTHER PUBLICATIONS

International Search Report and Written Opinion issued by the ISA/US, Commissioner for Patents, dated Dec. 28, 2012, for related Application No. PCT/2012/061683; 14 pages.

*Primary Examiner* — Matthew O Savage
(74) *Attorney, Agent, or Firm* — Faegre Baker Daniels LLP

(57) ABSTRACT

Utilizing mobile walls, a transportable (or stationary) low cost, low carbon footprint process and apparatus with a granular filter media dry cell (for filter or bed) for dewatering particulate solids from liquid. The mobile wall structures can be made of a rigid structure constructed of new or preferred salvaged materials, assembled, with watertight joints, used, disassembled and stored for redeployment. The walls are set in a keyway utilizing whatever soil composition is available. The walls can be used in the previous Deskins filters as old wall replacement or new wall construction. The invention utilizes a generator that is not dependent upon site or local electricity thus can be operated in any location. All parts can be engineered, fabricated according to the design of the Quick-Dry Filter Dewatering Mobile Process and Apparatus, packed in shipping containers and be readily available for any immediate need.

70 Claims, 44 Drawing Sheets

(51) Int. Cl.
*B01D 24/40* (2006.01)
*B01D 24/22* (2006.01)
*C02F 11/12* (2006.01)
*C05F 7/00* (2006.01)
*B01D 24/24* (2006.01)
*C02F 103/00* (2006.01)
*C02F 103/10* (2006.01)
*C02F 103/20* (2006.01)
*C02F 103/28* (2006.01)
*C02F 103/32* (2006.01)

(52) U.S. Cl.
CPC .............. *C02F 11/121* (2013.01); *C05F 7/00* (2013.01); *B01D 24/24* (2013.01); *C02F 2103/001* (2013.01); *C02F 2103/008* (2013.01); *C02F 2103/10* (2013.01); *C02F 2103/20* (2013.01); *C02F 2103/28* (2013.01); *C02F 2103/325* (2013.01); *C02F 2203/008* (2013.01); *C02F 2209/42* (2013.01); *Y10T 29/49826* (2015.01)

(58) Field of Classification Search
CPC ..... C02F 2209/42; B01D 24/22; B01D 24/24; B01D 24/007; B01D 24/40; B01D 37/03
See application file for complete search history.

(56) References Cited

U.S. PATENT DOCUMENTS

| | | | |
|---|---|---|---|
| 3,459,305 A | 8/1969 | Berardi | |
| 3,976,573 A | 8/1976 | Miller | |
| 4,382,863 A * | 5/1983 | Riise | B01D 23/00 210/271 |
| 4,746,431 A * | 5/1988 | Gibaud | B01D 24/26 210/274 |
| 4,860,916 A * | 8/1989 | Winters | B65D 90/046 220/4.33 |
| 4,951,805 A | 8/1990 | Gordon et al. | |
| 5,578,205 A | 11/1996 | Martin | |
| 5,752,787 A * | 5/1998 | Trangsrud | B28B 7/168 405/154.1 |
| 6,647,562 B1 | 11/2003 | Arout et al. | |
| 7,494,592 B2 * | 2/2009 | Deskins | B01D 21/0012 210/694 |
| 2002/0174619 A1 | 11/2002 | Hanna | |
| 2008/0078016 A1 | 4/2008 | Cox | |
| 2008/0170913 A1 | 7/2008 | Moreau | |
| 2008/0302715 A1* | 12/2008 | Venville | B01D 24/007 210/283 |
| 2009/0127180 A1 | 5/2009 | Deskins | |
| 2010/0018929 A1 | 1/2010 | Wright | |

* cited by examiner

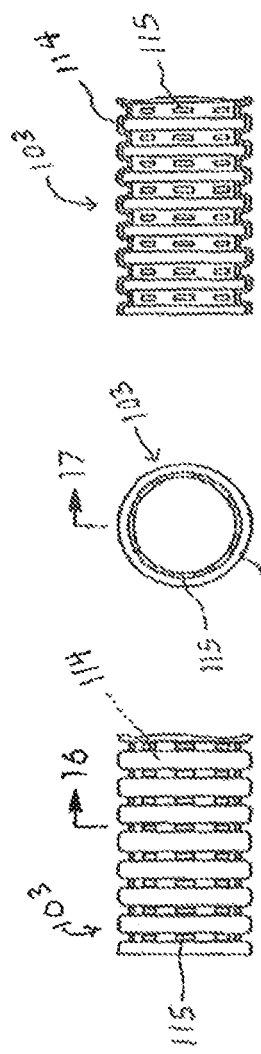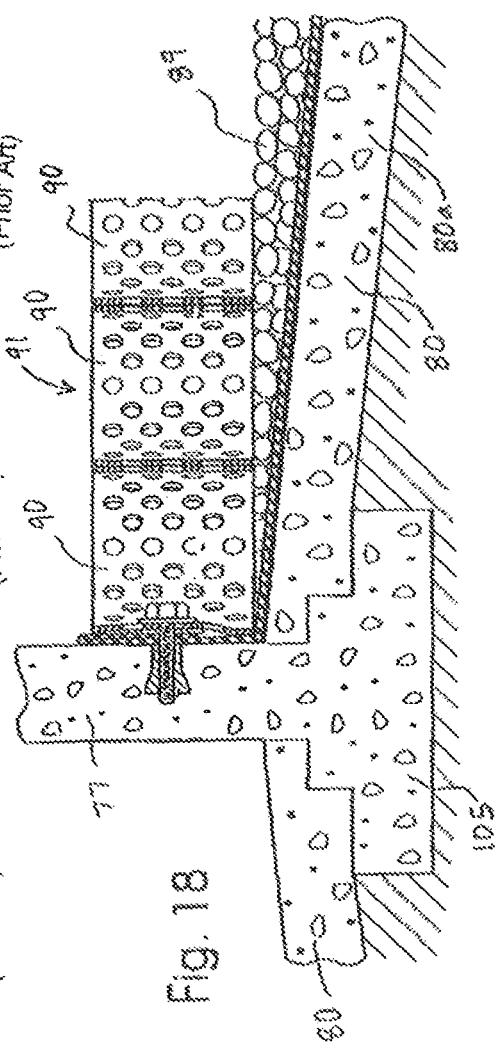

(PRIOR ART - PART A)

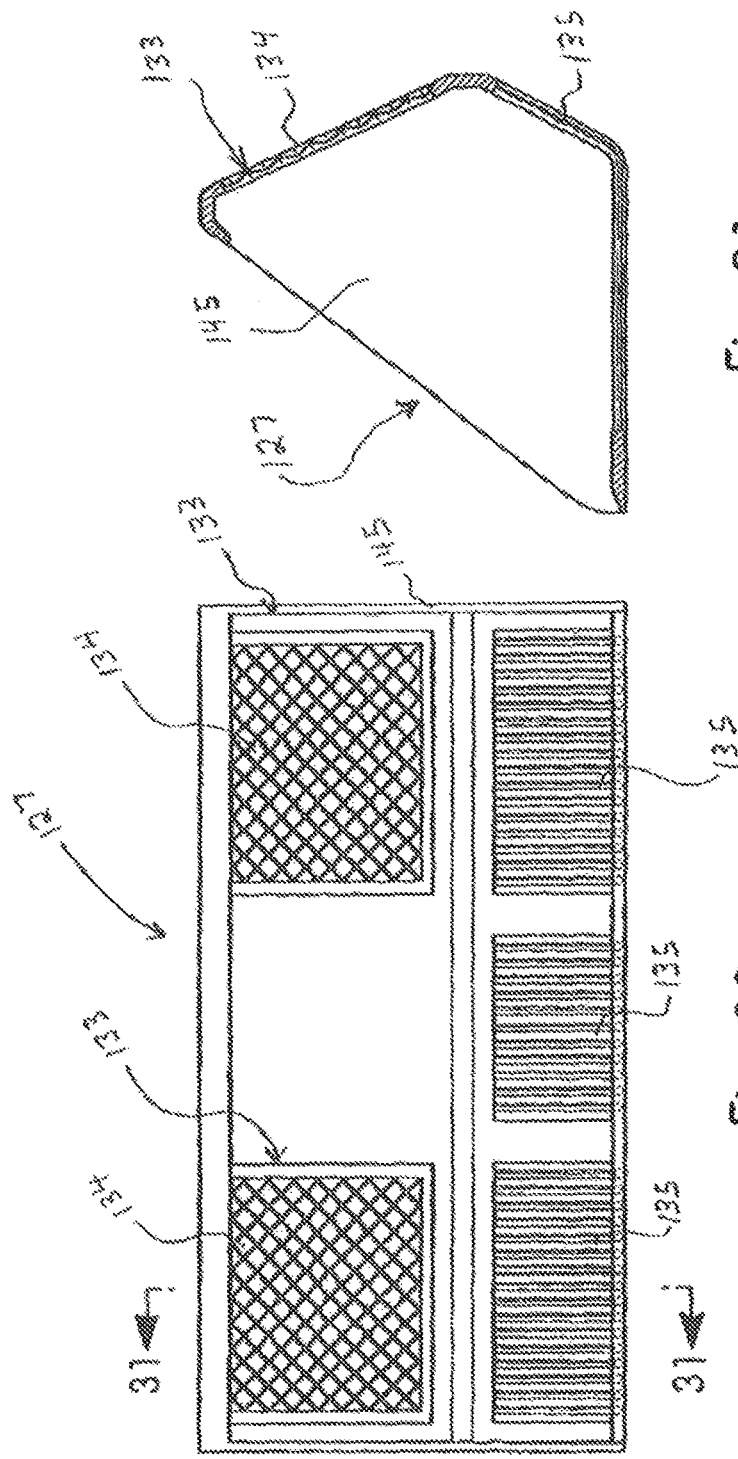

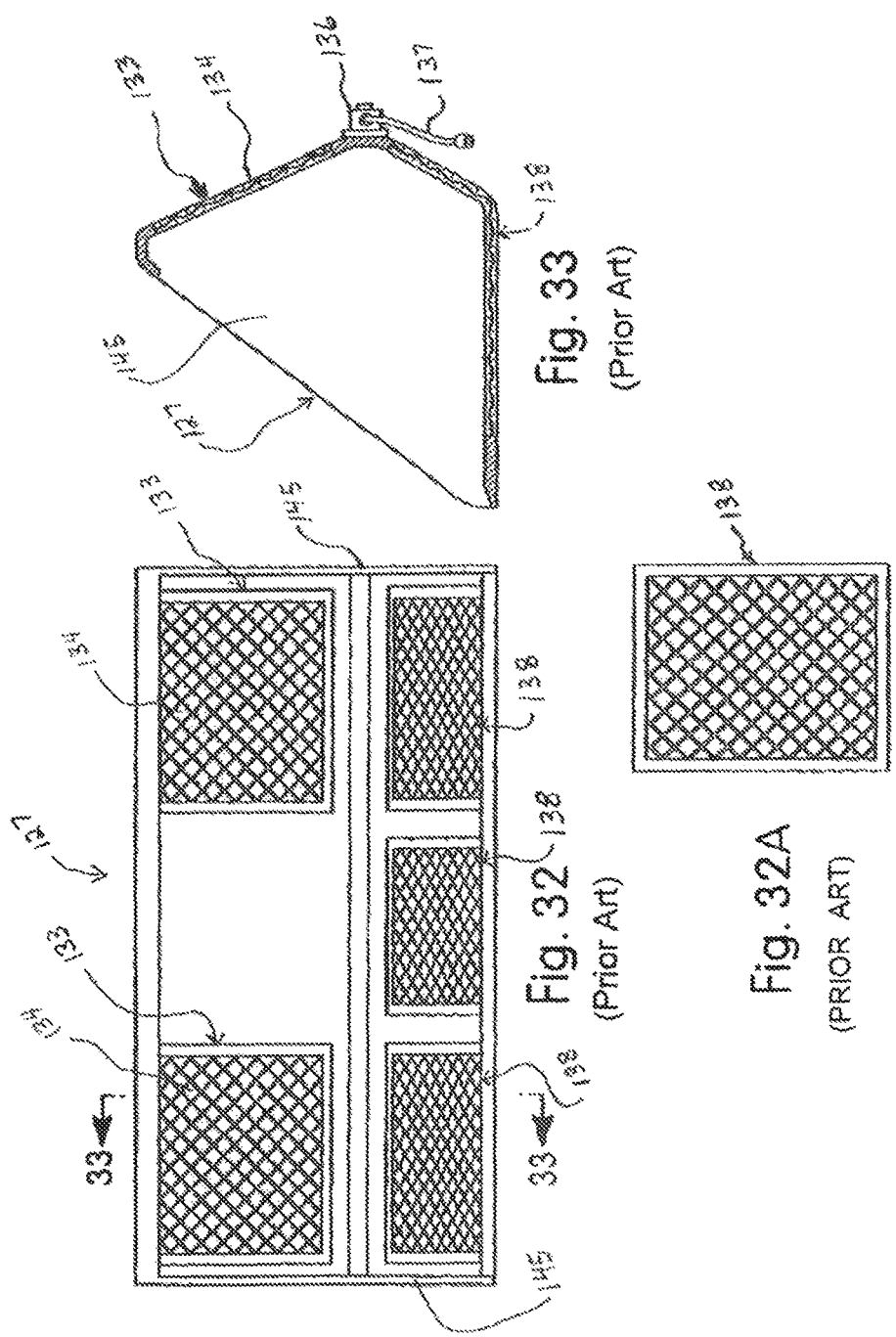

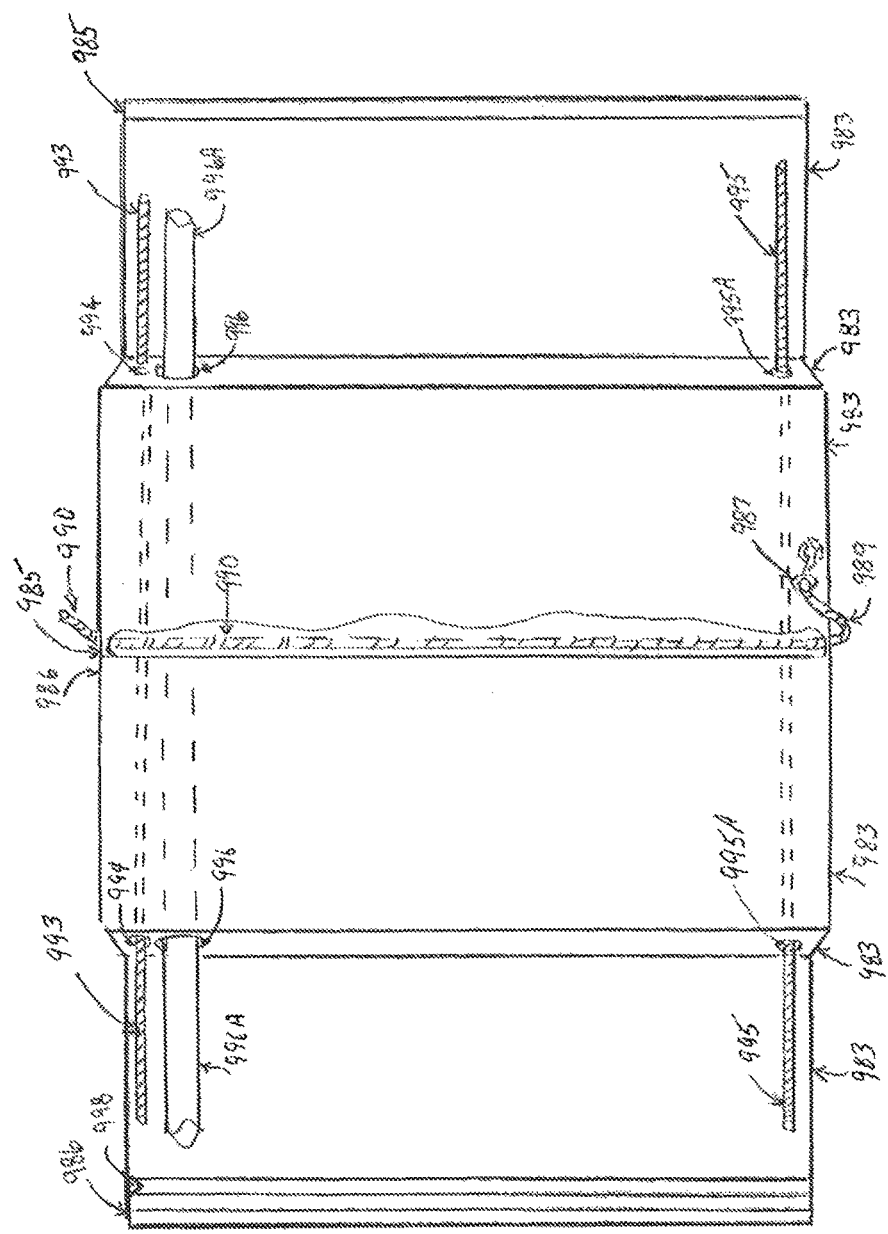

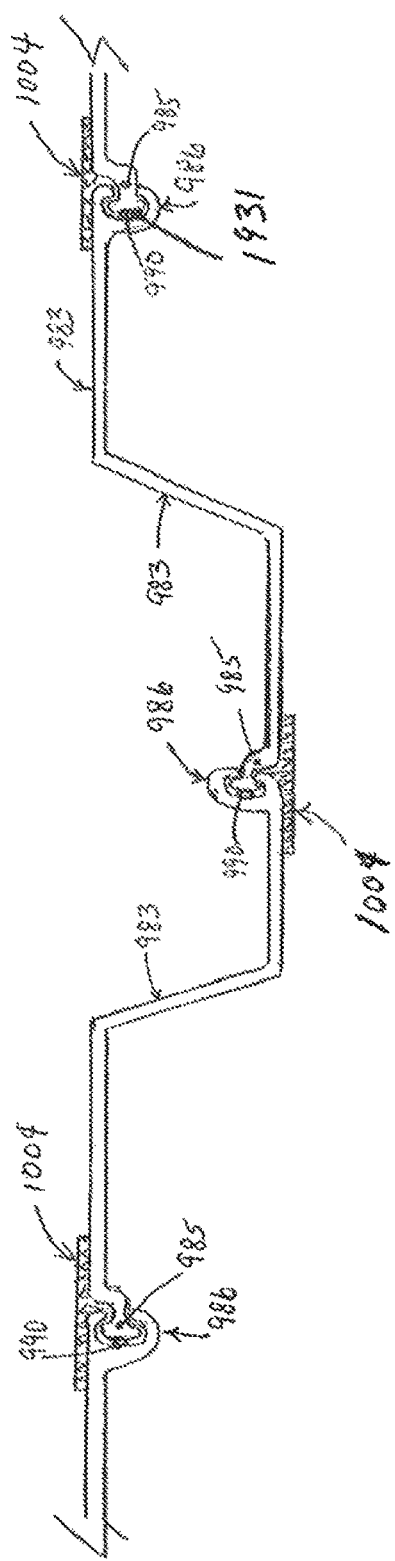

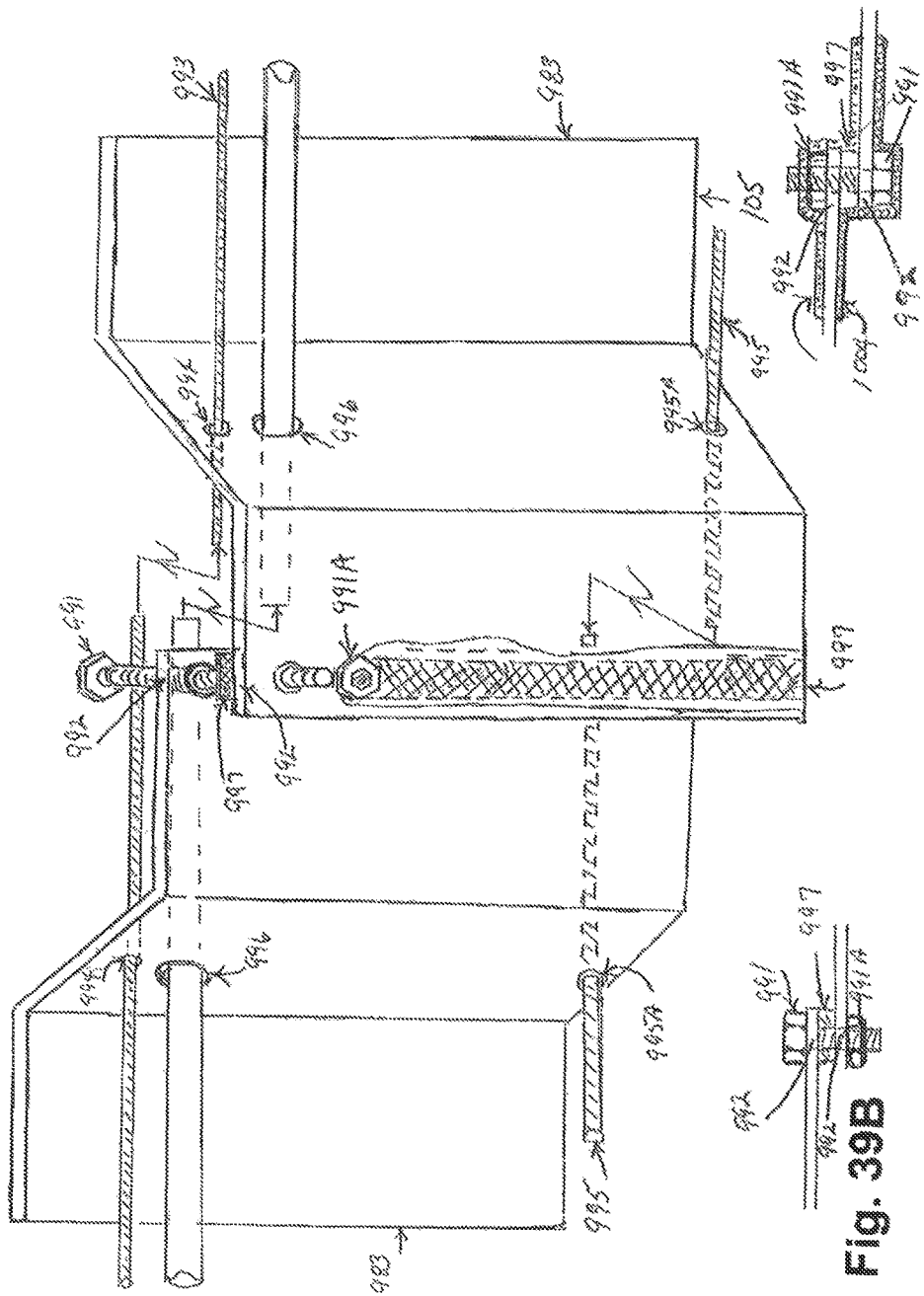

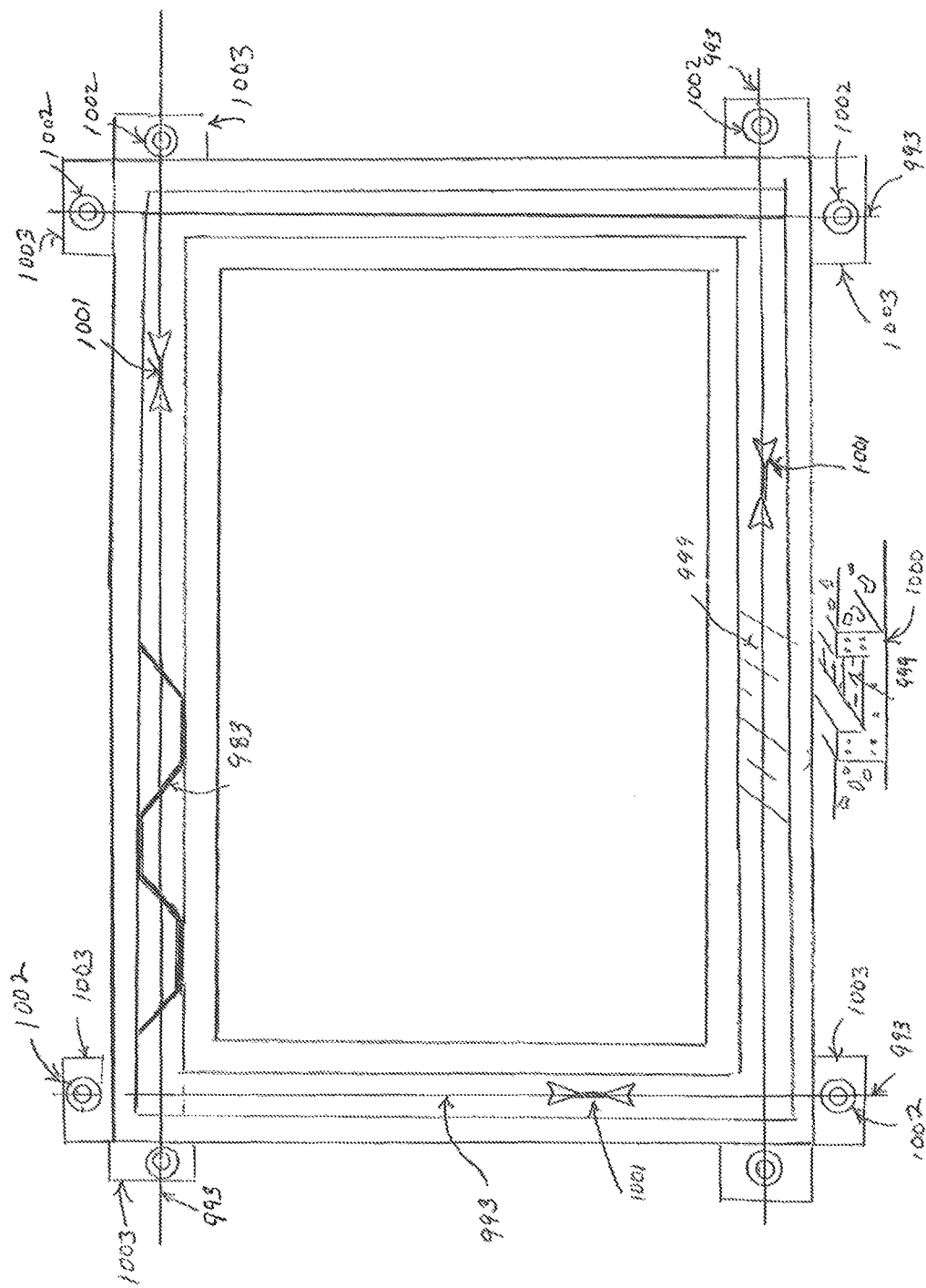

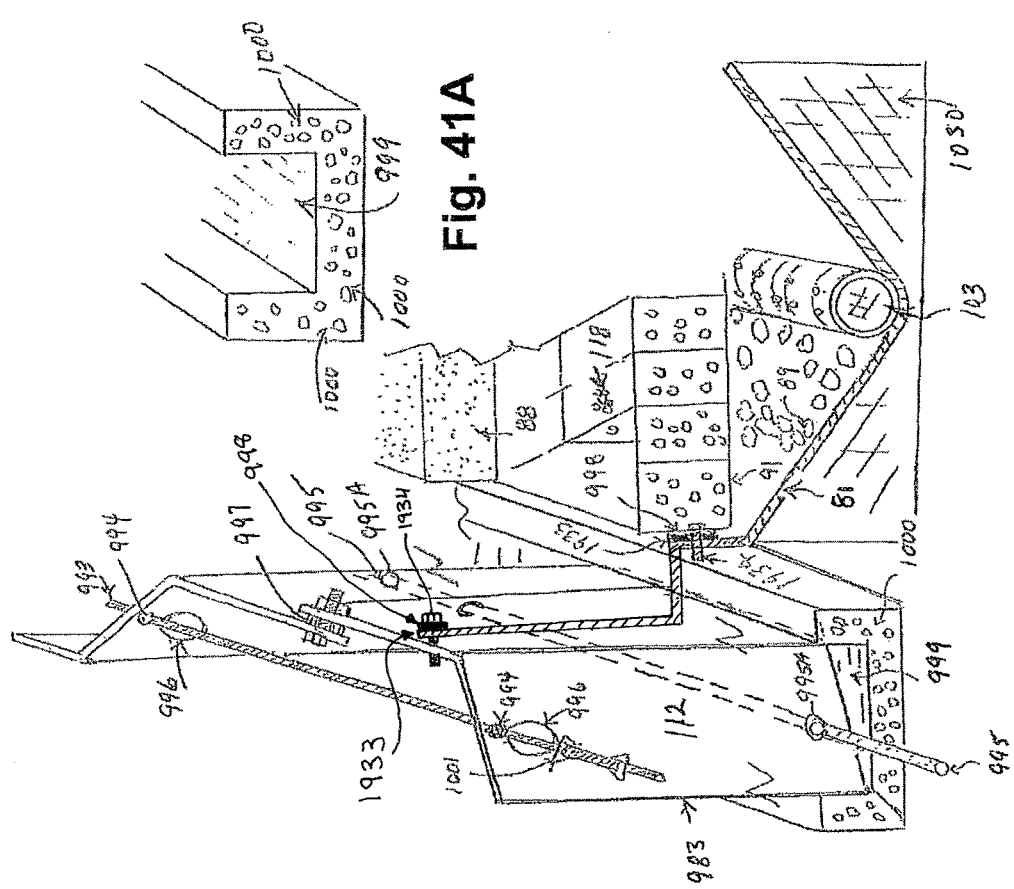

US 9,675,907 B2

QUICK-DRY FILTER DEWATERING MOBILE PROCESS AND APPARATUS

CROSS-REFERENCE TO RELATED APPLICATIONS

This application claims the benefit of U.S. Provisional Patent Application Ser. No. 61/628,245 filed Oct. 27, 2011, and PCT application number PCT/US2012/061683 filed Oct. 24, 2012; the disclosures of which are hereby incorporated by reference in their entirety.

In one exemplary embodiment, the disclosure relates to utilizing mobile walls, a transportable (or stationary) low cost, low carbon footprint process and apparatus with a granular filter media dry cell (for filter or bed) for dewatering particulate solids from liquid. The mobile wall structures can be made of a rigid structure constructed of new or preferred salvaged materials, assembled, with watertight joints, used, disassembled and stored for redeployment. The walls are set in a keyway utilizing whatever soil composition is available. The walls can be used in the previous Deskins filters as old wall replacement or new wall construction.

In another exemplary embodiment, the disclosure utilizes a generator that is not dependent upon site or local electricity thus can be operated in any location. All parts can be engineered, fabricated according to the design of the Quick-Dry Filter Dewatering Mobile Process and Apparatus, packed in shipping containers and be readily available for any immediate needs.

In still another exemplary embodiment, the disclosure relates to an upflow baffle for dewatering particulate solids from liquid using a granular filter media dry cell (for filter or bed).

In a further exemplary embodiment, the disclosure relates to a surface skimmer for helping remove freed water and relieve some of the overflow of water through interior overflows of a dewatering system. In a still further exemplary embodiment, the disclosure relates to an adjustable flat weir that helps control overflow between adjacent filters in a dewatering system.

According to the New Encyclopedia Britannica, Micropaedia, Volume X (1974) page 573, described water purification as treatment consisting of one or more steps by which water is made safe and acceptable for use. Filtration is still the most widely used method of purification. In slow filtration, the water is allowed to pass through a deep layer of fine sand most of the impurities are removed by the top inch or two of sand. Which is removed and cleaned from time to time or in modern plants is washed in place by special wash water. In rapid filtration plants, the water is treated with a coagulant such as aluminum sulfate, ferric chloride or ferric sulfate. This flocculates particles, carrying most suspended matter to the bottom in sedimentation tanks. After this preparation, the water is passed at a relatively rapid rate through small beds of course sand that are washed from time to time. Heavily polluted waters may be chlorinated both before and after filtration. Aeration mixture of air with the water is carried out if undesirable amounts of iron and manganese are present, they are held in solution in water only in the absence of oxygen.

The New Encyclopedia Britannica, Macropeaedia, Volume 19, (1974) page 651 discusses water treatment plants. Water that has been collected and conveyed to its point of use is treated to make it hygienically safe, attractive, and palatable and economically suited for its intended uses before it is distributed. The term treatment may refer to a variety of processes including long-period storage, aeration, coagulation, sedimentation, softening, filtration, disinfection, and other physical and chemical processes in varying combinations depending primarily on the characteristics of the water source but also on intended use.

Long period of water which generally means storage in excess of one monthly, usually takes place in reservoirs or settling basins through which water passes before it enters the treatment plant proper. Storage reduces suspended sediment and bacteria.

Aeration, the process of mixing air with water is accomplished by contact bed or spray, cascade, multiple-tray or air injection aerators. Spray aerators force water through nozzles into the air. Cascade aerators consist of a series of steps over which the water falls. In multiple tray aeration, water falls through nozzles in a series of vertically stacked trays. Contact beds are similar to multiple-tray aerators except that the vertically stacked trays are filled with gravel or some other contact media over which the falling water flows. Air-injected units consist of equipment to force small air bubbles through the water. Aeration is used primary to reduce odors and tastes to reduce hardness and corrosiveness by removal of carbon dioxide, and to eliminate iron and manganese.

Alum, sodium aluminate, ferrous sulfate with lime, chlorinated copperas, ferric chloride, ferric sulfate, and often other substances are added to the water to aid coagulation. The addition of coagulants causes the colloidal, color and mineral particles to agglomerate into a settleable floc.

Coagulation is usually accomplished in two stages, rapid mixing of the coagulant with the water and extended slow mixing during which the settleable floc is formed. The floc is then settled out by gravity in settling basins. Coagulation and sedimentation reduce the bacteria content of the water and are particularly effective in reducing color and turbidity, while indirectly reducing odors and tastes, some coagulants, however, may increase the hardness and corrosiveness of the water.

Softening is the process of removing calcium and magnesium from the water either be chemical precipitation or by ion exchange. The most widely used process is lime-soda softening in which lime and soda ash are added to the water to cause calcium carbonate and magnesium hydroxide precipitation. Sedimentation follows the addition of chemicals to permit the precipitates to settle. After the addition of lime or lime and soda ash, the softened waters are unstable and require stabilization by re-carbonation or other means.

In the ion-exchange process, water is passed through beds of ion-exchange resins or carbonaceous ion exchange materials. Cation exchangers, which exchange their sodium ions for calcium or magnesium ions in waters, commonly are used. The action is reversible, and the cation exchangers are regenerated periodically with a salt solution. Both water-softening methods are effective, and the lime-soda process also reduces bacteria, turbidity, odors and tastes, and iron and manganese.

Water filtration includes slow-sand filtration, rapid-sand filtration and in slow-sand filtration, low turbidity raw water or sewer water is passed directly into beds of fine sand underlaid by gravel and an under drainage system. The sand beds removed suspended matter from the water.

Rapid-sand filters allow the water to flow through larger grain sand at much faster rates but are otherwise similar to slow-sand beds. For rapid filters to be effective, prior treatment of the water by coagulation and sedimentation usually is necessary. Rapid filter beds may be made of silica and crushed quartz or crushed anthracite coal. Both slow and rapid filtration reduces color and removes iron and manganese, bacteria and turbidity. Odor and taste are reduced as an indirect result of rapid-sand filtration. Modern water-treatment plan designs favor rapid-sand filters over slow sand filters. Both types of filter require periodic cleaning.

Microstraining removes algae and other microparticles from waste, usually prior to rapid-sand filtration. Microstraining can greatly increase the length of the rapid-sand filter runs. The microstrainer is a rotating-filter drum covered with a fine stainless steel mesh having apertures of less than one micron in size. Water passes from the inner section of the unit outward and the screen is continuously cleaned by a water spray at the top.

Chlorine is most commonly used for the disinfection of water, but ozone and ultraviolet radiation treatment are also used. Chlorine is applied both before filtration, the pre-chlorination, and as the final water treatment before distribution, the post-chlorination. Most large treatment plants are liquid chlorine; usually it is added to the water in amounts that will ensure a small free chlorine residual throughout the water distribution system. Chlorination is effective in destroying bacteria and inactivating viruses as well as in reducing faint odors and tastes in water, but chlorine causes problems by combining chemically with organic compounds. In the presence of intense orders and tastes, chlorination cannot always be employed because it may produce unpleasant tasting by-products.

There are a number of special water-treatment processes in use. Copper sulfate is used for algae control. Activated carbon removes many organic chemicals and odors. Ammonia with chlorine is used for chlorine disinfection and odor control.

Efficiency and dependability are increased in modern water-treatment plants by automation and centralized control. A typical municipal water-treatment plant is shown diagrammatically in FIG. 29.

Since the 1974 articles there have been further development of water purification and water treatment plants.

Recent concerns over safety and trace contaminants in drinking water have driven the development and acceptance of membrane filter technology ranging from micro-filtration, ultra-filtration nano-filtration and reverse osmosis in which clarified water is pumped under pressure through large bundles of small diameter (less than $1/10$ inch) hollow fibers contained within collection housing. The filter bundles are manufactured from a variety of polymeric material, such as, polysulfone or PVDF, which are permeable in the sub-micron range. Permeate (the water which passes through the fiber sidewall) is collected and sent to the distribution system. Reject water (the water and suspended solids, typically less than 0.5 percent, which will not pass through the filter membrane is discharged as sludge for thickening and dewatering.

Continued increases in demand for potable water has led to the development of ballasted clarification (such as Kruger's process) which utilizes microsand as a seed for floc formation. The microsand provides surface area that enhances flocculation and acts as a ballast or weight. The resulting sand ballasted floc allows for clarifier designs with high flow rates and short retention times, resulting in system configurations that are $1/5$ to $1/20$ the size of conventional clarifiers. The sludge produced by ballasted flocculation is typically less than 0.1 percent concentration.

Sewage is composed of the liquid and water-carried wastes from residences, commercial buildings, industrial plants, and institutions, together with any groundwater, surface water and storm water which may be present. The terms "wastewater" and "sewage" are sometimes used interchangeable herein.

However, wastewater can be defined as water containing impurities, as suspended solids, resulting from industrial processes.

The composition of sewage depends on its origin and the volume of water in which the wastes are carried. Sewage which originates entirely from residential communities is made up of excreta, bathing and washing water and kitchen wastes. Other wastes can be present from rural/agricultural sources and/or industrial or commercial establishments.

Modern sewage treatment is generally divided into three phases; primary, secondary and tertiary. Each of these steps produces sludge, which can be disposed of or used for various purposes.

Primary treatment, or plan sedimentation, removes only the settleable solids from sewage. A modern system for primary treatment entails collecting the sewage, conveying it to a central point for treatment, using both screen to remove large objects and grit chambers to remove grit, and using primary sedimentation tanks to remove the suspended settleable solids. This type of system produces about one third of a gallon of wet sludge per person per day, and facilities for handling and disposing of the sludge are also needed. Primary treatment reduced to concentration of suspended solids by about 60 percent and reduces the BOD (biochemical oxygen demand) by about 35 percent.

Secondary treatment involves the addition of a biological treatment phase following plain sedimentation. At best, this treatment removes about 85 to 95 percent of the organic matter in sewage. It has little effect on dissolved materials or on nutrients that stimulate the growth of algae in the receiving waters. It also discharges all of the nutrients and dissolved solids, as well as any contaminants which may be added to the water by industrial plants.

There are two basic methods often used in modern secondary treatment that is the trickling filter and the activated-sludge process. In small communities secondary treatment is sometimes accomplished by either the trickling-filter method or the contact bed method, but usually used is the sand filter method. In larger communities secondary treatment is generally accomplished by the activated-sludge process.

Sand filters are beds of fine sand, usually 3 feet (1 meter) deep, through which the sewage slowly seeps. As it seeps through the sand, the organic matter is decomposed and stabilized by the microorganisms in the sewage. Sand filters require about 4 acres (1.6 hectares) of sand beds for each thousand people. Because of this large space requirement, sand beds have obvious disadvantages. Also, the time required for the sludge to be formed and dried usually takes weeks. This long drying time means that large surface areas of sand beds have to be used to achieve drying with the attendant large cost of constructing, operating and maintaining the sand beds. Rain adds time to the drying function of sand beds, since the sand beds usually are without any roof or other top covering. Covered sand beds require less area than do uncovered beds but still take weeks to achieve drying and have a higher construction cost. About 90 percent of smaller municipalities use sand beds to dewater sewage coming from primary treatment units. The main purpose of sand beds is the reduction of the water content in the primary-treated sewage.

A contact bed composed of many layers of stone, slate or other inert material provides a relatively large surface area for the growth of microorganisms. It operates on a fill and draw basis, and the organic matter delivered during the fill period is decomposed by the microorganisms on the bed. The oxygen required by the microorganisms is provided during the resting period, when the bed is exposed to the air.

In the trickling filter system, the sewage is applied to the filter through rotary distributors and then is allowed to trickle down over large stone or plastic beds that are covered with microorganisms. The beds are not submerged and thus, air can reach the organisms at all times. The area requirements for trickling filters are about 5 to 50 acres (2 to 10 hectares) per million people.

In the activated sludge process, heavy concentrations of aerobic microorganisms called biological floc or activated sludge, are suspended in the liquid either by agitation which is provided by air which is bubbled into the tank or by mechanical aerators. Final sedimentation tanks are needed to separate the floc material from the flowing liquid. Most of the biologically active sludge, then, is returned to the aeration tank with which to treat the incoming water. The high concentration of active microorganisms which can be maintained in the aeration tank permits the size of the treatment plant to be relatively small, about 1 to 5 acres (0.1 to 2 hectares) per million population.

Tertiary treatment is designed for use in areas either where the degree of treatment must be more than 85 to 95 percent of where the sewage, after treatment, is reused. It is mainly intended to further clean or polish secondary treatment plant effluents by removing additional suspended material and by lowering the BOD, generally by filtration. This polishing however has little impact on the dissolved solids, including the nutrients, synthetic chemicals and heavy metals. To eliminate these constituents of sewage other methods of treatment have been devised. These processes include coagulation and segmentation, precipitation, adsorption on activated carbon of other adsorbents, foam separation, electro dialysis, reverse osmosis, ion and distillation.

Sludge is the semiliquid mass removed from the liquid flow of sewage. Sludge will vary in amount and characteristics with the characteristics of sewage and plant operation. Sludge from primary treatment is composed of solids usually having a 95 percent moisture content. The accumulated solid materials, or sludge, from sewage treatment processes amount to 50 to 70 (22 to 31 kg) per person per year in the dry state or about one ton (0.9 metric ton) per year in the wet state. Sludge is highly capable of becoming putrid and can, itself, be a major pollutant if it is not biologically stabilized and disposed of in a suitable manner. Stabilization may be accomplished by either aerobic or anaerobic digestion. After digestion, sludge beds are usually used.

In modern sewage treatment plants, mechanical dewatering of sludge by vacuum filters, centrifuges or other devices is becoming widespread. The dewatered sludge then may be heat dried, if it is to be reclaimed, or it may be incinerated. In large communities where amounts of sludge are produced, mechanical dewatering and incineration are commonly practiced. But there are many smaller communities, rural areas, etc., which have economic constraints and which use the sand bed method to dewater sewage. There is a great need to make the sand bed method more economical by reducing the time for separating waste material (sludge) from the primary-treated sewage effluent and by reducing the time for drying the sludge. Reduced drying tie would allow reduction of the size of the sand beds needed.

Early sludge treatment schemes included plain sedimentation, followed by chemical precipitation or sedimentation aided by flocculation chemicals. Chemical precipitation fell into disuse, but may be making a comeback. Nowadays, chemicals are often added to the sewage to promote the coagulation of the finer suspended solids, so that these solids become heavy enough to settle in sedimentation in the primary treatment stage. Typical chemical coagulants in the flocculation of sewage are alum, polymers, ferric sulfate, ferric chloride and lime.

Chlorine is often used to minimize odors from sedimentation tanks and in the final effluent as a disinfectant.

U.S. Pat. No. 5,248,416 (Howard) discloses a sewage treatment system which presents a main flow line and a recirculating line, the former for floc which has appreciated in size due to the addition of a polymer and to passage through an area of agitation/turbulence, and the latter for the return of small sized floc to the agitator/turbulence area for size increase.

The passageways of the system include movable flaps which serve recirculation purposes, and a ledge of flutter for current creation and floc build-up. Raw liquid sewage enters the system, whereas the outlet leads to a belt press and/or a dry bed to cake the resulting sludge. More specifically, the apparatus for flocculating fluids containing suspended solids comprises conduit means for conducting the fluid to an outlet in the conduit means. There is means introducing a flock-producing agent in to the fluid in the conduit means, a vertical drop mounted ledge means in the vertical drop in the conduit means downstream from the means introducing the flock-producing agent, and a movable mounted ledge means in the vertical drop which serves to increase turbulence and to increase the size of accumulating floc in the fluid. There is a vertical rise in said conduit means, downstream from the vertical drop leading to the outlet. The conduit means includes means connecting the vertical drop to the vertical rise, and there are circulation passageway means connecting the vertical rise to the vertical drop for recirculating smaller size flock to the vertical drop.

In Howard, it is said that a particular feature is that no mixer equipment is required. Polymers are injected into the raw sewage causing water the separate from the raw sewage during the procedure, resulting in floc buildup. The latter is caused when the polymer begin dissolving with the result that a film of concentrated polymer solution builds up about the polymer particles, forming aggregates or agglomerations, identified as "flocks". Turbulence is key factor, where such is said to be accomplished through a ledge (which flutters) located in the vertical drop conduit and a series of movable flaps disposed within the recirculating conduit. The singular stated purpose of the Howard scheme is to create flock, i.e. solids with a minimum of water content, through separation. Restated otherwise, the Howard scheme, through turbulence or tumbler-mixer action, is said to create additional flock (of a large size) which goes to output, whereas smaller flock is caused to recirculate said increase, thereby, in size for repeated passage to output.

The Sarasota, Fla. Public Utility Company purchased one vacuumed assist drying bed from USEP (Company). The process consisted of walls, concrete floor with grooves, and a sealed down porous block tile consisting of small stones with epoxy to hold together with a smaller granular material on top. The grooves were used to collect the water when the vacuum was applied. This is similar to the surface of a cement building block. As the utility scraped sludge from the surface, the tiles wore down to the stone and some were completely removed. A thin layer of small stone was placed to level out the bed. A GeoWeb stabilization material was placed directly on the original plates and placed stone. Sand filled the stabilization material and several inches above. By installing the stabilization material 18 and sand the utility vehicle was able to drive on the beds. The beds were decommissioned in 1996. (See FIGS. 27 and 28)

U.S. Pat. Nos. 6,051,137, 5,770,056, 5,660,733; 5,683,583, 5,725,766, 5,611,921 and 7,691,261, the entirety of which are incorporated herein by reference, disclose a process of dewatering treated sewage and equipment and installation used therein or therewith. Such process is usually referred herein as the previous Deskins process scheme. The previous Deskins process-scheme includes mixing the sewage with a coagulant or flocculant aid, usually activated polymer. The sewage is then mixed and flocculated at conditions which involved extensive mixing turbulence of the sewage and subjected to such mixing and flocculating. Floc forms the solids particles in the sewage. The pH of the sewage is chemically adjusted into the basic pH range or to a higher basic pH. The sewage is applied to a sand bed whereby the flocculated solids in the sewage are separated from the liquid in the sewage, by collecting on the top of the sand bed. The flocculated solids located on the top of the sand bed are air dried. The dried flocculated solids are removed from the top of the sand bed.

The first step/stage in the previous Deskins process-scheme used an inline polymer mixing-feeding (injection) system to incorporate activated polymer into the sewage flow line (see FIG. 25). The inline polymer preparation system eliminated this need for batching tanks, mixers and polymer transfer pumps. The inline polymer system could be a conventional one or an inline polymer mixing-feeding system of the previous Deskins process-scheme. The inline polymer system (chemical pump) of activated precise amounts of neat polymer and water then metered the fully activated stock solution to the point of use without the need of transfer pumps.

The polymer is an emulsification of long chain organic polymer in idol. The water and mixing opens up or uncoils the polymer to expose charge sites in the polymer chain.

Coagulants or flocculants, such as, alum, ferric sulfate, ferric chloride and lime, could be used in place of the activated polymer in the sewage flow line to coagulate or flocculate the solids in the sewage. These coagulants or flocculants cause formation of an insoluble precipitate which absorbs colloidal and suspended solids.

The second step/stage in the previous Deskins process-scheme used an inline mixing flocculator (see FIG. 24). An inline mixing-flocculating device was used to enhance the chemically induced liquid-solids separation in the sludge dewatering process utilized at most wastewater treatment plants. The flocculator was used in any type of mechanical dewatering scheme that used a chemical as a coagulant or flocculant aid. The overall output and efficiency of the dewatering process was greatly increased by the thoroughness of the flocculating process. Prior art sludge production normally was 14,000 to 16,000 gallons of dewatered sludge per gallon of polymer, the mixer-flocculator unit provided a reduction of 40 to 60 percent in polymer consumption.

The third step/stage in the previous Deskins process-scheme was a chemical induced pH adjustment of the sewage exiting the mixer flocculating system. Liquid caustic, lime or other suitable base was injected into the discharge side of the mixer-flocculator unit and the temperature of the water to the inline polymer system was increased, thereby increasing the liquid/solids pH balance.

As the liquid/solids content exited the inline mixer-flocculator unit, an electronic driven diaphragm pump or gear driven pump pumped liquid caustic or lime in to the discharge line of the flocculator-mixer unit. The pH of the sludge was increased to 12 by the chemical. The pH of the sludge remained at 12 or 72 hours, and during this period of time the temperature reached 52 degrees C. and remained at that temperature for at least 12 hours. At the end of the 72 hours period during which the pH of the sludge was above 12 the sludge could then be air dried to achieve a percent solids of greater than 50 percent. The liquid caustic or lime pump could be present on a transportable dewatering trailer with the mixer-flocculating system and the polymer feed system, and thus was easily transported.

The fourth step/stage in the previous Deskins process-scheme used a sand grid cell in a sand bed used for dewatering sludge (see FIG. 1). The sand-cell was grid used to stabilize filtration media in any new or existing sand drying bed. It was preferably manufactured of heavy-duty polyethylene. Preferably the sand grid was honeycomb shaped or similar shaped. The fixed media (i.e., grid) was best installed in the filtration sand about six inches below the surface. Under load, the sand-cell generated powerful lateral confinement forces and sand-to-cell or stone-to-cell 22 frictions. This process created a bridging with high flexural strength and stiffness. The sand-cell greatly enhanced the dewatering process. Plant operators could drive an end or front loader or tractor over the entire bed thereby significantly reducing cleaning time and eliminating expensive manual labor. Surface and subsurface bed stabilization was achieved using the invention grid. This allowed for excellent maneuverability of equipment, eliminated surface and subsurface, compaction of the sand media and produced an excellent drainage environment, and 100 percent saturation and drainage within about 10 minutes from start to pouring of the sewage resulted from the use of the grid.

This step of the previous Deskins process-scheme involved use of a sand-cell media to stabilize filtration sand/media in any new or existing sand drying bed (best constructed of concrete).

A standard sand-cell section could have nominal dimensions of eight feet wide by twenty feet long by six inches deep. However, a standard sand-cell section could have any length, width and height to fully fit into the dimensions of the sand cell in case. All of the individual sand-cell forming a sand-cell section generally were uniform in shape and size. Preferably, the individual sand-cells were about 6 inches wide, 6 inches long, about 6 inches deep, hexagonal in shape and, together formed a honeycomb. The honeycomb is one of the strongest, yet lightest, shapes found in nature. A standard sand-cell section could be made from, high density polyethylene plastic, any other suitable plastic or resin, stainless steel, fiberglass, concrete, wood, or any other suitable metal or material of any form of fabricated steel, preferably high density polyethylene plastic.

The sand-cell media was advantageously installed in the filtration sand or stone with its top surface most preferable about six inches, preferably not more than 12 inches or less than 2 inches, below its surface of the sand. Under load, the sand-cell media generates powerful lateral confinement forces and stone or sand to cell frictions. This process created a bridging with high flexural strength and stiffness.

The benefits of using sand-cell media were stated to be numerous. A subsurface which includes sand-cell media does not compact which allows the free water to pass quickly through the media. The high textural strength and stiffness of a subsurface which includes sand-cell media allowed equipment such as end loaders to drive directly onto the entire sludge drying bed without destroying the integrity of the filtration sand. This, in turn, significantly reduced the loading and cleaning time and eliminated expensive manual labor. Other benefits of using the sand-cell media were stated to include: lateral slippage of shear of the filtration media was prevented; filtration media replacement costs were reduced; economical standard washed sand or "P" gravel for rapid dewatering could be used (as opposed to conventional drying bed materials); square foot installation costs were reduced by ninety-four percent of the fixed media system; and total maintenance costs were reduced by more than seventy-five percent.

With regard to the previous Deskins process-scheme of FIG. 1, enclosure (849) contains a sand bed. Onto layer of non-porous material (850) e.g., concrete a layer of porous material (853) is positioned. Porous material (853) is used as a filter media and usually stone, crushed rock, ceramic shapes, slag and plastics of 1 to 6 inches, practically 2 to 4 inches in size are used. Stones or pebbles are preferred. At least one-usually more than one-projection of porous material (854) extends from the porous 25 layer (853) into the layer of non-porous material (850). Embedded in each projection channels (848) in porous material (854) is at least one nonporous pipe (855) having at least one hole into which liquid can drain. A layer of sand (857). Sand is located in the passageways in the sand cell grid. Above each sand-cell media section (865) is placed in a layer of sand (861). This layer of sand 861 is usually, though not necessarily, at least six inches in depth.

Walls (851) surround on all four sides of an area having one or more sand-cell media sections. One wall (851) is shorter to allow a front loader or the like into the enclosure. Each surrounding, dividing wall (851) extends upward from one or more footing supports (852) which are positioned at least partially in the layer of non-porous material (850). The top of each dividing wall (851), which runs between two enclosure areas having the sand-cell media sections, is a portable nozzle which is used to pour sewage into the enclosures.

Each sand-cell media section (865) is made up of honeycomb-shaped sand-cells (858) which are joined together in a honeycomb formation (i.e., each sand-cell which is not in an outer layer, where it intersects another sand-cell, it intersects three other sand-cells) channel runs through the interior of each sand-cell.

Sewage is poured through the channel into one or more enclosures (849) for the sand beds. The liquid permeates the outer sand layer, flows thorough the sand in the channels in the grid (865) in the centers of the sand-cells permeates the layer of sand beneath the sand-cell media and permeates the pebble layer beneath the layer, leaving the collected sludge solids on top of the outer sand-layer to dry from the sun and air.

The fifth step/stage in the previous Deskins process-scheme used a sludge retriever (see FIG. 13) to separate the dried sludge layer from the sand in the sand bed. The sludge retriever was designed to fit any adequately rated (front-end) loader and was powered by the hydraulic system of the loader. Easily operated by one person, the retriever's rotary drum of the efficiently broke up (chops) solid was and propelled it into a hopper. The sludge was chopped into very small granular particles, enhancing transportation and handling costs. The unique combing action of the rotating drum (preferably having 3-inch adjustable tines) not only removed sludge without significantly disturbing the filtering sand, it also levels the bed surface to promote uniform drying. Each bucket load of sludge removed by the sludge retriever usually only yielded an insignificant amount of sand for precision sludge clean-up. The sludge retriever (automated) made sludge removal and drying preparation a one-man, one machine operation. It also leveled and aerated the sand bed for the next pouring of sewage into the sand bed.

The sludge removal attachment was capable of removing dried wastewater sludge from sand drying beds. The implement was also capable of being attached to a front end loader. The mechanism had, for example, a two cubic yard bucket, constructed of ¼ inch steel, and a shaft-type rotary drum having multiple three inch tines. The unit was furnished with an expanded steel cover for the rotor and bucket. Rotor end plates were ½ inch steel minimum. The rotary action of the drum accomplished several functions. First, it removed the sludge layer, second it simultaneously leveled the surface of the drying bed. Third, by reversing the direction of the rotary drum, the sand bed could be aerated to a depth of three inches. Basically, the sludge was removed by passing the unit over the drying bed and sweeping up the dried sludge.

Alternatively, the sludge removal attachment (retriever) was capable of removing air-dried wastewater sludge from the sand bed. The unit was equipped with a bucket or scoop type device. Sludge was removed by passing the unit over the drying bed and scooping up the dried sludge.

Referring to FIG. 36, a previous waste water treatment installation of Deskins is shown. The installation used a sloped trench. There was a shallow rock in the given area and the engineer was trying to prevent a lot of blasting. We maintained a trench however shallow and 3 layers of stone.

The third layer from the bottom housing the panels with 6 inches of sand on top. The Deskins Back-wash Recovery System, with high rate thickening and dewatering technology replaces traditional thickening and dewatering equipment to handle large volumes of dilute solids in water through a small filter (vessel). In this process, a Deskins filter (FIG. 1) is modified by the installation of a control valve on the filter's underdrain, a level control system, decanting methods, and a reduced media profile. The filter is a sealed vessel on the walls, entrance and exit ramps and bottom. Anchors around the entire parameter of the filter fasten the Deskins drainage panels in a permanent position. Dewatering sludge at wastewater treatment plants has traditionally been a major operational concern. Most large operations use mechanical filter presses to efficiently dewater their sludge. For smaller operations this equipment is too expensive and too large for their needs. Therefore, small facilities rely on sand filter drying beds for sludge dewatering. This is an excellent method to process sludge, however most beds were designed without inline dewatering (liquid-solid-separation) or an easy and automated way to remove dried sludge. Expensive time-consuming manual labor has been a tremendous burden to plant operation. The process and equipment solves the old sludge bed problems. With simple and easy modifications of existing beds, old nonproductive beds can be upgraded to good dewatering devices. The process and equipment allows any wastewater treatment plant to change their sludge build-up problem to a modern and cost effective method to dewater, dry and remove sludge.

The granular filter media is usually first pre-cleaned by pushing water up through it to the top surface thereof. The solids left in the filter media come to the surface thereof. The process includes applying at least some 30 of the composition to the granular filter media of the dry cell, filter of bed of the invention whereby the water is removed from the composition by passing of the water through the granular filter media of the dry cell filter or bed with the particulate solid I the composition collecting on the top surface of granular filter media. The water level is lowered to just above the top of the filter media each time, with solids collecting on top of the filter media. These thickening stages are terminated and the water is allowed to drain through and out of the filter media to leave the solids on top of the filter media. Preferably the applying of the composition is done at least twice. More preferably the applying the composition is done five or six times. The solids are allowed to dry in place and are then removed/retrieved.

The process includes the sequence of applying the composition to the granular filter media of the dry cell filter or bed of at least two containers of the invention whereby the water is removed from the composition by passing of the water through the granular filter media of the dry cell, filter or bed.

Preferably the liner extends up at least a portion of the side walls of the container.

Preferably at least one means for inserting water into the container is located on or above at least one side wall of the container. Also preferably at least one means for water insertion is located on each of two opposing walls of the container.

Preferable there is means for removing water located on top of the sand layer. Also preferably the means for water removal is a device located on one side wall of the container, and the device is means capable of being moved up or down the side wall.

Preferably the valley or depression is slanted towards the exit of the non-porous container.

Preferably the composition comprised of water and particulate solids is treated sewage.

The previous Deskins process for combining solids, thickening and retrieving in one vessel involves a combination of granular filter media dry cells, filters or beds for dewatering a composition comprised of water and particulate solids. The combination comprises at least two of the non-porous containers.

The previous Deskins process for combining solids, thickening and retrieving in one vessel, also involves the process of dewatering a composition composed of water and particulate solids where the process includes:

a.) Mixing the composition with a coagulant or flocculant aid;

b.) Mixing and flocculating the composition from step (a) to provide flock-rich composition;

c.) Chemically adjusting the pH of the flock-rich composition of step (b) into the basic pH range or to a higher basic pH;

d.) Applying at least some of the flock-rich composition of step (c) to granular filter medium of a granular filter media dry cell, filter or bed, whereby the water is removed from the composition by passing of the water through the granular filter media of the dry cell, filter or bed with the particulate solids in the composition collecting on the top surface of the granular filter media, and repeating the application, and then dewatering.

e.) The particulate solids on the top surface of the granular filter media 33 are dried (or allowed to dry), and the dried particulate solids are removed from the top surface of the granular filter media.

The previous Deskins process for combining solids, thickening and retrieving in one vessel involves a granular filter media dry cell, filter or bed for dewatering a composition composed of water and particulate solids. The process includes a non-porous container that has an exit for liquid and has side walls and a bottom. The bottom has two complementary portions that slant downward toward each other so as to form a valley or depression where the two complementary portions meet. A non-porous liner is located on the inner surface of the bottom. A drain pipe is located on top of the liner in the valley or the depression and one end portion of the drain pipe extends through the exit. The remainder of the drain pipe has a multitude of small openings around at least a major portion of the circumference thereof.

A porous layer of a large filter media is located in the bottom of the container with the drain pipe being located in the layer of large filter media.

A grid having open passageways is located on top of the layer of the large media. A fine filter media is located in the open passageways of the grid. A layer of filter sand is located on top of the grid.

Preferably the liner extends up at least a portion of the side walls of the container.

Preferably at least one means for inserting water into the container is located on or above at least one side wall of the container. Also preferably at least one means for water insertion is located on each of two opposing walls of the container.

Preferably there is means for removing water located on top of the sand layer. Also preferably the means for water removal is a device located on one side wall of the container, and the device is means capable of being moved up or down the side wall.

Preferably the valley or depression is slanted towards the exit of the non-porous container.

Preferably the composition comprised of water and particulate solids is treated sewage.

The previous Deskins process for combining solids, thickening and retrieving in one vessel involves a combination of granular filter media dry cells, filters or beds for dewatering a composition comprised of water and particulate solids. The combination comprises at least two of the non-porous containers.

Preferably the at least two of the non-porous containers are aligned in line with each other, and adjacent non-porous containers have a common side wall. Also preferable the at least two of the non-porous containers comprise three of the non-porous containers. Preferably, for each of the containers the liner extends up at least a portion of the side walls of the container.

Preferably, for each of the containers, a porous layer of a large filter media is located in the bottom of the container with the drain pipe being located in the layer of large filter media.

Preferably, for each of the containers, a porous layer of a large filter media is located in the bottom of the container with the drain pipe being located in the layer of large filter media. Preferably a grid having open passageways is located on top of the layer of the large media, a fine filter media is located in the open passageways of the grid, and a layer of sand is located on top of the grid.

For each of the containers at least one means for inserting water into the container is located on or above at least one side wall of the container. Also preferably, for each of the containers, at least one means for water insertion is located on each of two opposing walls of the container.

Preferably, for each of the containers, there is means for removing water located on top of the sand layer. Also preferably for each of the containers the means for water removal is a device located on one side wall of the container, and the device is means capable of being moved up or down the side wall.

Preferably, for each of the containers, the valley or depression is slanted towards the exit of the non-porous container. Preferably, for each of the containers, the composition comprised of water and particulate solids is treated water from a water treatment plant.

The processes, equipment, devices, granular filter media dry cells, filters and beds, etc., of the previous Deskins process for combining solids, thickening and retrieving in one vessel, can also be used to process primary, secondary and tertiary-treated sewage for example.

U.S. Pat. Nos. 6,051,137, 5,770,056, 5,660,733, 5,683, 583, 5,725,766, 5,611,921, 7,691,261 B2 and 7,494,592 B2 disclose a process of dewatering treated sewage, and equipment and installation used therein or therewith, and the pertinent disclosure in such patents is incorporated herein by reference. Such process is usually referred herein as the previous Deskins process scheme.

SUMMARY

Some objects and advantages recognized by some exemplary embodiments of the present disclosure are to include, improve and make mobile the permanent installation of a dewatering system at any particular location. Exemplary dewatering systems include the Deskins process (as disclosed in U.S. Pat. Nos. 6,051,137, 5,725,766, 5,660,733, 5,770,056, 5,683,583, 5,611,921, 7,494,592B2 and 7,691, 261 B2).

Some embodiments of the present disclosure achieve cost savings and the ability to have a green technology dewatering process for (organic or nonorganic) sludge waste (or water with solids residual) to be used, disassembled and redeployed to another location or many locations.

In illustrative embodiments, the improvements include a wall structure that is fabricated from ridged thin composite material in smaller widths and lengths joined together with sealing materials to prevent leaking and a portable generator with the ability to run off of alternative energy sources.

The present disclosure can be used in conjunction with the above prior art patents on an existing or new Deskins dewatering process by converting from the typical concrete walls to the new light weight prefabricated wall panels saving money in material and construction costs.

In some embodiments, the disclosure includes the ability to use various types of ridged material such as stone, lava, sand etc. to be formed in a trench type configuration forming a key way to install the portable walls. The new disclosure includes the ability to fasten the portable walls into the base, align the wall sections by the use of a cable or ridged material and fastened at each end to a stationary post.

The use of a turnbuckle type device is to tension the cable for the proper alignment and additional strengthening of the vertical and horizontal loading on the portable walls. Each portable wall section can have an opening formed below the alignment cable and above the liquid level in the filter. These openings can be used to pass sludge distribution lines for discharge into the filter.

In illustrative embodiments, the disclosure includes the ability to completely disassemble the entire Quick-Dry Filter De-watering Mobile Process and Apparatus by removing the layers of media and storing that media in containers. Removing of the cell panel material and collapsing to form a thin transportable sheet. The underdrain can be removed when using a coupler (such as: Fernco coupler) the liner of the filter can be folded and placed on a flat shipping rack for deployment. The alignment cable can be removed from the top portion of the filter walls, rolled and stored. The sludge transfer lines can be disassembled when using a coupler (such as: Fernco coupler) and placed on racks for deployment. The sealed transportable wall sections can be separated for removal by un-bolting the overlapping joints or by removing each piece vertically when a male and female type joint has been used. After the wall sections have been removed they can be stored in a shipping container and the removed horizontal bar located in the keyway of the footer can be retrieved, bound and shipped in a shipping rack. The polymer activation unit and flocculation unit can be stored on a fixed base (such as a trailer) or separated and stored in a shipping container. The portable generator can be stored on a trailer or separated and stored in a shipping container.

The improvements of the present disclosure allow for the complete use, disassemble and redeployment of a complete self-sustaining dewatering system. Walls can also be utilized in permanent older Deskins filter beds as replacement walls or cost savings for new construction additions. Furthermore, the mobile process doesn't just treat waste water, it is useable to separate any water/liquid from particulate solids.

The improvements will now be described by way of reference to the drawings, where:

FIG. 1 is a front elevational view of a vertical cross-section of the prior art filter set up, disclosed in Deskins prior art U.S. Pat. Nos. 6,051,137, 5,770,056, 5,660,733, 5,693, 593, 5,725,766, 5,611,921 and 7,494,592 B2, including a layer of sand, a sand-cell media in the sand layer, a porous (e.g., stones or pebbles) layer, non-porous pipes having holes therein, and a non-porous bottom layer;

FIG. 4, with the granular filter media present, with the filtration of the second cycle complete;

FIG. 15 (prior art) is a side elevational view of the ribbed-perforated drain pipe;

FIG. 16 (prior art) is a vertical cross-sectional view of the ribbed perforated drain pipe along line 16-16 in FIG. 15;

FIG. 17 (prior art) is a vertical cross-sectional view of the ribbed perforated drain pipe along line 17-17 in FIG. 16;

FIG. 18 (prior art) is a partial cross-sectional view of the container showing the position and attachment of the grid;

FIG. 30 (prior art) is a front elevational view of the bucket of the previous Deskins process-scheme;

FIG. 31 (prior art) is a vertical cross-sectional view of the bucket in FIG. 30;

FIG. 32 (prior art) is a front elevational view of the bucket of the previous Deskins process-scheme;

FIG. 32 (prior art) is a front elevational view of the bucket of the previous invention with screens;

FIG. 32A (prior art) is a top view of the screen that can be used in place of the bars in FIG. 30:

FIG. 33 (prior art) is a vertical cross-sectional view of the bucket in FIG. 32:

Figure 37:
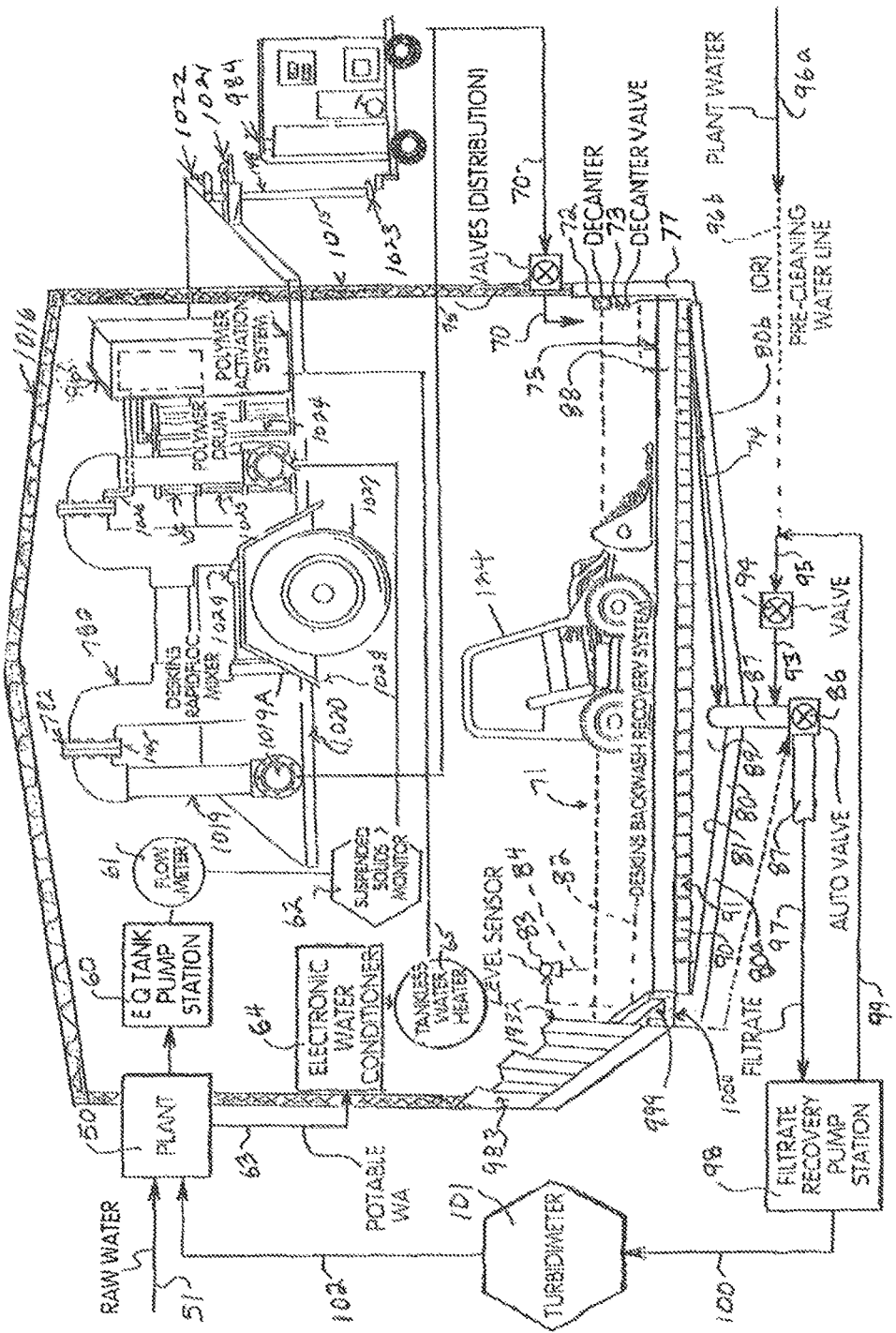
Figure 42:
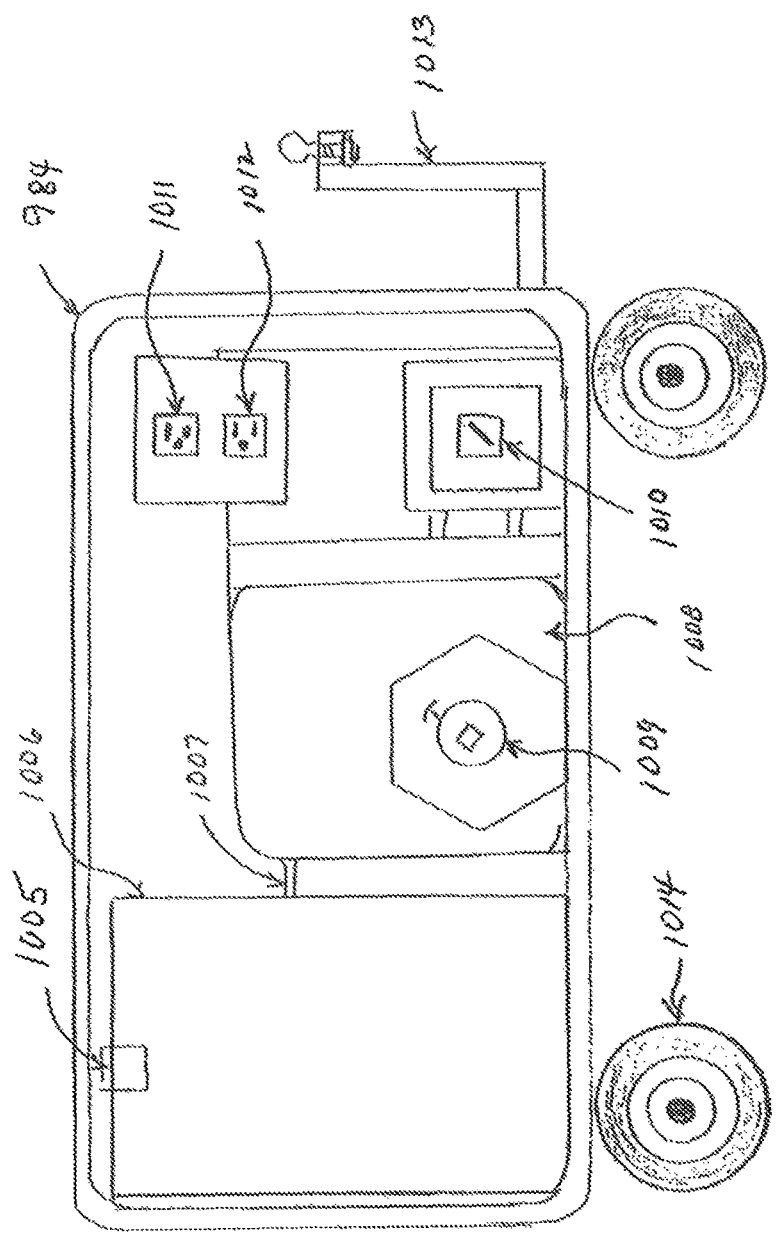
Figure 43:
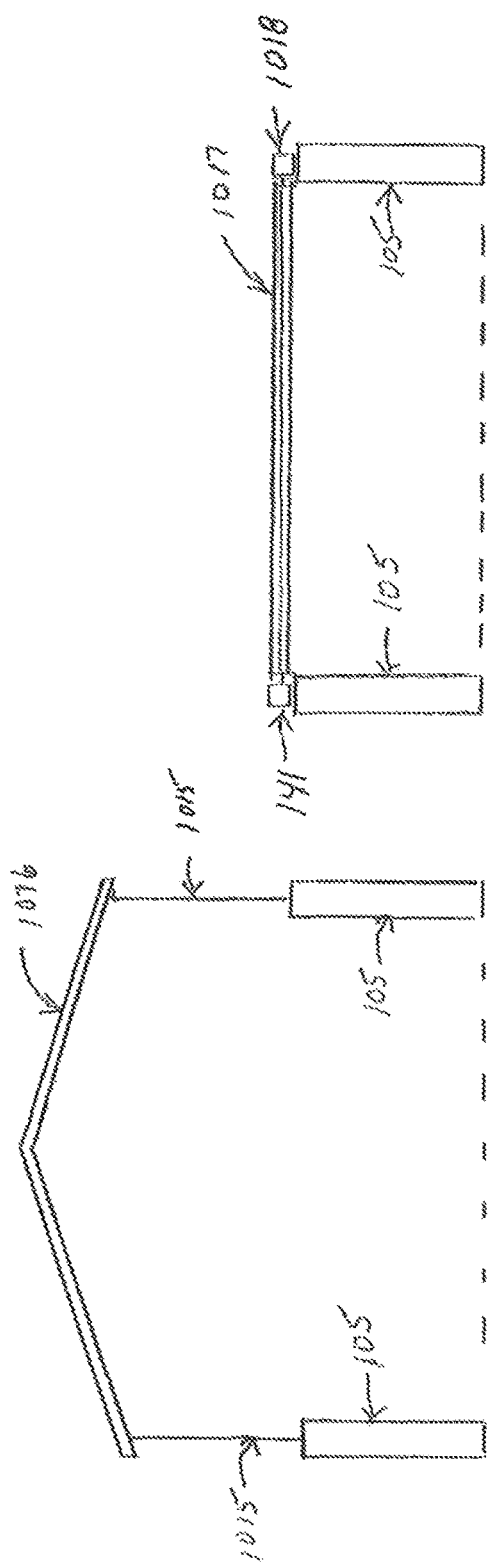
Figure 44:
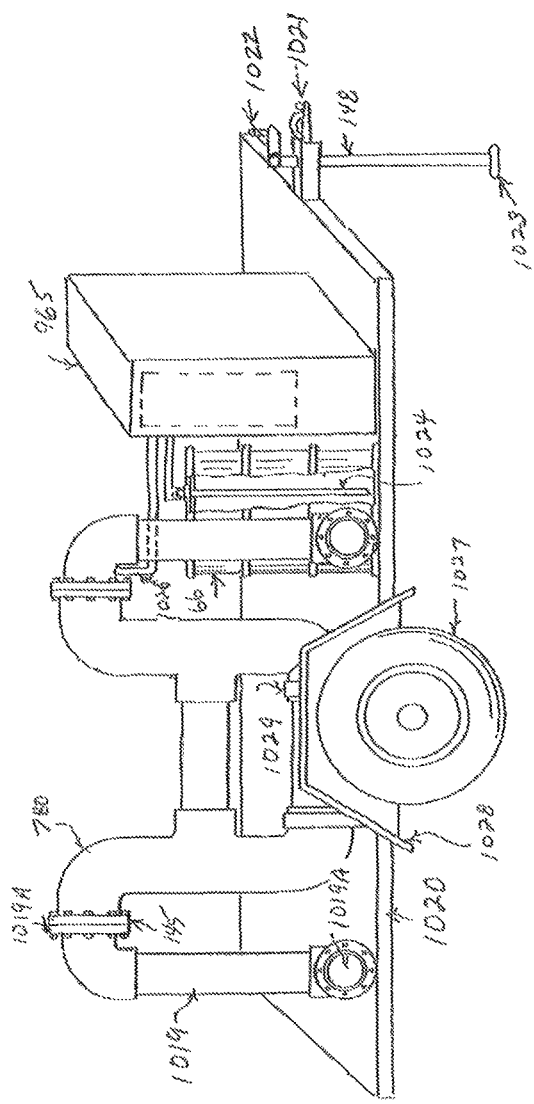

FIG. 37 is front elevational view of a cross-sectional view of the Quick-Dry Filter Dewatering Mobile Process and Apparatus (installation) which takes the Deskins prior art filter apparatus for combining solids, thickening and dewatering in one vessel and makes it mobile by the use of new wall sections and an alternative energy driven generator. This can be used for permanent and temporary installations also saving cost and manpower or to replace cement wall sections;

FIG. 38A is a front elevational view of wall sections with male and female joints that interlock. Showing rope sealant, bar, alignment cable, sludge pipe;

FIG. 38B is a top view of wall section with male/female joints showing sealants and spray on sealant;

FIG. 39A is front elevational view of two new wall sections with overlap joints with holes to use bolts and nuts for attachment showing flat sealant, alignment cable, sludge pipe and bar;

FIG. 39B is an exploded elevational view of a cross sectional view of overlap joints showing flat sealant:

FIG. 39C is an exploded elevational view of a cross sectional view of overlap joints showing flat sealant and spray on sealant;

FIG. 40 is new wall and apparatus installation showing layout and support posts;

FIG. 41 is a front elevational view of a cross sectional view of new wall footer base and apparatus showing trench/slope, non-porous liner, drainage pipe, liner strapping, filter media layers, and keyway;

FIG. 41A is front elevational cross sectional view of the key way;

FIG. 42 is a side view of mounted mobile generator, which can run by gasoline, diesel, electricity, wind, tidal, hydroelectric, geothermal, propane, natural gas, magnets or any other source. The generator is used to power the polymer preparation unit and operate a separate sludge transfer pump;

FIG. 43 is a front view of an A frame roof structure to cover the filters in unusually high rainfall conditions;

FIG. 43A is a front view of a flat roll cover to cover the filters in unusually high rainfall conditions showing hardware assembly attachments;

FIG. 44 is the mobile polymer activation unit and Deskins RapidFloc mixer trailer mounted for easy usage and redeployment.

Figure 45:
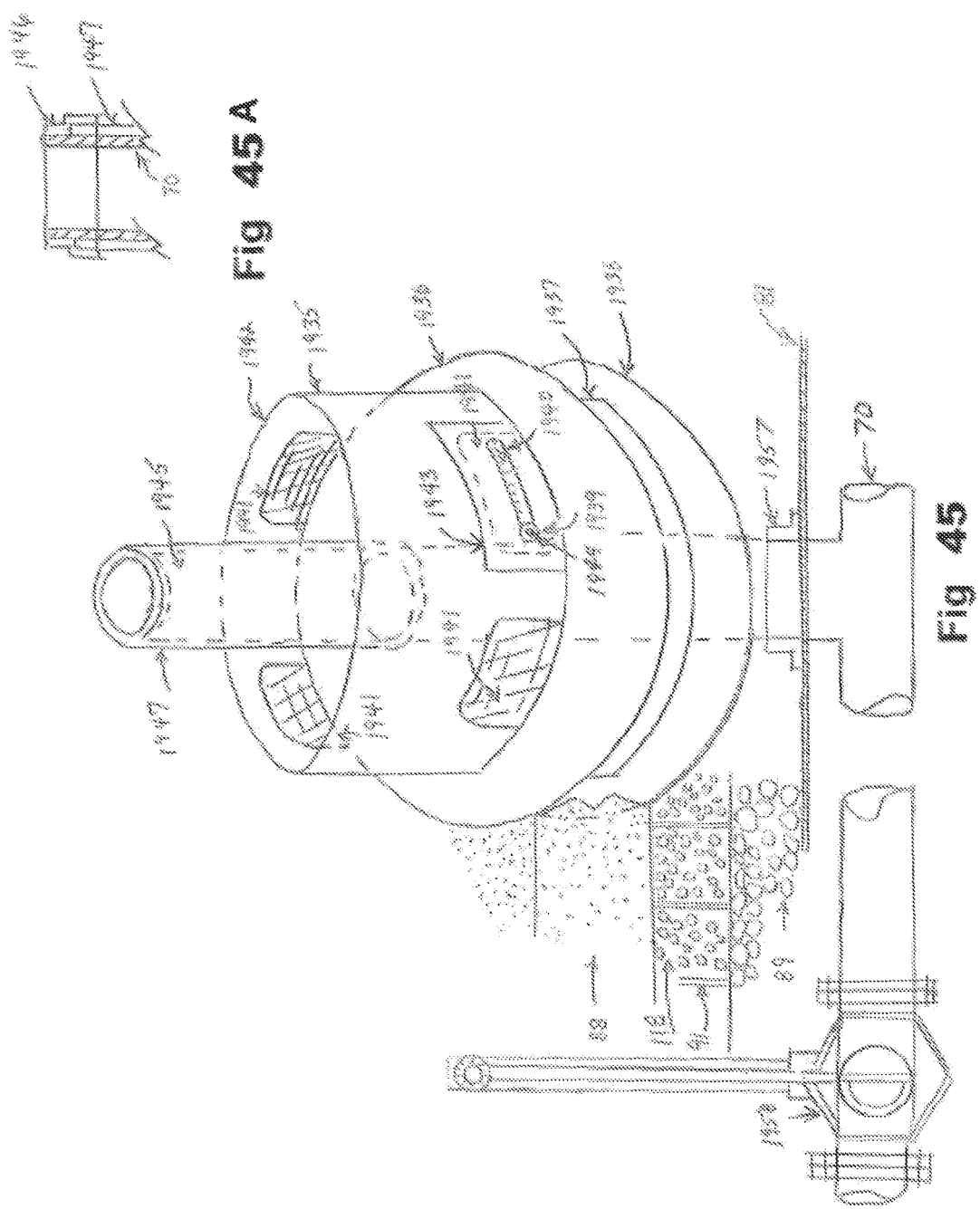

FIG. 45 is a perspective view of an upflow baffle for use with a dewatering system and a partial cross sectional view of a dewatering system;

FIG. 45 A is an enlarged view of the vertical riser of FIG. 45; and

Figure 46:
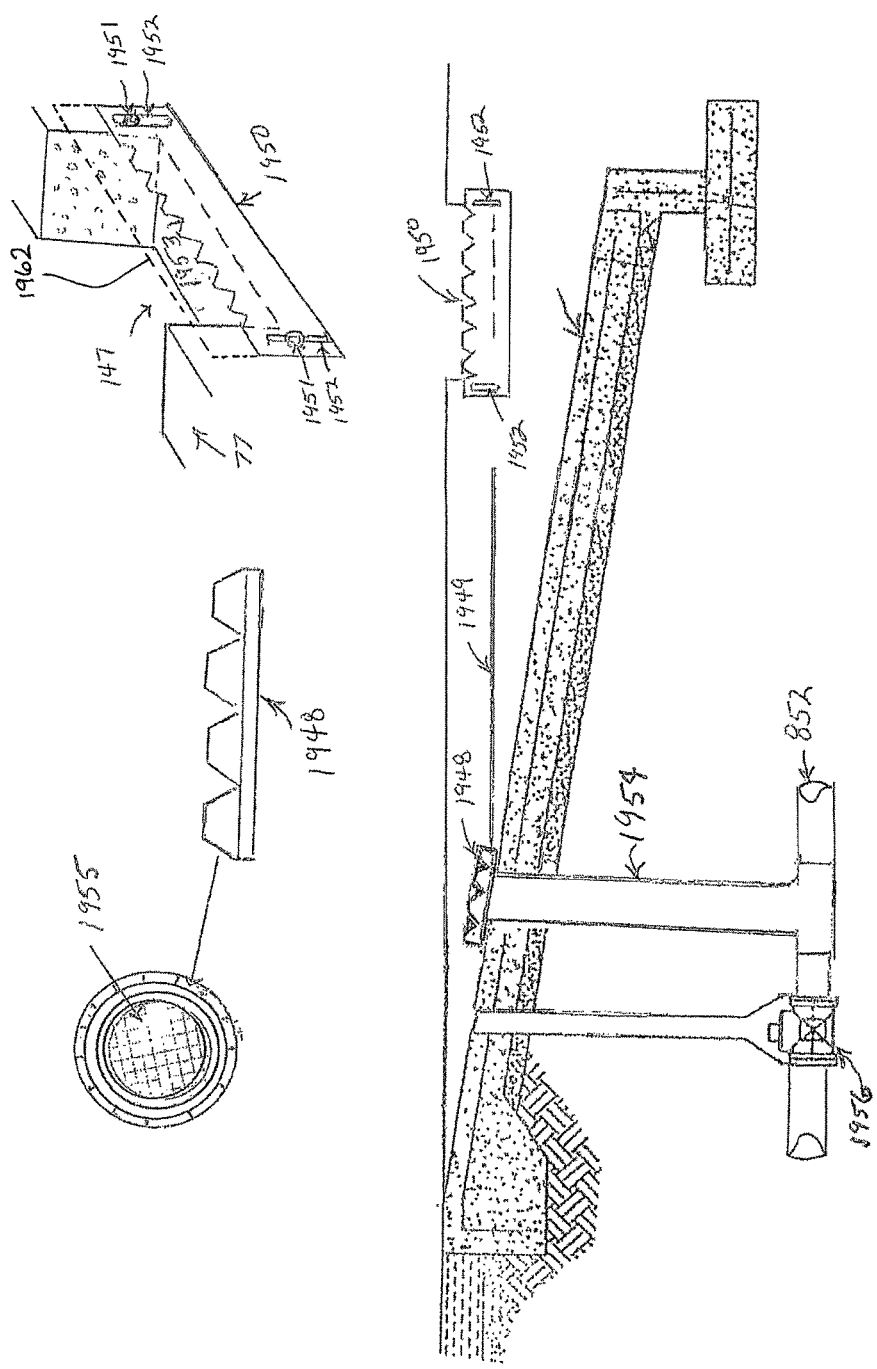

FIG. 46 is a side cross sectional view and an overhead view of a surface skimmer for use with a dewatering system and an elevated perspective view of an adjustable flat weir positioned between adjacent dewatering system.

One illustrative feature of the overall scheme of the present disclosure is to r a dewatering process, such as the prior Deskins patented process, inventions and equipment mobile. This involves disassembling, moving and assembling all of the individual components. Another illustrative feature of the present disclosure also includes a mobile alternative energy generator (98a) with or on a trailer to power the process. This invention further includes weight wall sections FIG. 39A (983). The new wall sections (983) are designed to be ridge construction, and connected together with water-tight joints (992) to form a continuous which is used to contain the dewatering apparatus. Exemplary dewatering apparatus includes equipment of the process in Deskins' prior art U.S. Pat. Nos. 5,683,583, 5,611,921, 5,660,733, 5,725,766, 5,770,056, 6,051,137, 7,691,261, and 7,494,592.

Figure 1:
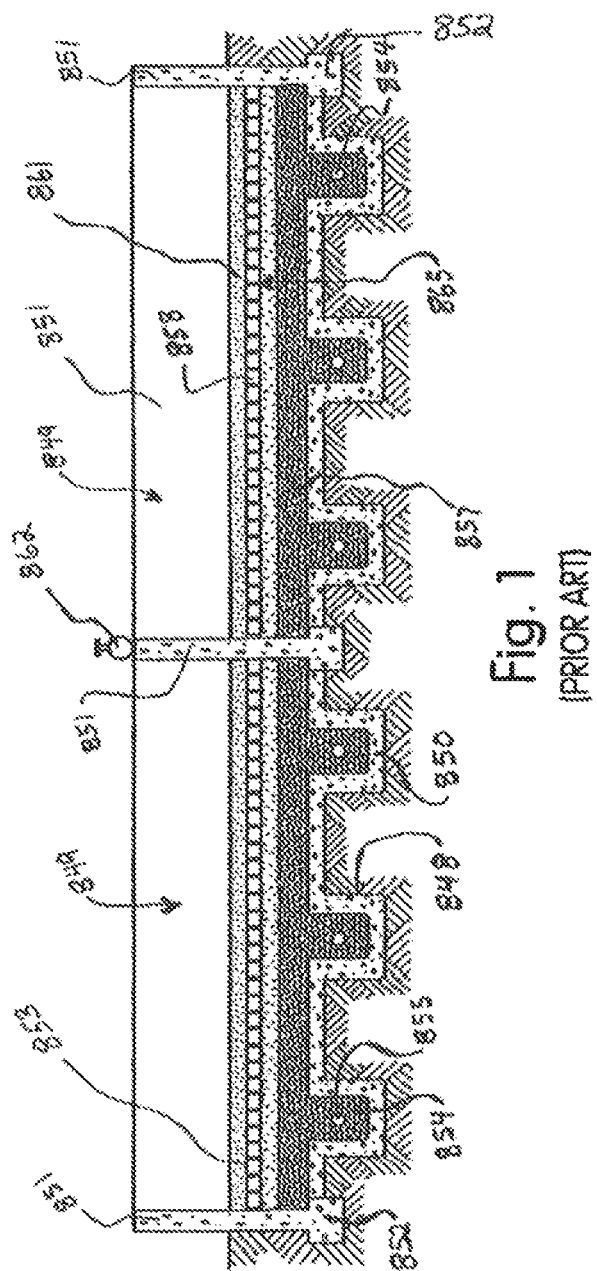
Figure 2:
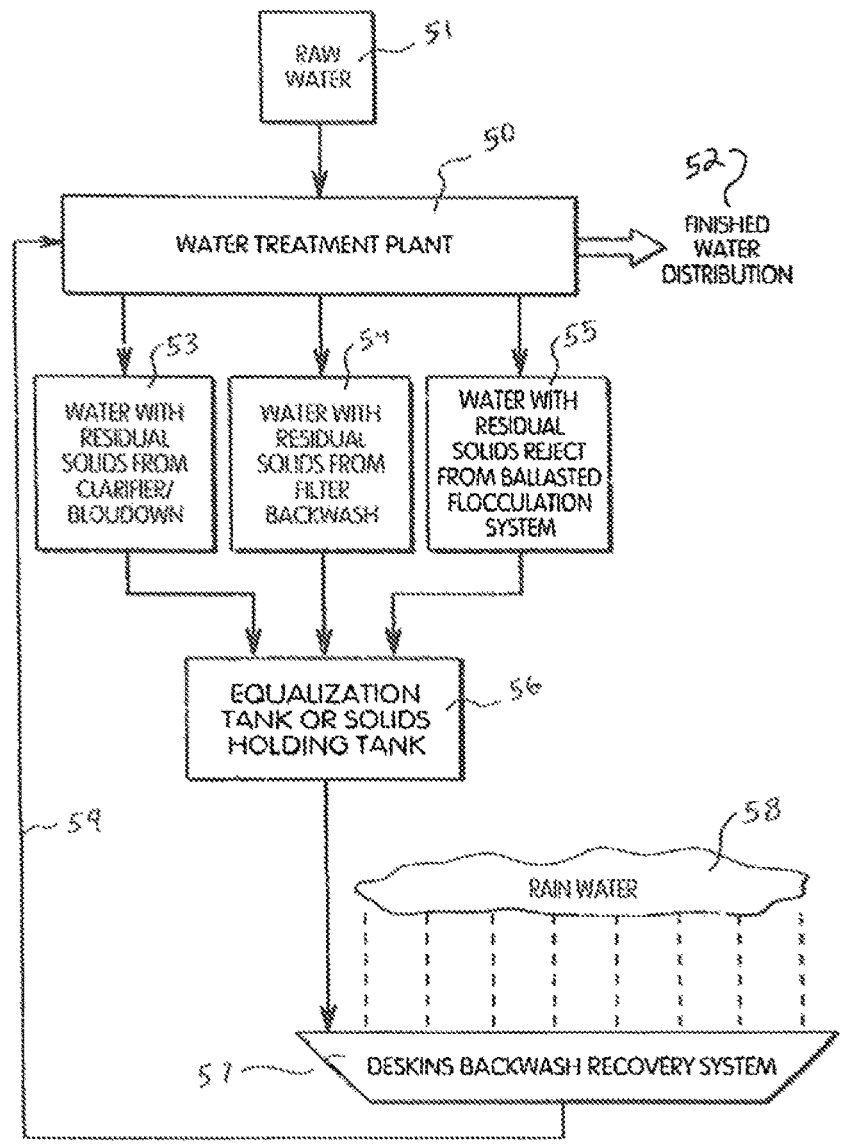
FIG. 2 (prior art) is a schematic diagram of the steps or stages in a preferred embodiment of the processes/methods.
Figure 3:
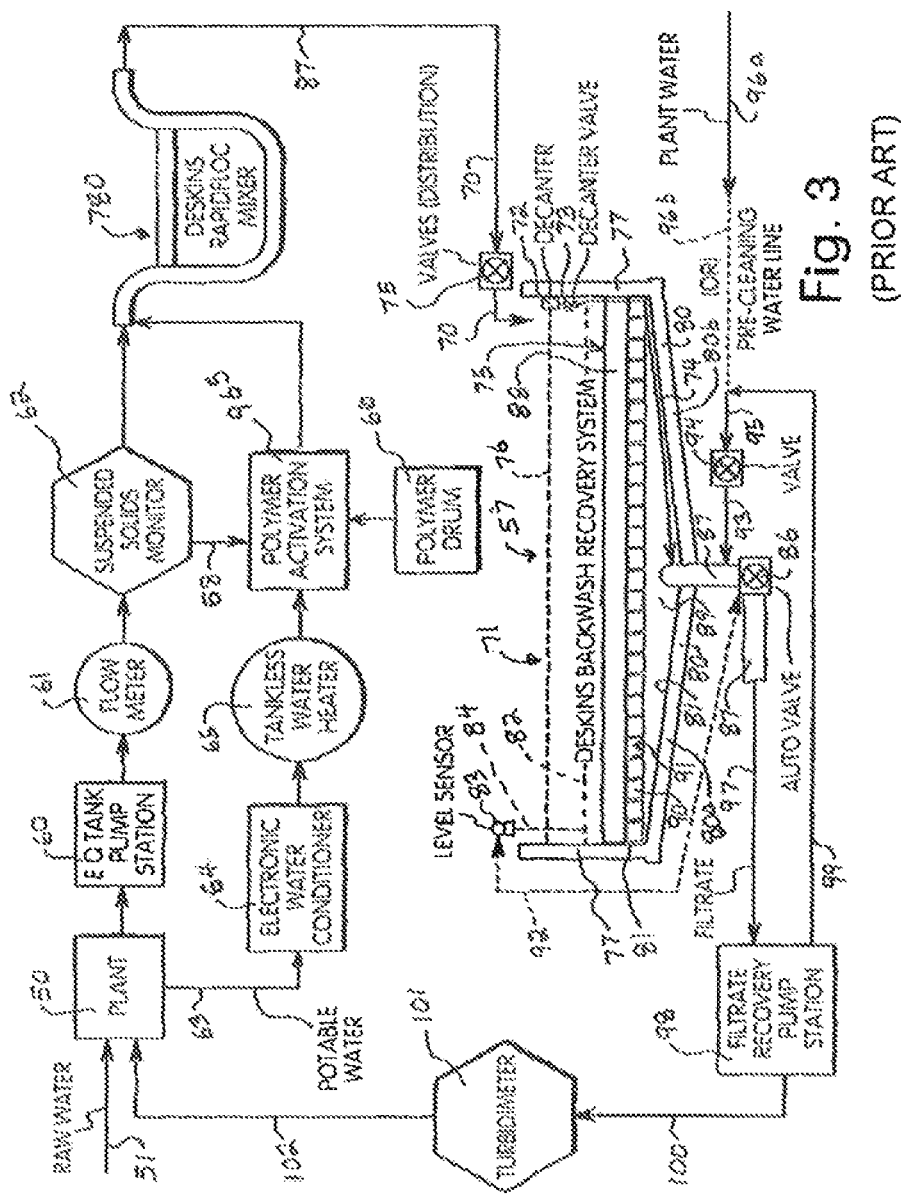
FIG. 3 (prior aft) is a detailed schematic diagram of a preferred embodiment of the processes/methods.
Figure 4:
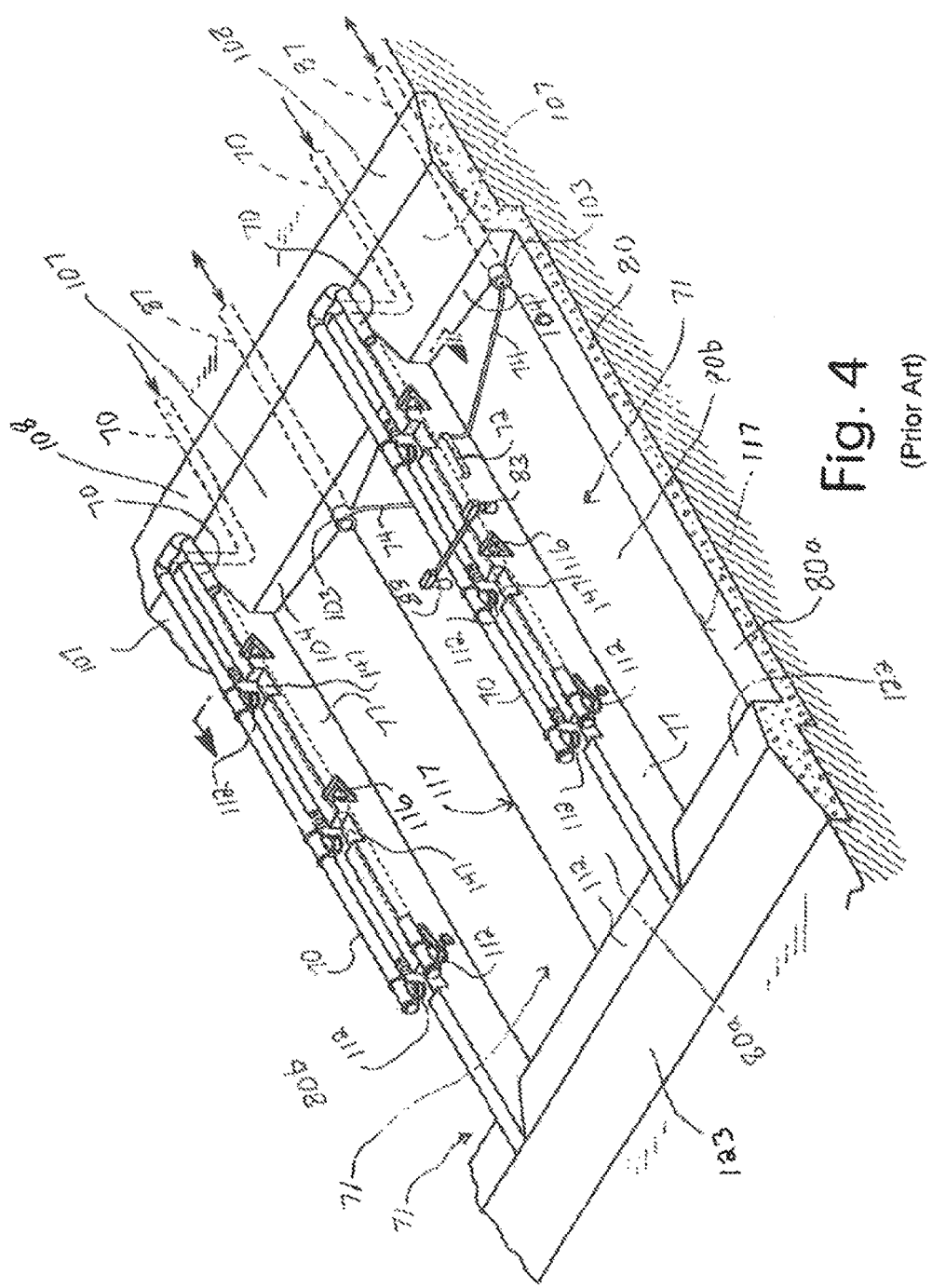
FIG. 4 (prior art) is a perspective view of a preferred embodiment of one of the containers bf the granular filter media dry cell, filter or bed for dewatering a composition composed of water and particulate solids.
Figure 5:
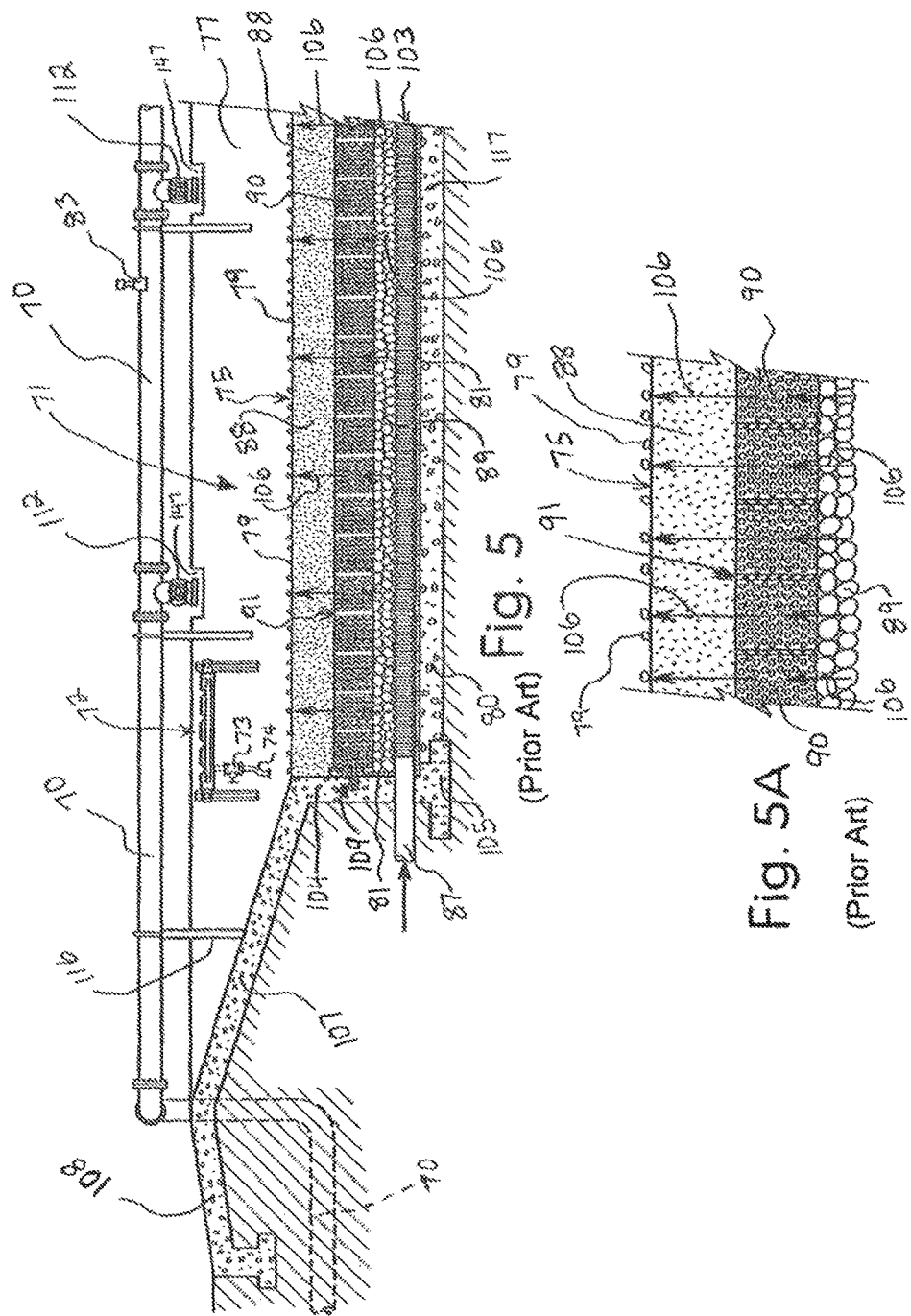
FIG. 5 (prior art) is a side elevational view of a cross-sectional view in FIG. 4, with the granular filter media present, of the composition precleaning step in a preferred embodiment of the prior art invention.
Figure 6:
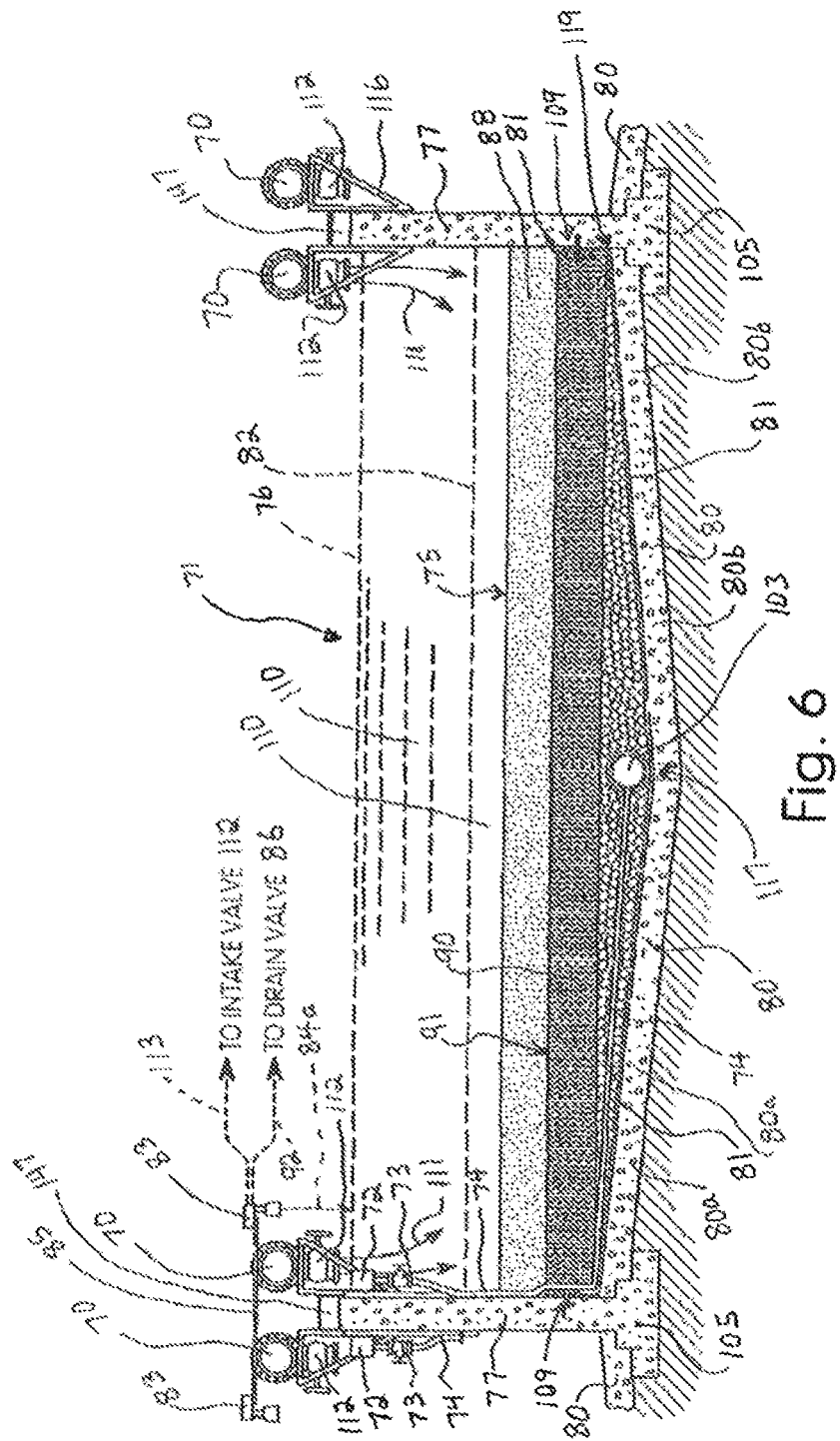
FIG. 6 (prior art) is a front elevational view of a cross-sectional view, as indicated in prior art FIG. 4, with the granular filter media present with insertion of the liquid composition as the start of the first cycle of the dewatering scheme of the (prior art) Deskins process for combining solids, thickening and retrieving in one vessel.
Figure 7:
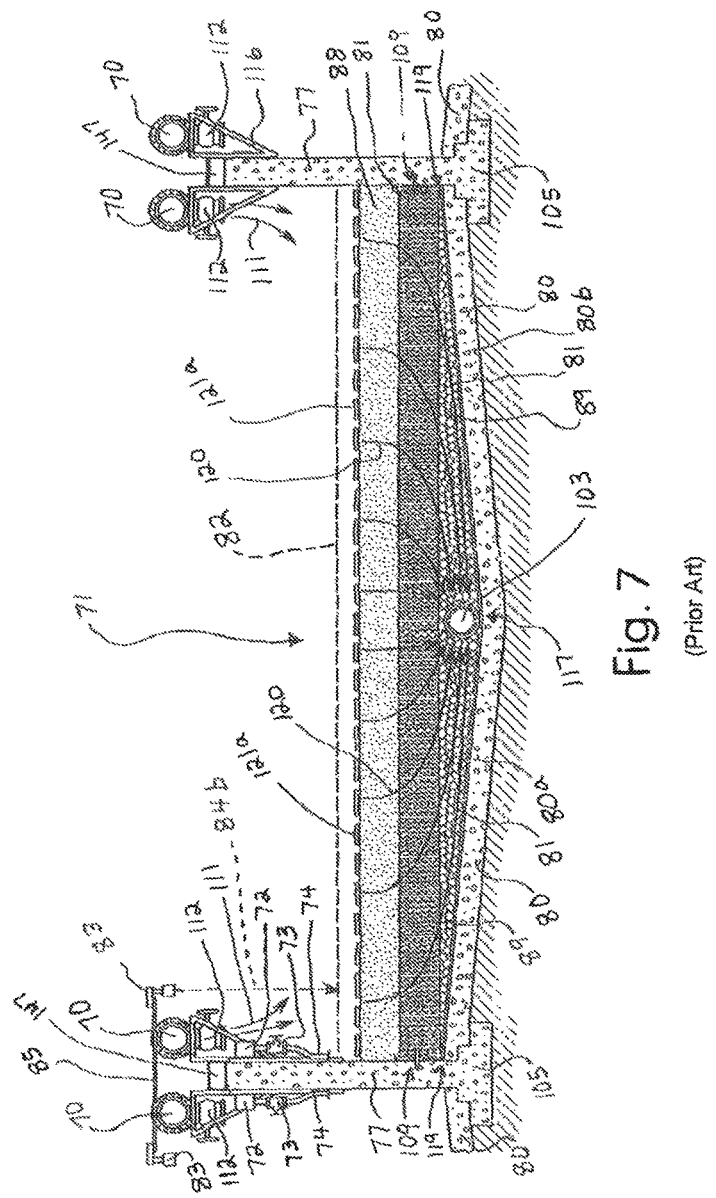
FIG. 7 (prior art) is a front elevational view of a cross-sectional view, as indicated in FIG. 4, with the granular filter media present, with the filtration of the first cycle complete.
Figure 8:
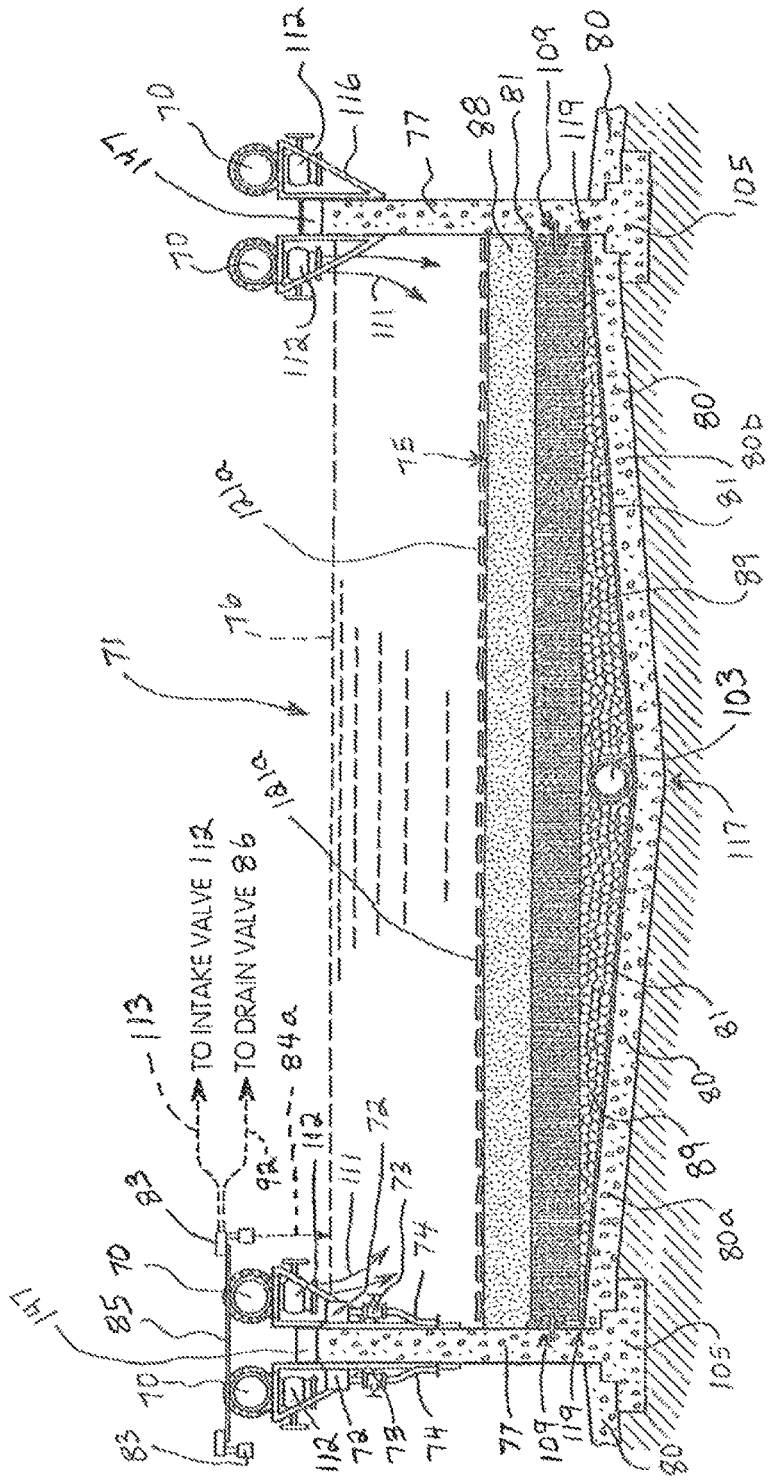
FIG. 8 (prior art) is a front elevational view of a cross-sectional view, as indicated in FIG. 4, with the granular filter media present, with the start of the second dewatering cycle.
Figure 9:
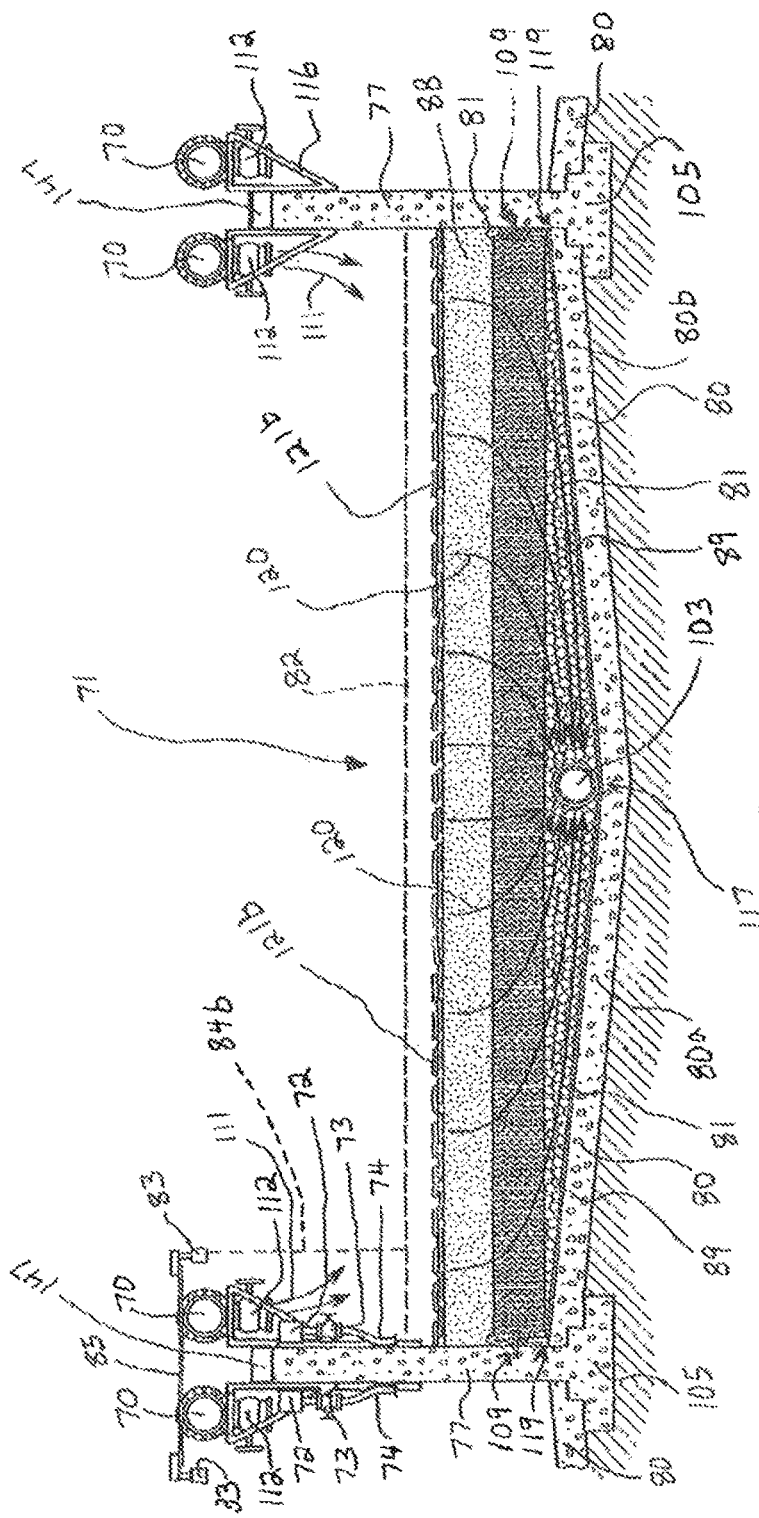
FIG. 9 (prior art) is a front elevational view of a cross-sectional view, as indicated in I think it a vacuum drying bed.
Figure 10:
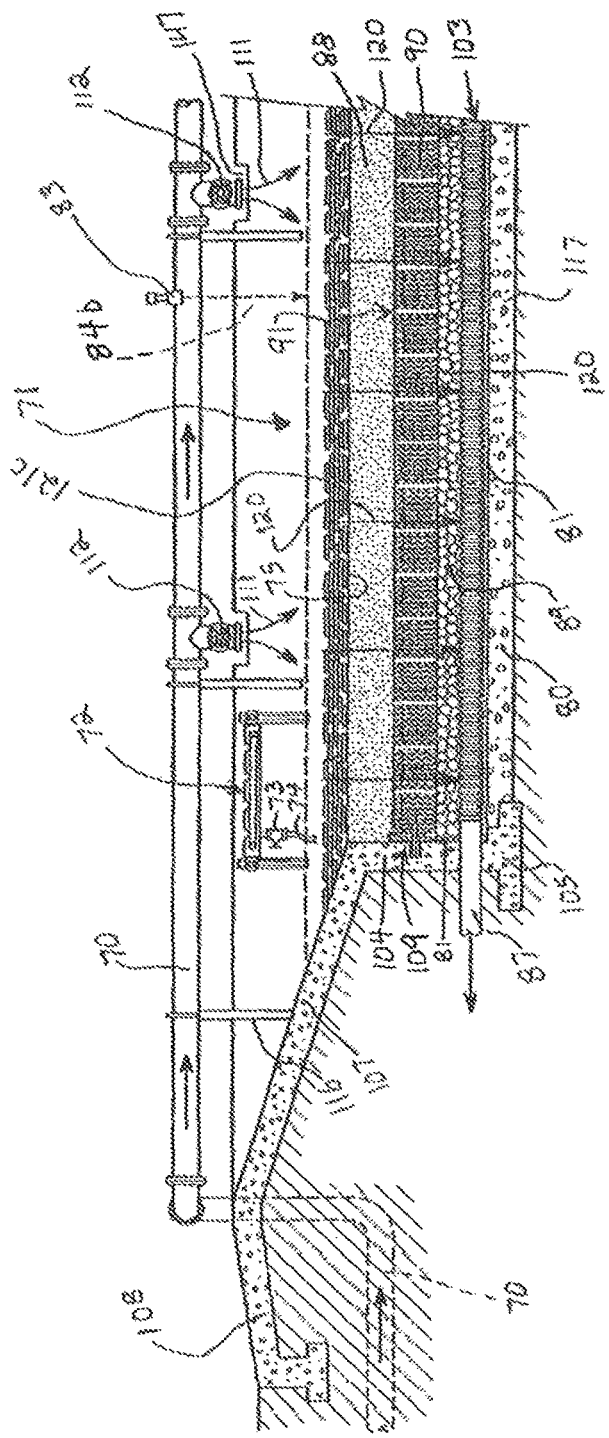
FIG. 10 (prior art) is a side elevational view of a cross-sectional view, in FIG. 4, with the granular filter media present, with the filtration of a further cycle complete.

Such prior art (FIG. 3) includes a granular filter media dry cell (90) (of filter or bed) for dewatering a liquid composition of water and particulate solids. The liquid composition is applied to the granular filter media to remove water from the liquid composition by pas through the granular filter media with the particular solids collecting on the top surface granular filter media (88). Water is first allowed to fill from below to just above the top lays the filter media for the purpose of cleaning the three layers of media of the filter, leveling sand and causing a pre-saturation process to happen. This water is contained in the filter prior to the loading of the liquid composition of water and particulate solids. At the end of the load cycle, the underdrain valve (94) containing the pre-saturation water is opened causing a natural vacuum to occur accelerating the drainage process. A non-porous liner (81) is located on inner, bottom surface of the container. A drainpipe (103), having small openings, is located on top of the liner in the valley. A porous layer of large filter media (857), with the drain therein, is located in the bottom of the container. A cell media section (91) having passageways, with fine filter media therein, is located on top thereof. A layer of fine filtrate sand (88) is located on top of the grid.

Prior art process involving repeatedly applying the liquid composition to the granular filter media to remove water from the liquid composition by passing through the granular filter media with the particulate solids collecting on top surface of granular filter media. Water is first allowed to fill from below to just above the top layer of the filter media.

The overall scheme of the prior art as regards treatment of water from a water treatment plant (50) to reduce the turbidity thereof and residual solids therein as shown in Fig. Raw water (51) is passed to water treatment plant (50) for treatment that is described in detail in the Background Art section. Finished water is distributed (52) to users from water treatment plant (50). Water (53) with residual solids from the clarifier/blow down, water (55) with residual solids reject from ballasted flocculation system, all the treated water from treatment plant (50) is sent to equalization (EQ) tank (56) or solids holding tank (56).

Water to be treated from equalization tank (56) is passed for treatment into the prior art Deskins backwash recovery system (57). The water into the water treatment plant typically has a turbidity of 50 to 1,500 NTU. The Deskins backwash recovery system (57) treats residual water so that it has a turbidity of 2 NTU or less. Such treated water is returned (59) to water treatment plant (50).

Advantages provided some embodiments of the present disclosure over such prior art patents is enablement of easy and quick disassembly and redeployment of all of the equipment of the process, reduction of material and construction expenses, ease of assembly, ease of disassembly and improvement of overall performance of the process(es), inventions, installations, equipment, etc.

In some illustrative embodiments, a dewatering process according to the present disclosure has many advantages with the particular one of mobility. This mobility enables all equipment from the prior Deskins patented process to be transportable by separating each individual part and placing on transportation racks allowing the equipment to move, as needed, to a new location.

In some illustrative embodiments, a dewatering process produces a small carbon footprint. A carbon footprint is the total set of greenhouse gas (GHG) emissions caused by an organization, event, product or person. It is often expressed in terms of the amount of carbon dioxide, or its equivalent of other GHGs emitted. An individual or organization's carbon footprint is measured by undertaking a GHG emissions assessment. The contractual confidential study prepared for Deskins on the Deskins prior art process GHG emissions "Deskins Greenhouse Gas Comparison Study" by Ch2M Hill proved to be very low when compared to other predominate mechanical dewatering devices in the market provided as Exhibit 1 herewith.

In some illustrative embodiments, a dewatering process is designed for fast installation with high production of quality liquid-solid-separation used anywhere including natural and/or man-made disasters, polluted water supplies, under developed locations of the world, or any polluting source that needs liquid-solid-separation.

In some illustrative embodiments, a dewatering process can also be used to dewater animal waste lagoons, CAFO (Confinement Animal Feed Operations), desalination, collecting rain water, residuals from pulp and paper industries, residuals from chemical and gas manufacturing, food preparation processes, residuals from manufacturing of liquors and wines, treating fraking water, stagnant water supplies, swamps, coal wash water, heavy metal rinse waters, ship wastewater, water reuse, industrial-municipal-agricultural lagoons, agricultural water runoff and storm water runoff sites.

From the United Nations Center, the UN News Service states "28 Jul. 2010 General Assembly Declares Access To Clean Water And Sanitation Is A Human Right-Safe and clean drinking water and sanitation is a human right essential to the full enjoyment of life and all other human rights, the General Assembly declared today, voicing deep concern that almost 900 million people worldwide do not have access to clean water."

The impact of low access to water and sanitation represents a substantial drag on socioeconomic development in many countries. In some areas, the lack of water availability and especially clean water availability is life threatening. A dewatering process according to some illustrative embodiments of the present disclosure is mobile, inexpensive, easy to operate and would be a boundless asset to any area needing access to water and sanitation solutions.

In some illustrative embodiments, a dewatering process, as shown in FIG. 37 makes all components and equipment of the Deskins prior art process transportable with the use of light weight wall sections (983) and a portable generator (984) to power the polymer preparation unit (965) and when required a sludge transfer pump. Some illustrative embodiments provide a very preferable feature that allows all of the equipment and components of the process to be engineered, fabricated, packed in transportation devices, stored and ready to be immediately deployed and installed where needed. These embodiments can be installed and operated inland or costal, is easy to install and operate, low cost to maintain and does not require local or site electricity.

In some illustrative embodiments, a dewatering process according to the present disclosure is meant for most kinds of soil but certain apparent engineering cautions should be taken in specific conditions. Examples of engineering cautions are a marshland or quicksand, etc. If there is a high water table, a pressure relief well should be inserted into the ground to keep system and equipment from rising. Building in sand depending on grain structure and water table and so forth, is unique by possibly having to engineer the support posts deeper, an inverted T-shape foundation pad underground or upon piers that go into the ground typically to bedrock.

Figure 11:
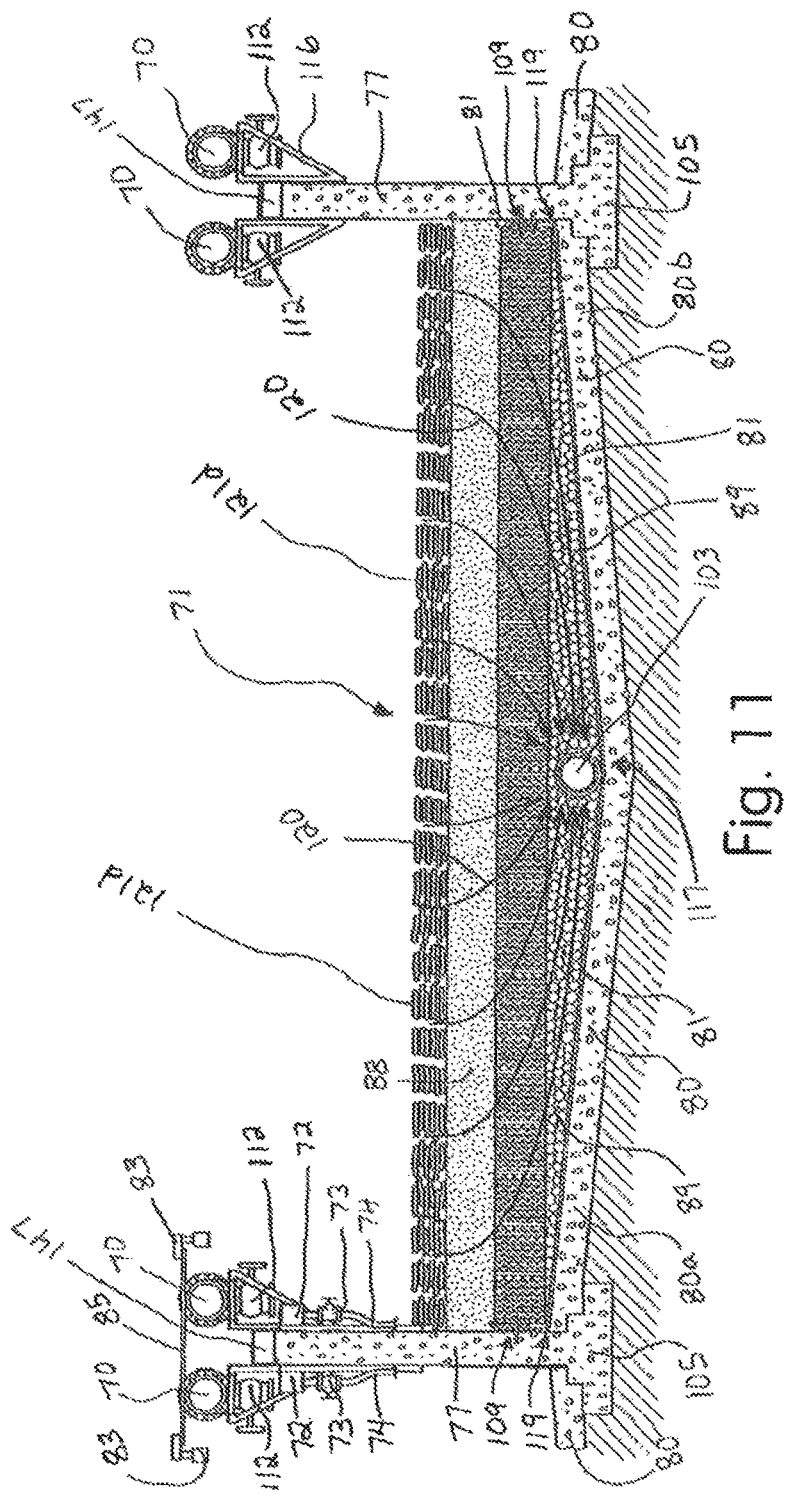
FIG. 11 (prior art) is a front elevational view of a cross-sectional view, as indicated in prior art FIG. 4, with the granular filter media present, with the last cycle of the process completed.
Figure 12:
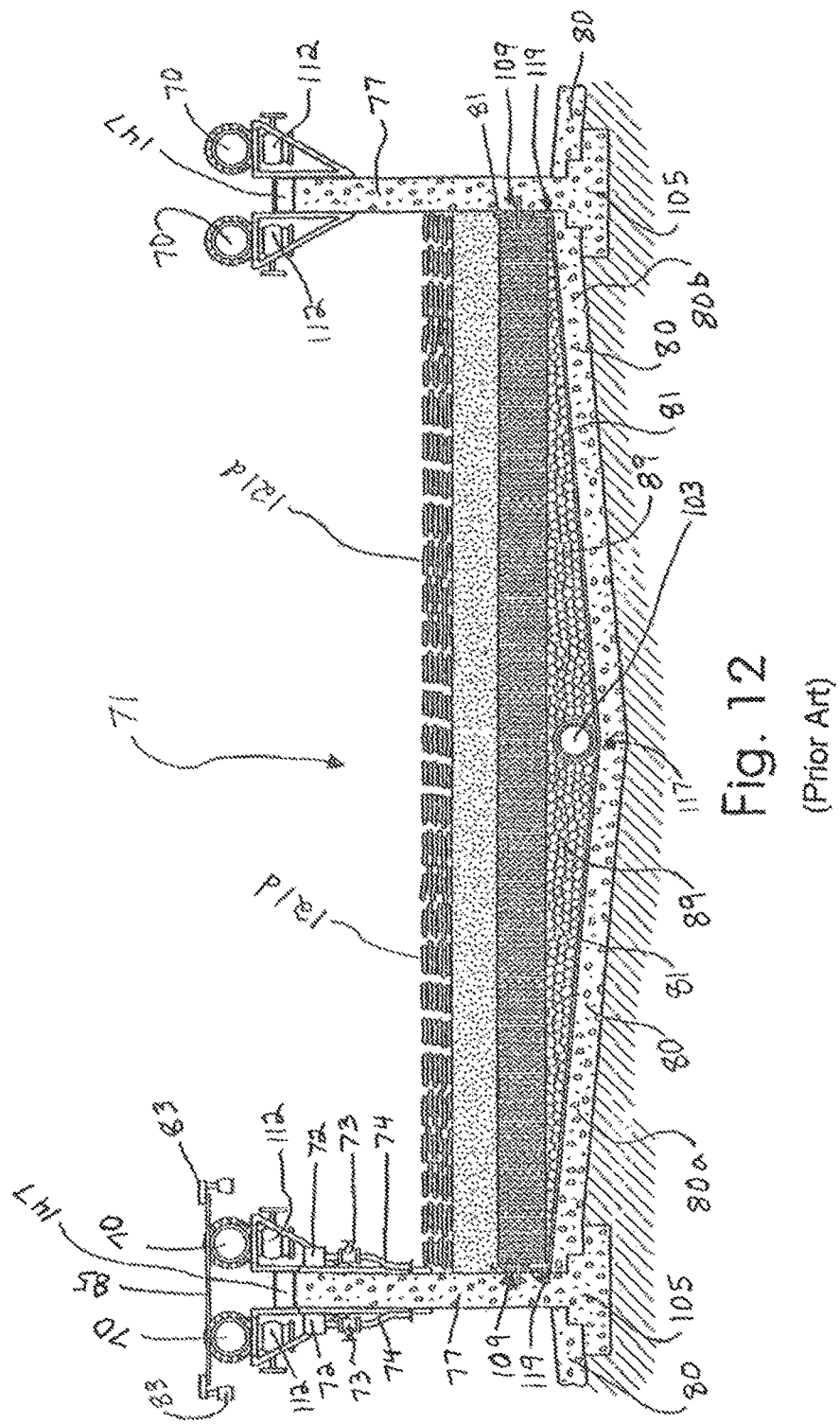
FIG. 12 (prior art) is a front elevational view as indicated in FIG. 4, with the granular filter media present, with the last cycle of the process' completed.
Figure 13:
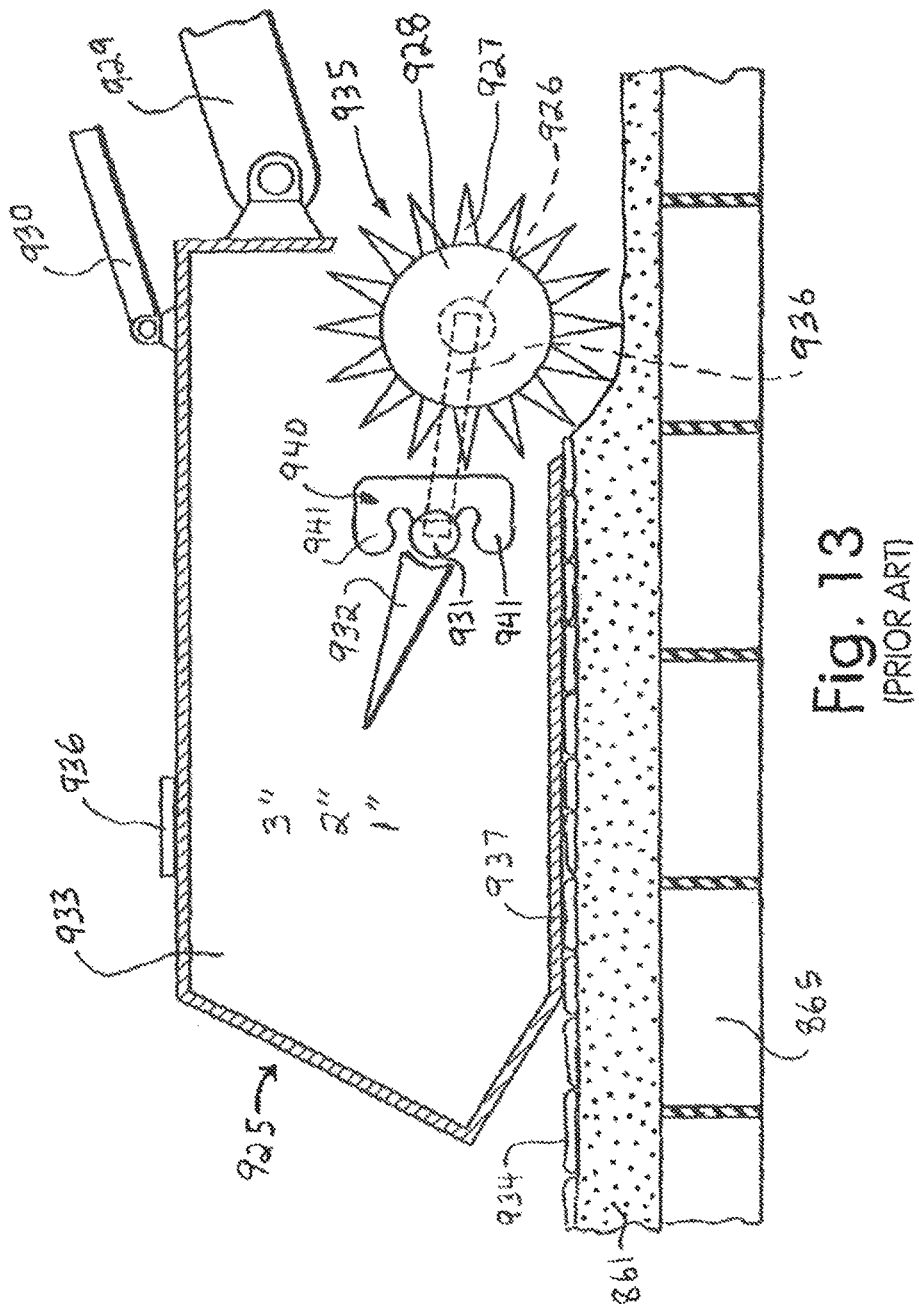
FIG. 13 (prior art) is a side elevational view of the sludge retriever, of the previous Deskins process-scheme, operating on the top of a sludge drying sand bed which includes sand-cell media.
Figure 14:
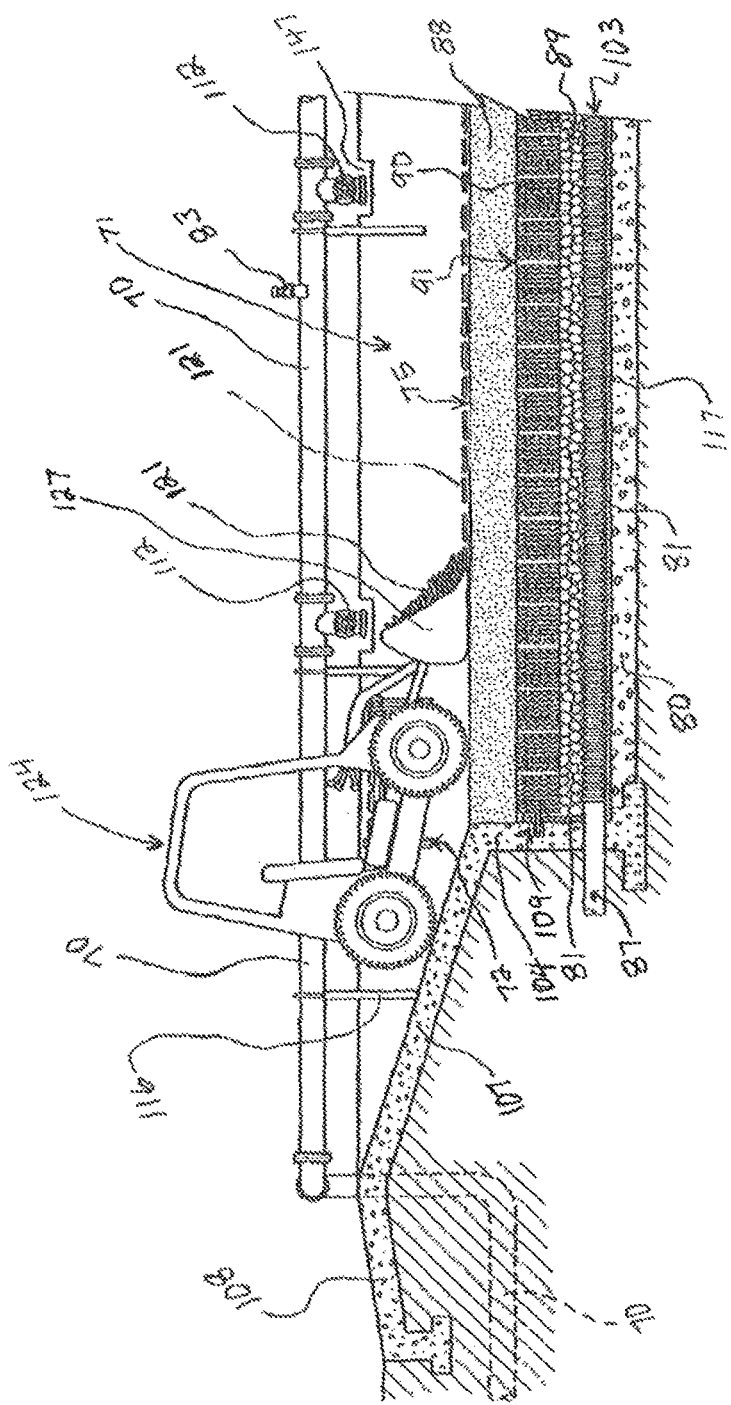
FIG. 14 (prior art) is a side elevational view of a cross-sectional view of the front end loader operating on and removing sludge from top of the sand layer of the prior art invention.
Figure 19:
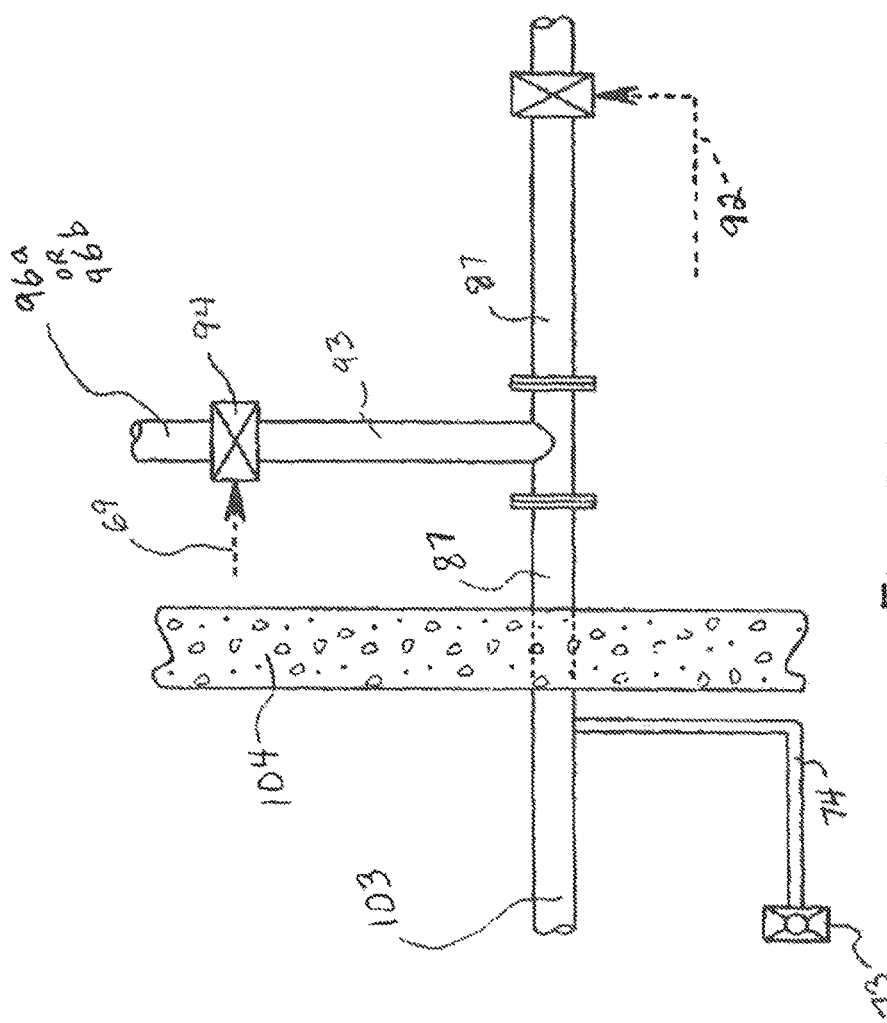
FIG. 19 (prior aft) is a partial top view of the drain piping and associated piping.
Figure 20:
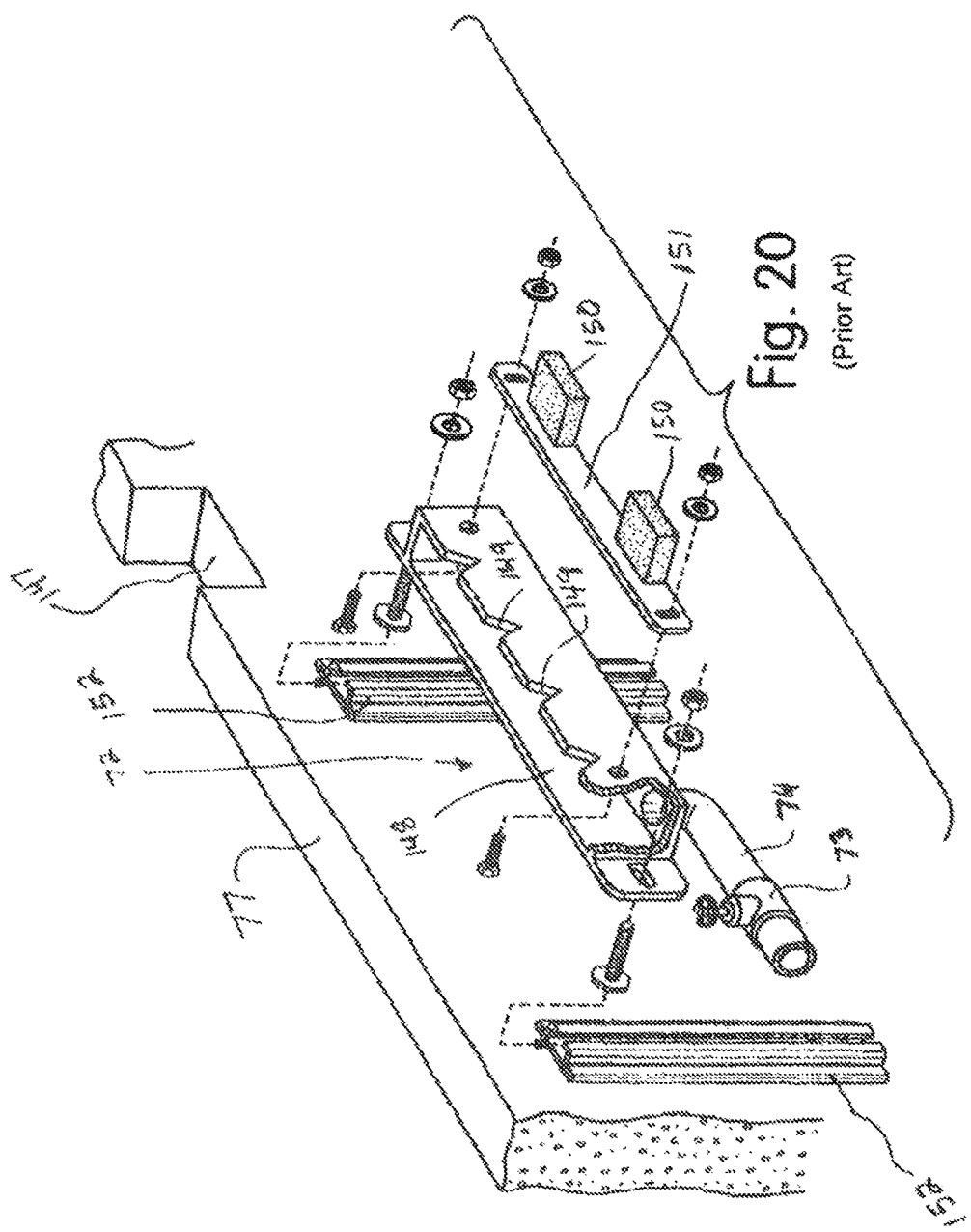
FIG. 20 (prior art) is an exploded perspective view of the decanter assemblage.
Figure 21:
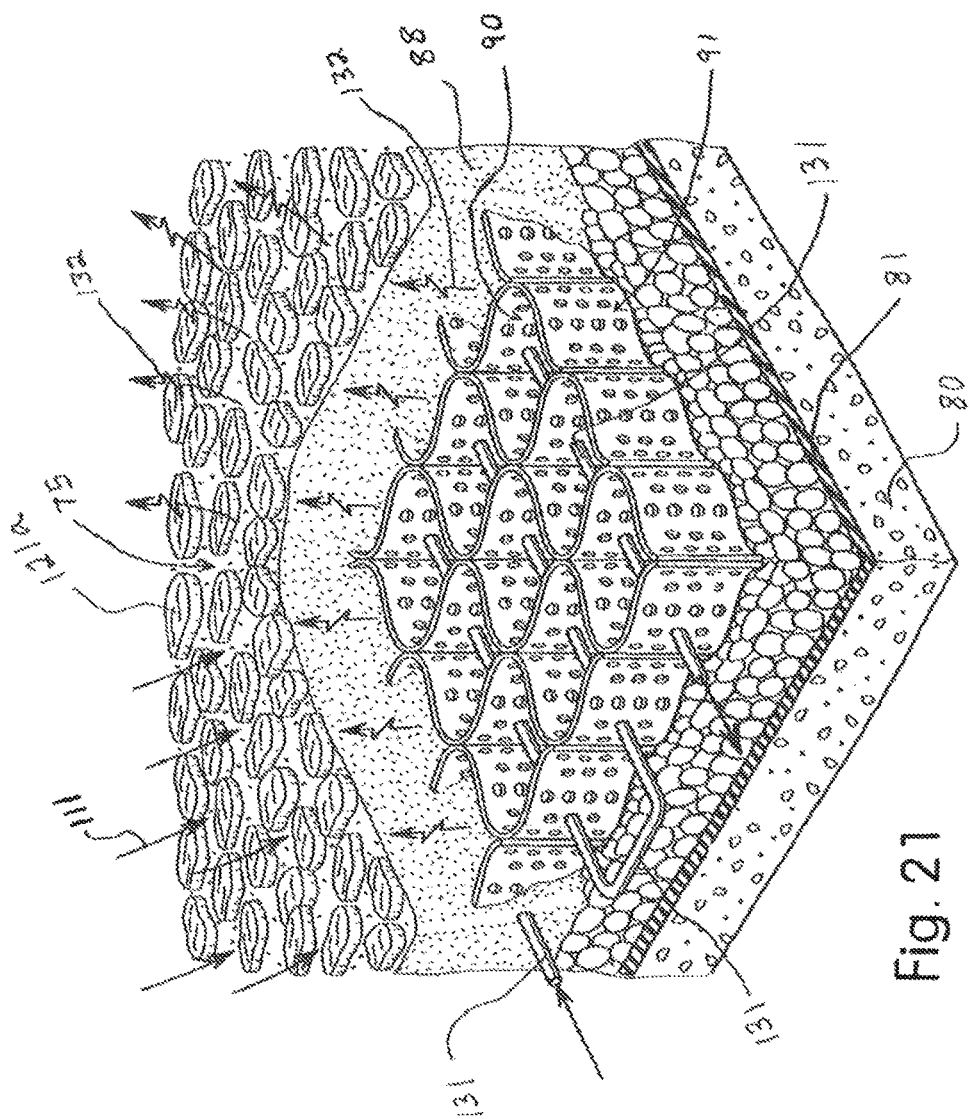
FIG. 21 (prior art) is a cutaway and vertical cross-sectional perspective view of part of the filtration system.
Figure 22:
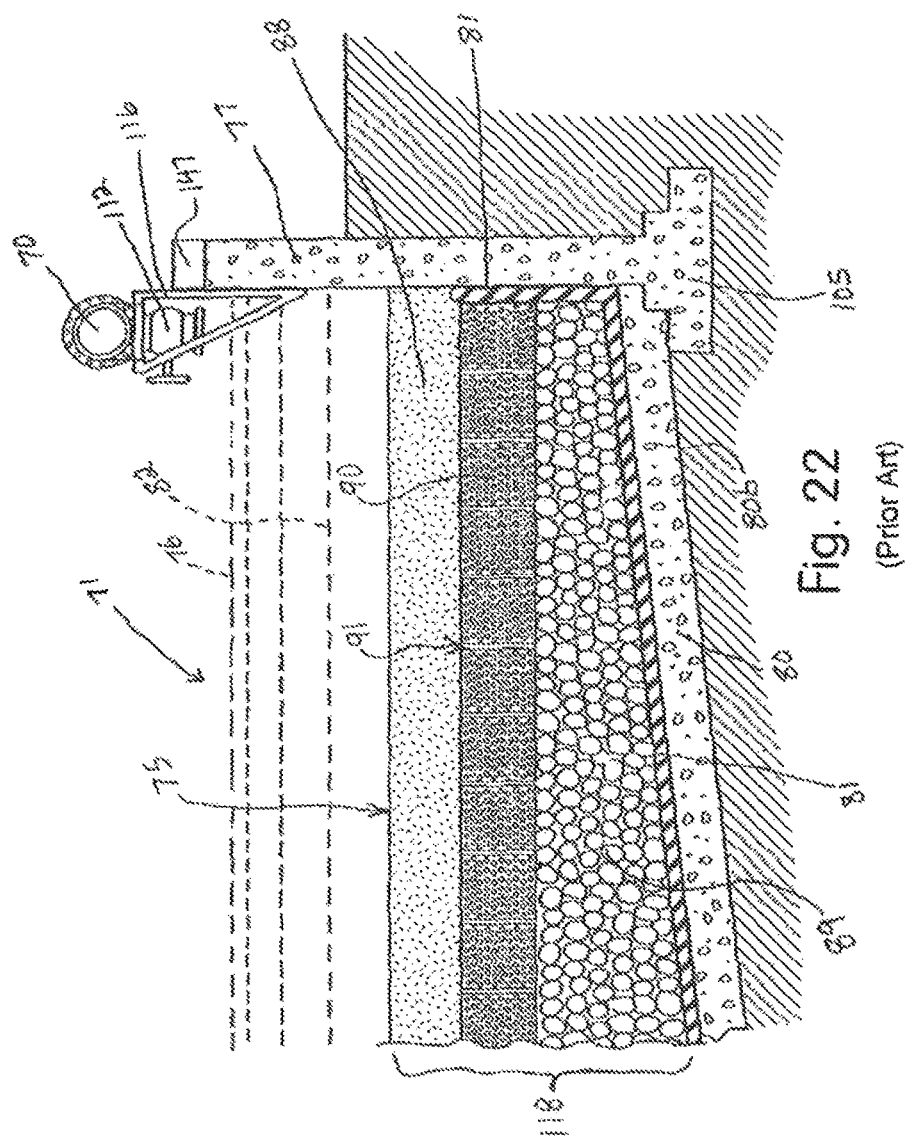
FIG. 22 (prior art) is a partial, vertical cross-sectional view of one embodiment of the previous Deskins process-scheme.
Figure 23:
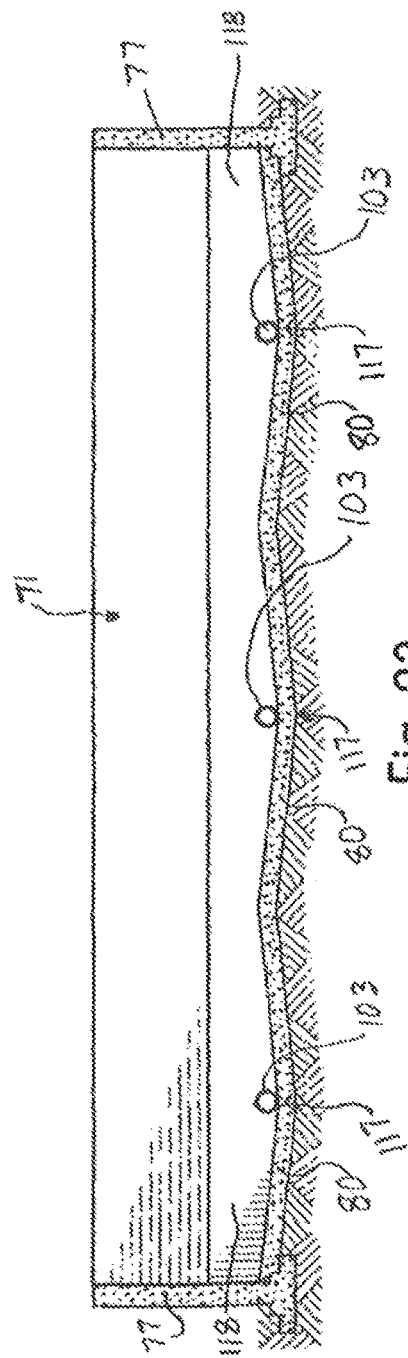
FIG. 23 (prior art) is a front-elevational view of a cross-sectional view container, including the granular filter media, of the prior art invention.
Figure 24:
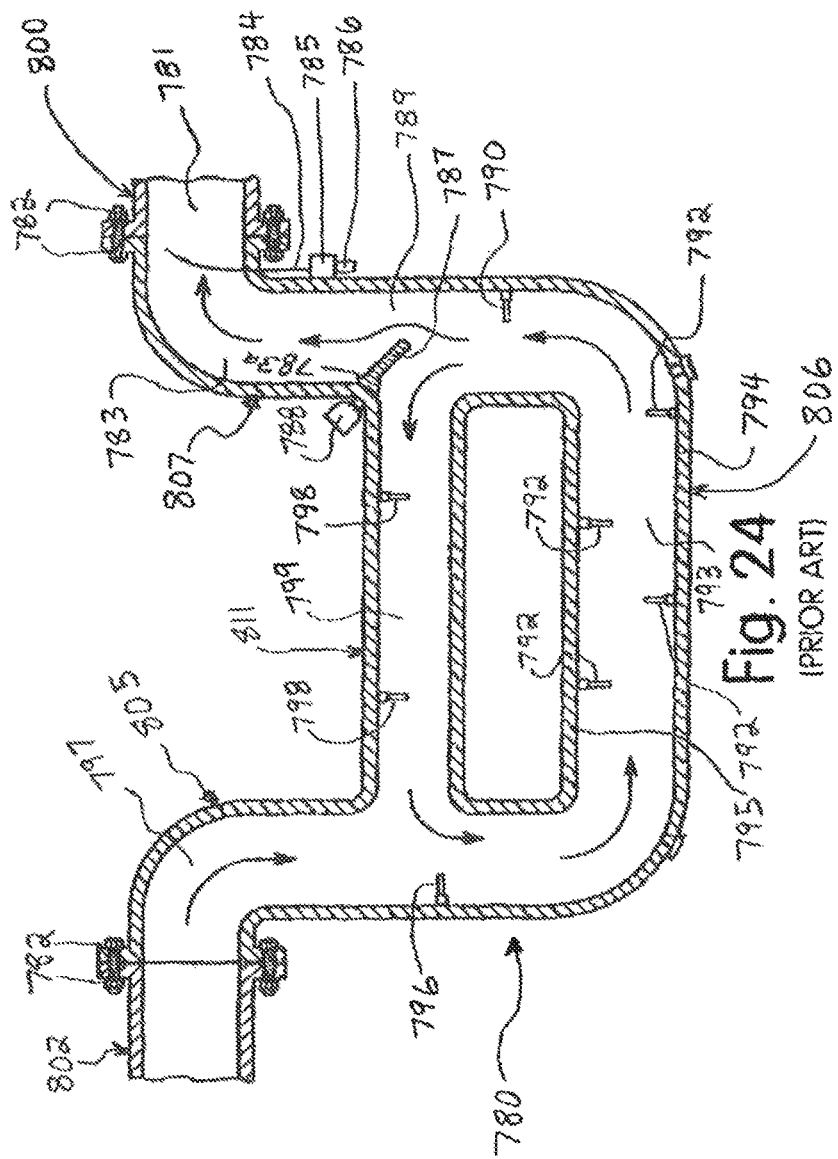
FIG. 24 (prior art) is a side-cross-sectional view of the mixing flocculating unit of the previous Deskins process-scheme.
Figure 25:
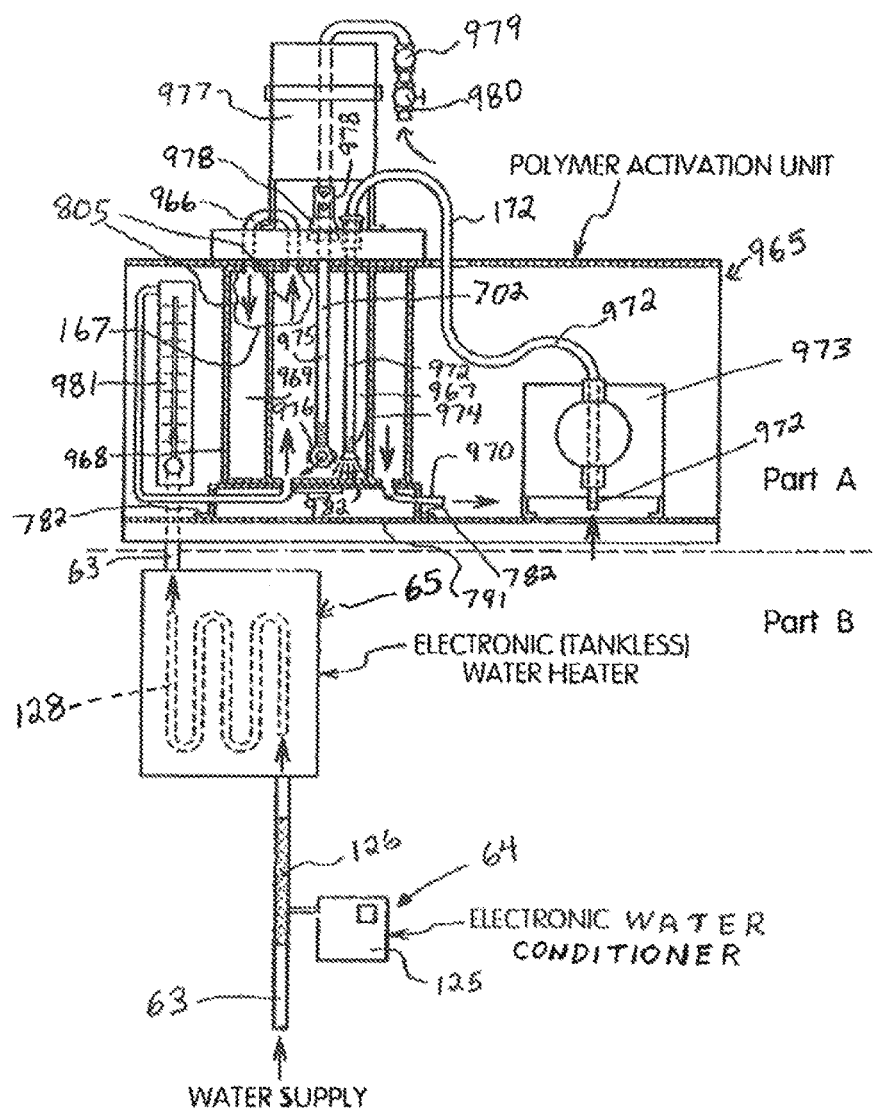
FIG. 25 (prior art) is a side elevational view, partially cutaway, Part A, of the polymer mixing-feeding device of the previous Deskins process scheme, and Part B that represents the water supply for the prior art invention.
Figure 26:
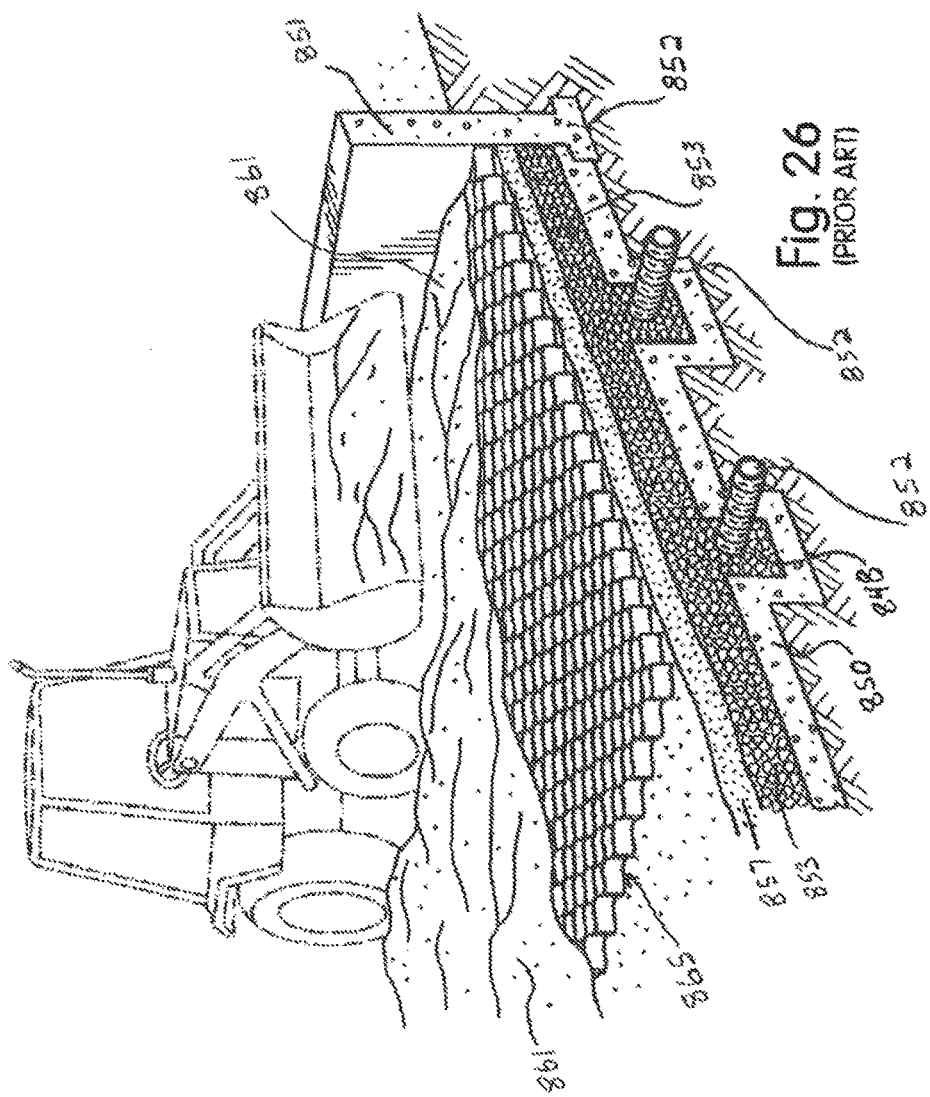
FIG. 26 (prior art) is a perspective view with vertical cross-sectional view of the sand filter set-up of the previous Deskins process-scheme.
Figure 27:
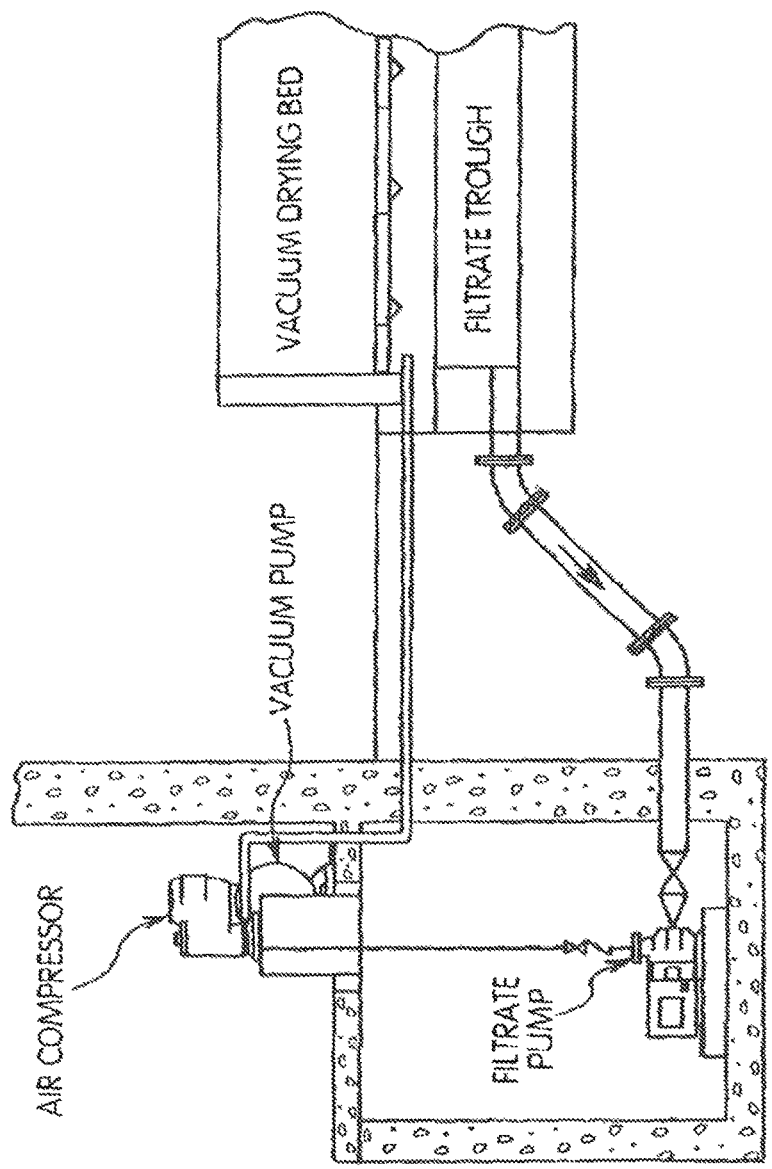
FIG. 27 (prior art) is a side elevational view, partially cutaway of a prior art invention installation.
Figure 28:
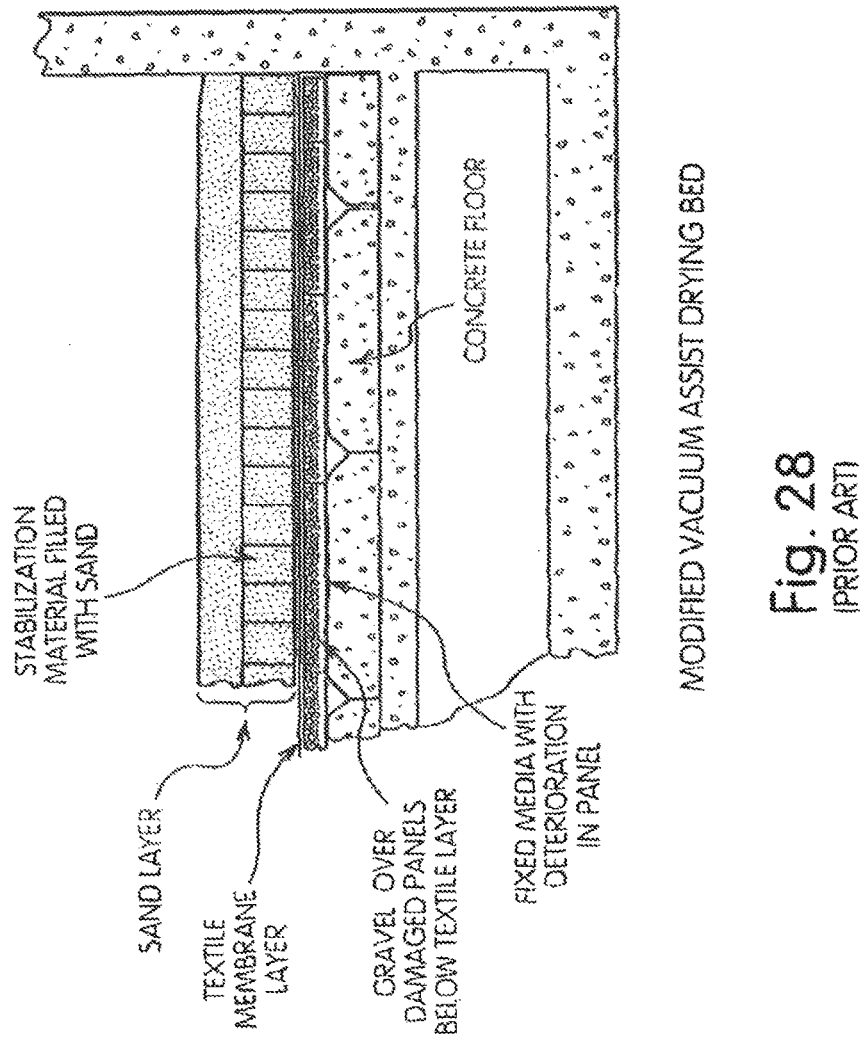
FIG. 28 (prior art) is a partial, side elevational view of the modified drying bed of FIG. 7.
Figure 29:
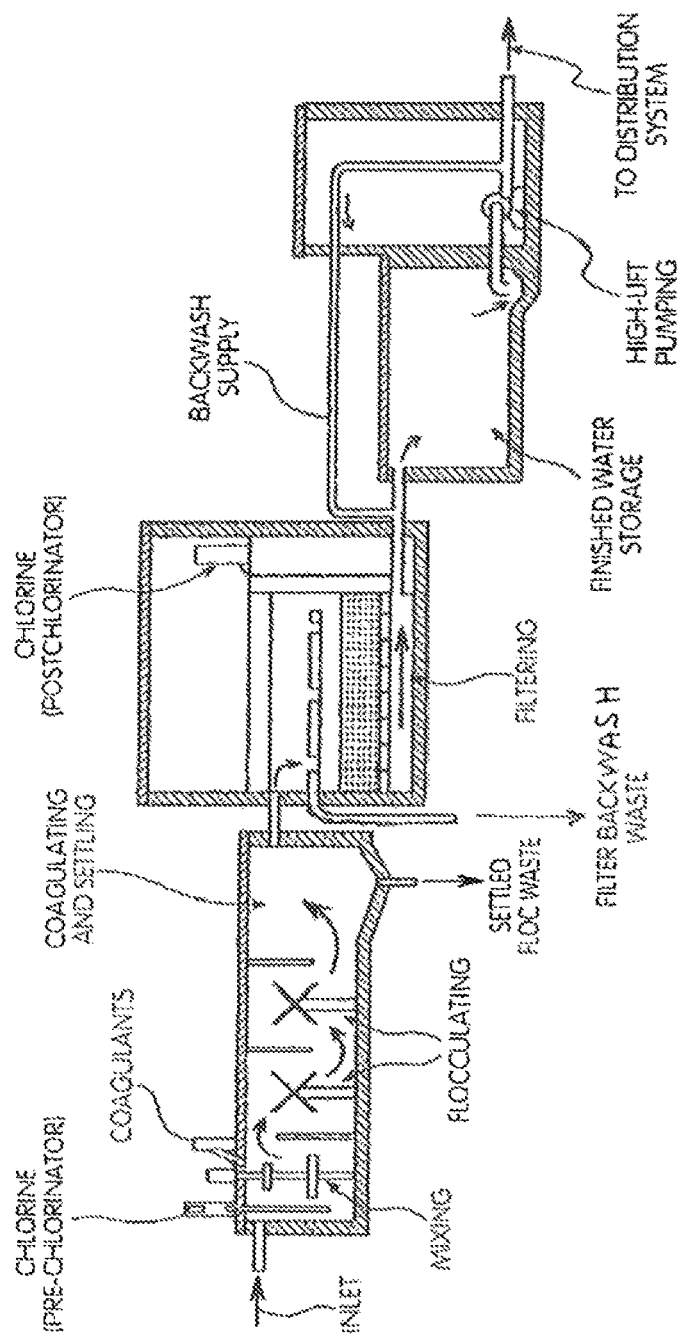
FIG. 29 (prior art) is a diagrammatic scheme of the parts of a prior art type of a water treatment plant.
Figure 34:
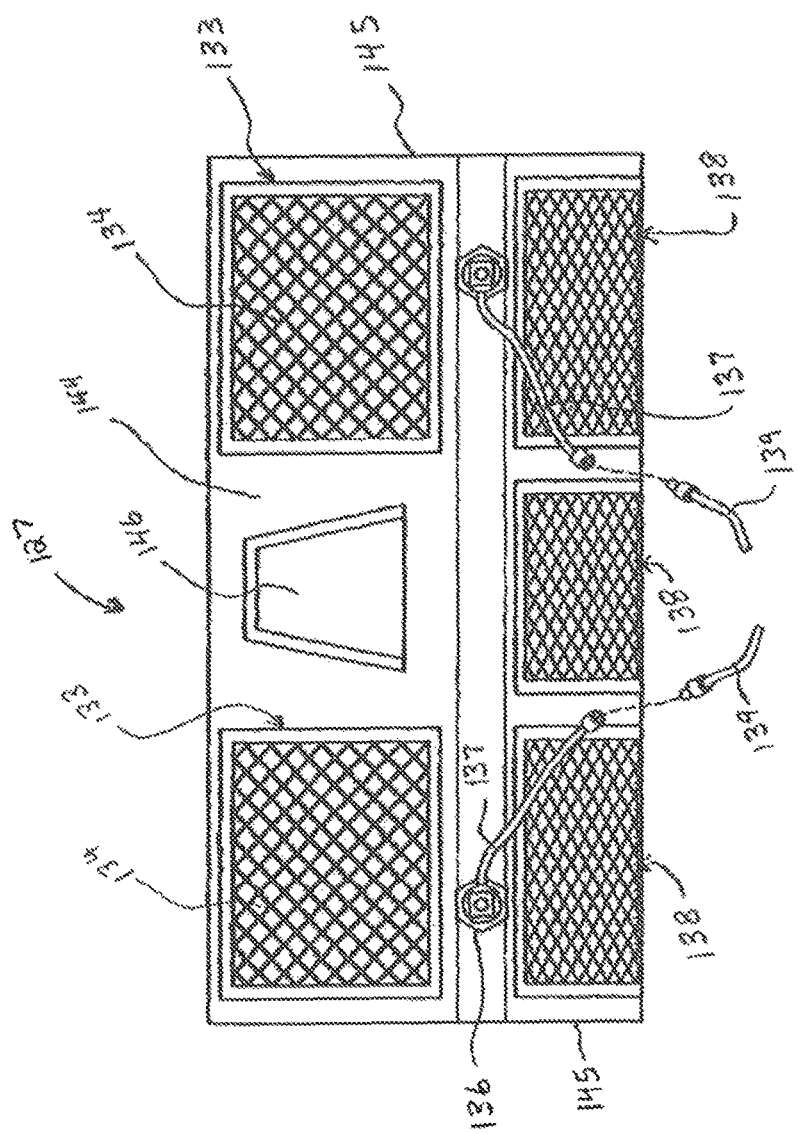
FIG. 34 (prior art) is a back elevational view of the bucket of the previous invention.
Figure 35:
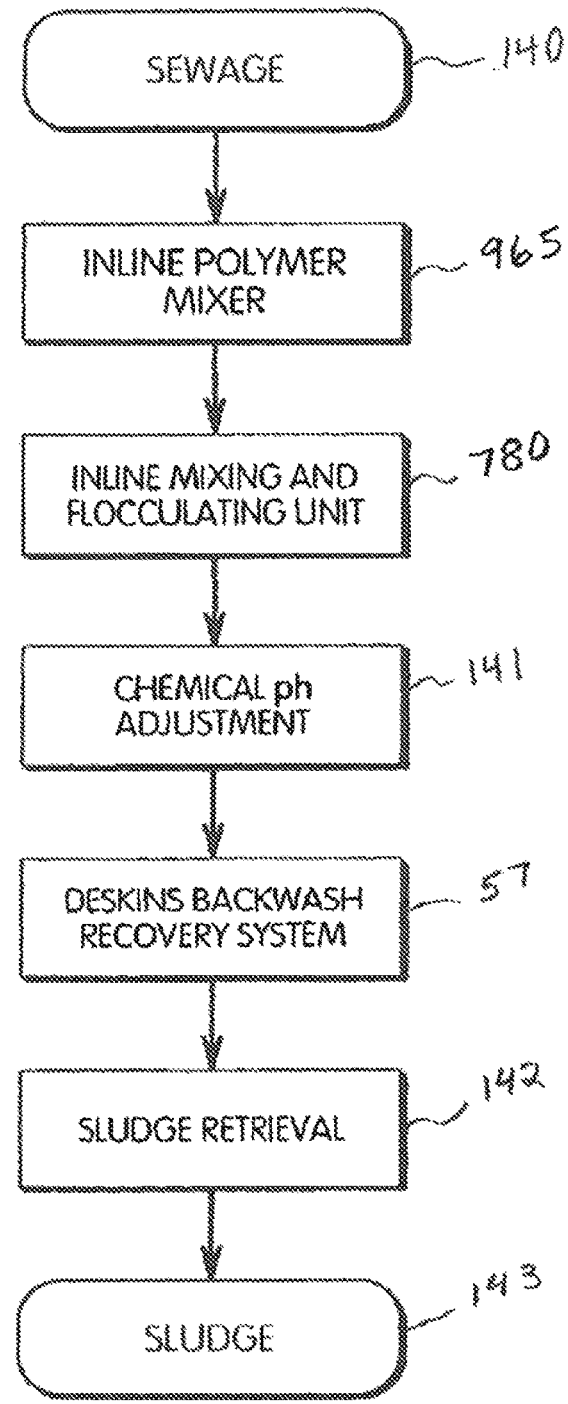
FIG. 35 (prior art) is a diagrammatic scheme of a process of the previous invention.
Figure 36:
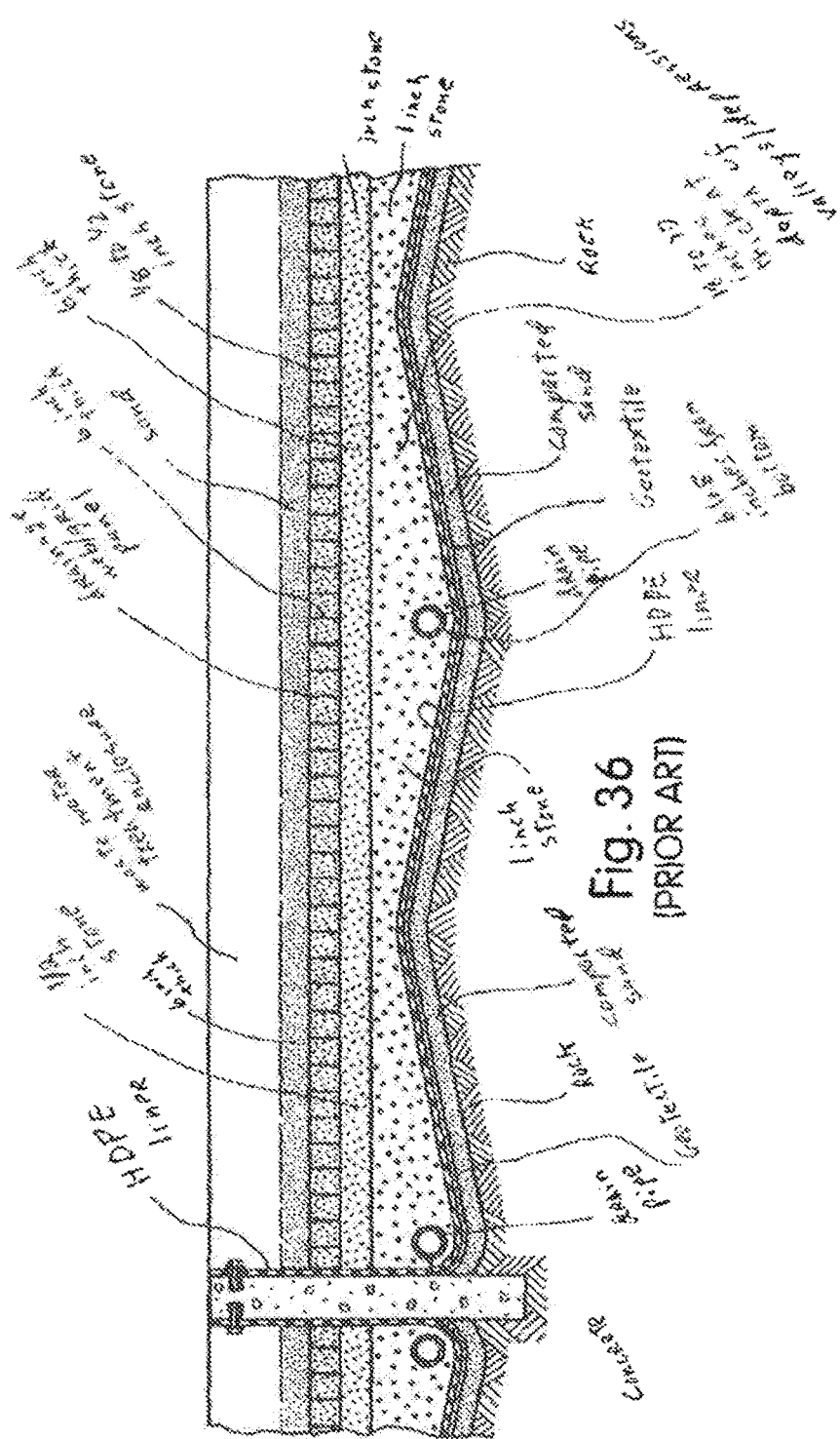
FIG. 36 (earlier Deskins prior art) is a front elevational view of a cross-sectional view of a dewatering installation.

In some illustrative embodiments, a dewatering process is transportable by separating each individual part and placing on transportation devices. (FIG. 38A) The wall sections (983) are manufactured of a rigid structure and can be assembled, used, disassembled and stored in transportation racks. Disassembly of the wall sections is accomplished by separating the male (985) side of joint from the female (986) side of joint or removing the bolts (991) and nuts (991A) or screws from the overlap (992) joint. (FIG. 11) The media layers (88, 109, 89) can be removed and stored in containers for shipment. The cell media (91) can be collapsed and bound and stored in transportation racks. The containment liner (81) can be folded with the underdrain lines (87) separated and bound for easy handling and stored in transportation racks. The polymer activation unit (965) and flocculation unit (780) are most preferably assembled on a trailer (1020) that can be removed for redeployment or separated and stored in transportation racks. (FIG. 42) A portable generator is installed on a trailer (984) that can be easily removed for redeployment, or stored separately in transportation racks. Quick connect couplers (163) on hoses are used for all liquid transfer, which can be disassembled and bound for easy handling and stored in transportation racks. The sludge retrieving device (124) with patented vibrating bucket (127) can be transported on a transportation rack. It is understood that concrete is not easily reusable or transportable.

Some illustrative embodiments include a movable or redeployment process which includes new designed wall sections (983) of the containment structure being fabricated in smaller vertical and horizontal sections. The vertical wall (983) of the new invention is fashioned in multiple sections (width and length) and manufactured of a rigid design nonporous material such as steel, fiberglass, light weight concrete, aluminum, wood and vinyl covered composite material, but most preferably can be made from new composite components or salvaged waste such as polyvinyl chloride or any derivate of any two or more compounds, manufactured in thin sheets and when jointed makes a continuous wall and self-supporting during the construction phase. Preferably the new wall sections are made up to 90% recycled PVC scrap from various sources such as sea wall type sections produced by Shoreline Plastics. The new wall section's strength derives from PVC sheet structure through the combination of the PVC's chemical make-up/compound, the profile's shape wall thickness and depth of the profiles corrugation. Example of profile's shape is corrugated. Example of wall thickness could be 0.25 inches and depth of profiles corrugation may be 8.00 inches. Most preferably the wall section should comply with ASTM D4216-03 cell classification (or comparable standard) to meet standard construction and safety requirements. All raw resin and all of the additional required ingredients, such as, TiO2 for UV stabilization, impact modifier, process stabilizer, filler, pigment, etc., are blended into the PVC compound to provide the maximum structural strength and UV protected walls. The PVC compound should be fabricated to prevent any release of toxic chemicals from the wall product.

While the application of a rigid wall structure serves as a seawall design, improvements to the standard installation and use method would most preferably allow the use of existing commercially made products to become a rigid, portable, watertight structure. Unlike the wall sections, seawalls are designed to seep water to equal or relieve ground pressure by allowing liquid to pass through the joints and the embanked media to drain.

In some illustrative embodiments, a dewatering process utilizes the benefits of the compound or salvaged renewable product but with a different goal for the structure and that is to make the joints of the wall sections watertight and to design the wall sections to hold volumes of liquid materials without leaking and then allow for disassembly of the total process installation for reuse and transportation. On seawall design products the spacing of the male (985) and female (986) connection was purposely fashioned and fabricated with a spacing tolerance to allow water or liquid to pass or seep. This original seawall design did not fit the water tightness requirement, but the flow could be stopped by applying a method to make the fitted joint become watertight with the application of a non-rigid flexible material (990) to fill the voids between the male and female or overlapping mechanical section (992). (FIG. 38A) in this joint there is an area or volume of sufficient size to accommodate an application of material that when stretched and then released would provide a watertight joint and remain permanently flexible. The most preferred sealant is a rope type butyl product as used in sealing for commercial watertight applications. Butyl rubber (990) as manufactured by Adeka is a synthetic rubber, 10 mm string sealant as copolymer of isobutylene with isoprene, polyisbutylene also known as PlB. Butyl rubber has excellent impermeability, and good flex properties.

In some illustrative embodiments, the sealant can be secured from the top to the bottom of the wall section joint, most preferably by inserting a portion of the butyl rope sealant (990) into a cut notch (988) of about $3/16"\times 3/8"$ or any restricting size or shape such as a hole (987). The rope type compound can be stretched to a thickness tolerance of 5 mm ($2^{1}/_{10}"$) or the necessary thickness. Most preferably at that time the roped butyl (990) would be released from the top of the vertical wall section held in place by the same method as the bottom and the rope will relax into the vertical sheet pile interlock male (985) and female (986) joint or the overlap type joint (992). Most preferably the vertical panels (983) need to be agitated by vibrating or pounding lightly to insure the string type compound (990) has completely compressed into the interlock. The installation requires an extra 4" to 6" in length (989) of the string type compound for any additional compression while the vertical wall is pushed into place. The wall panels (983) are joined together to form a continuous wall section (1932) of the new design, containment vessel (FIGS. 38, 38A, 388, 38C, 38D, 39A, 39B and 39C).

Each wall section can contain a female side (986) and a male side (985). The male and female section are jointed and joined together by inserting (sliding) the male side into the female side formed in a C formed pattern (FIG. 388). The male side contains an extrusion on both sides such as a T shape (985) which is locked held in place by the formed C section of the female (986). The joined male and female sections are most preferably sealed by a string of butyl sealant, rubber or butyl rubber (990) when stretched during assembly and released to form a water tight joint (FIG. 38A). The joints can also be sealed with a joint compound such a silicone (1931) on both the male and female sides of the vertical section.

Most preferably the joint can also be sealed with a spray on epoxy type coating material (1004) after the installation. The spray on epoxy type coating material is placed on the interior or exterior of the smooth faced wall joints. The spray on material consists of an acrylic-reinforced aliphatic polyurethane which has incredible strength, ease of application, UV stability, excellent abrasion resistance, and high tensile strength, with elongation and tear properties such as manufactured by Scorpion Liners.

The new most preferred wall design includes the removal of the male/female locking joint and replacement thereof with an overlapping joint (992). The overlapping joint is sealed for water tightness with the same type of sealing materials used on the male/female joints. The overlapping joints (992) are fastened together by using screws or bolts (991) with nuts (9914) in predrilled or non-drilled openings. The extruding ends of the screw or bolt and nut are sealed with sealant. The vertical wall sections joined are secured to the base constructed in the ground or above ground of preferably concrete (1000) or earth, gravel, stone, metal, wood or any rigid material that can be shaped to form a keyway (999) in the footer (FIGS. 40 and 41). The typical installation of the new wall sections is to remove a portion of the ground surface to form a trench or keyway in the approximate size of the width and length of the wall sections. Typically the trench is 36" deep or below frost line. In areas where there is high water tables a wet well overflow, conventional dug or drilled shaft with a overflow valve at the surface to direct the flow, or the insertion of a submersible pump can be included to remove the water from beneath the liner.

The wall sections are installed vertically locking the joints in the concrete or other material in the keyway area (999). A rod, bar (995) or any solid structure can pass through a hole (995A) in the panels near the bottom and inside the keyway (999) from end to end. Preferably the drilled openings (995A) for the passing of a rigid horizontal material can be used as an area where the material around the panels are locked in place by the loaded media on both sides of the vertical and joined section. The opening (995A) allows for the flow of concrete or media through the thickness of the fixed wall section. Most preferably the formed keyway (999) containing the vertical wall sections containing a horizontal bar type structure or not, is filled with concrete or/and other media materials such as sand, small rock, ground concrete or earth and locks the panels in place. A horizontal opening (996) located above the water line on both ends of the panels allow for the passing of pipes (996A) on the interior/exterior of the containment wall (1932) (FIG. 384). A smaller opening (994) is drilled at the top of each panel and allows for the passing of an alignment cable (993) from end to end of the wall and preferably attached to a cable support (1002) located on the post supports (1003) at each end. A turnbuckle (1001) is used to tighten the cable and keep the wall section in place during the construction of the wall sections and placement of concrete or media in the keyway (999) of the footer (FIG. 40, 41B).

A base for the liner consists of providing a prepared slope in the earth (1030) on inside of the filter sloping to the center for vertical/horizontal passage of liquid to the underdrain (103).

Most preferably the non-porous liner (81) is sealed with caulk (1933) and anchored by strapping (998) and bolted with the insert concrete lag (1934) to the side of the concrete footer (1000) or by extending the liner vertically above the loading line. In some embodiments, the liner may be extended to the top of the vertical wall (as shown in phantom FIG. 41) and may be anchored with sealant, strapping (998) and anchor bolts (1934).

The perforated underdrain line (103) is placed on the top surface of the liner (81) and is used to remove filtered water away from the Deskins filter unit. The underdrain line is encapsulated by the rounded washed rock with an effective size of 19 mm to 38 mm (¾" to 1") (89). The next media layer which is located in the cells (90) of the cell media section (91) shall be an effective size of 6.35 mm to 9.35 mm (1¼" to ⅜") natural rounded washed material. The natural washed fine sand material (88) and surface top layer sand (75) should have an effective size of 0.6 mm to 1.2 mm.

(FIGS. 43 and 43A) During extreme heavy rains the invention could be enhanced by covering the process length to width, with a raised structure (1016) or flat (1017) from any type of nonporous materials such as polyvinyl chloride, fiberglass or any waterproof rigid or flexible material. Example of flexible nonporous material is a polyurethane tarp. A roof structure (1016) can be added beside or on top of the wall section (1015) of the filters or with hardware assembly for rolled cover (1018). The roof (1016) can be fabricated of a ridged and corrugated material suitable for spanning the width requirement of the filter. The pitch of the roof can be at an angle (FIG. #43A) or A frame (FIG. #43) most preferably any construction that will allow the extreme heavy rain or weather to be diverted from the surface of the filter.

Additional improvements are to include an industrial grade portable generator (984) most preferably with maintenance-free, brushless, alternator providing high electrical power-quality with 110/120V (1011), 20AGFCI Duplex, 30 A, Twist Local/110V/240V, 30 A TWIST Lock outlets (1012) (FIG. 42). Preferably, the generator is attached on a trailer (984) that can be easily moved for redeployment. The generator can run by gasoline, diesel, electricity, wind, tidal systems, river, hydroelectric, geothermal, propane, natural gas, magnets. The generator (984) is used to power the polymer preparation unit (965) and (if required) operate a separate sludge transfer pump(s), tankless water heater (65), electronic water conditioner (64) and/or turbidimeter (101).

(FIG. 42) The portable mounted generator (984) consists of a fuel storage tank (1006), liquid inlet (1005), fuel transfer line (1007) connecting the fuel storage tank to the generator motor (1008). The portable mounted generator (98a) also includes a control panel (1010), auto or pull start (1009), 110 volte outlet (1011), 220 volte outlet (1012), transportation hook-up (1013) and wheels (1014). The generator and apparatus are mounted on the trailer with bolts and nuts (1025).

The prior art polymer unit (U.S. Pat. No. 5,770,056) and RapidFloc (U.S. Pat. No. 5,611,921) mounted to trailer (1020) in FIG. 44 includes transportation hook-up (1021) with crank handle assembly (1022), support brace (1023), wheels (1027) and fender (1028). The polymer unit (965) is mounted to the trailer with bolts and connecting nuts (1025) and connected to the polymer drum (66) through the polymer hose (1024) and is connected to the RapidFloc mixer through the polymer solution line (1026). The RapidFloc mixer (780) is attached to drop pipes (1019) by flange connections (1019A) and attached to the trailer with a mounting strap(s) (1029).

The filtrate water (FIG. 37) (100), after removal of the solids through the prior art process or Quick-Dry Filter Dewatering Mobile Process and Apparatus, may go through a disinfection procedure to destroy microorganisms such as Malaria microorganism, by implementing RO (Reverse Osmosis), boiling, chemical enhancement and/or membrane technology can then be used in many applications. Examples of usable applications of such filtrate water, after going through a disinfection procedure, are drinking water, food preparation or any other use of sanitized or cleaned water. After harvesting the dried solids from the surface of the top layer of media of the invention, the dried solids can then be used as a renewable fuel source for combustion to manufacture energy, used as fertilizer or formed into briquettes. The collected solids can be used as a compost material, a sterilizing process of the material that can be land applied, obtaining nutrients without contamination. The dried collected solids can also be used in the agitated air drying and curing process to obtain Class A Biosolids Class A Biosolids can be achieved by laying collected solids in windrows on an impermeable surface, allowing adequate time for heat buildup from the aerobic biological breakdown of the residual volatile matter in the solids, then using sporadic mechanical agitation. Deskins Quick Dry Dewatering Process combined with the AADC (Agitated Air Drying and Curing) process to obtain a Class A Biosolids was presented at the WEF/AWWA/CWEA Joint Residuals and Biosolids Management Conference 2001 presented by Greg Fabisiak, Derald Meinieke and Dave Oerke, P. E. titled "Simple, Effective, Low-Cost and Innovative Biosolids Drying Bed" listed on page 75 Session 21 provided as Exhibit 2 herewith.

The sterile solids from animal waste can then be used as bedding material for the animal and can replace the use of sand. The Deskins prior art patents are described in "Advanced Treatment System For Liquid Swine Manure Using Solid-Liquid Separation And Nutrient Removal Unit Processes" by M. B. Vanotti, J. M. Rice, S. L. Howell, P. G. Hunt, F. J Humenik presented at the Animal, Agricultural and Food Processing Wastes National Symposium Oct. 9-11, 2000, pages 393 to 397 provided as Exhibit 3 herewith.

The Quick-Dry Filter Dewatering Mobile Process and Apparatus (FIG. 37) can be used as a permanent dewatering process or a mobile emergency dewatering device designed for fast installation with high production of quality liquid-solid-separation of animal waste lagoons, natural and/or manmade disasters or any polluting source that needs liquid-solid-separation.

The confidential "Deskins Greenhouse Gas Comparison Study" which was referred to above and prepared for Deskins by Ch2M Hill (a global leader in consulting design, design build, operations and program management) is provided as Exhibit 1 herewith.

The abstract "Simple, Effective, Low-Cost and Innovative "Filtration" Dewatering System" which was referred to above and presented at the WEF/AWWA/CWEA Joint Residuals and Biosolids Management Conference 2001 by Greg Fabisiak, South Adams County Water and Sanitation District, Derald Meinieke and Dave Oerke, Rothberg, Tamburini & Winsor is provided as Exhibit 2 herewith.

The "Advanced Treatment System For Liquid Swine Manure Using Solid-Liquid Separation And Nutrient Removal Unit Processes". The authors are Matias Vanotti, Soil Scientist, Mark Rice, Biological and Agric. Eng. NC State Univ., Steven Howell, Environmental Engineer, Patrick Hunt, Soil Scientist and Research Leader, USDA_ARS, Frank Humenik, Professor of Agricultural Engineering & Program Coordinator, NC State Univ. and presented at the 2000 Animal, Agricultural And Food Processing Wastes International Symposium is provided as Exhibit 3 herewith.

In another illustrative embodiment of the present disclosure, an Upflow Baffle (FIG. 45) serves as a flow restrictor or baffling effect of the discharged sludge and houses the vertical sludge pipe. The top Filter media layer is formed around the Upflow Baffle bottom plate (1938) and hold the unit in place in some embodiments. The Upflow Baffle is fabricated in sizes from 1" to 24+" diameter in some embodiments (FIG. 45). In illustrative embodiments, the height of the baffle is from 3" to 60" and is fabricated from plastics, steel, fiberglass or any suitable rigid material that can withstand the pressure produced by the delivery of the prepared discharged sludge. The shape of the Upflow Baffle can be round, square, rectangle, octagon or any other suitable shape. The preferred shape is round. In illustrative embodiments, the provided dimensions are joined together with a continuous seam.

In an illustrative embodiment, the Upflow Baffle includes a bottom plate (1938) attached to the vertical spacer between splash pad and support ring (1937). Illustratively, the bottom plate (1938) has the size of the outside dimension of the Upflow Baffle is and in some embodiments contributes to the structural stabilization of the baffle. Directly above the bottom plate (1938), located from ½" to 24+" in illustrative embodiments, is the Upflow Baffle splash pad (1936) formed in the same fashion as the bottom plate and is attached to the vessel in the same manner.

The vertical round baffle (1935) attached to the splash pad makes a vertical wall, which is from 2" to 24+" high in some embodiments, which serves as a flow restrictor or baffling effect of the discharged sludge from the attached vertical sludge line (1945). The sludge passes through the horizontal sludge distribution line (70) under the filter's liner and then will transition vertically up through the liner (81), coarse stone layer (89), cell media section (91) granular filter media (118) exiting through the top fine filter sand layer (88) of the Filter.

Figure 47:
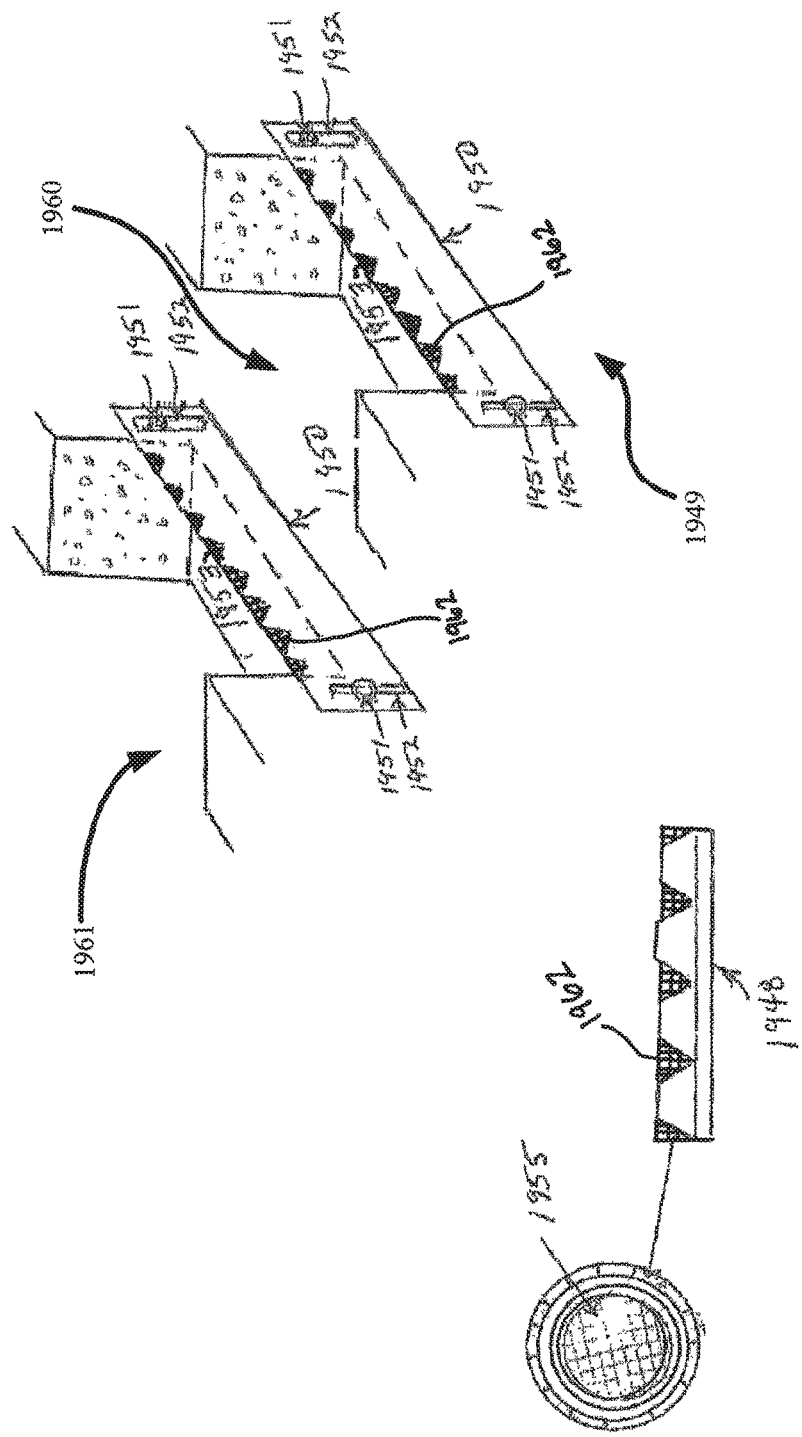
Figure 48:
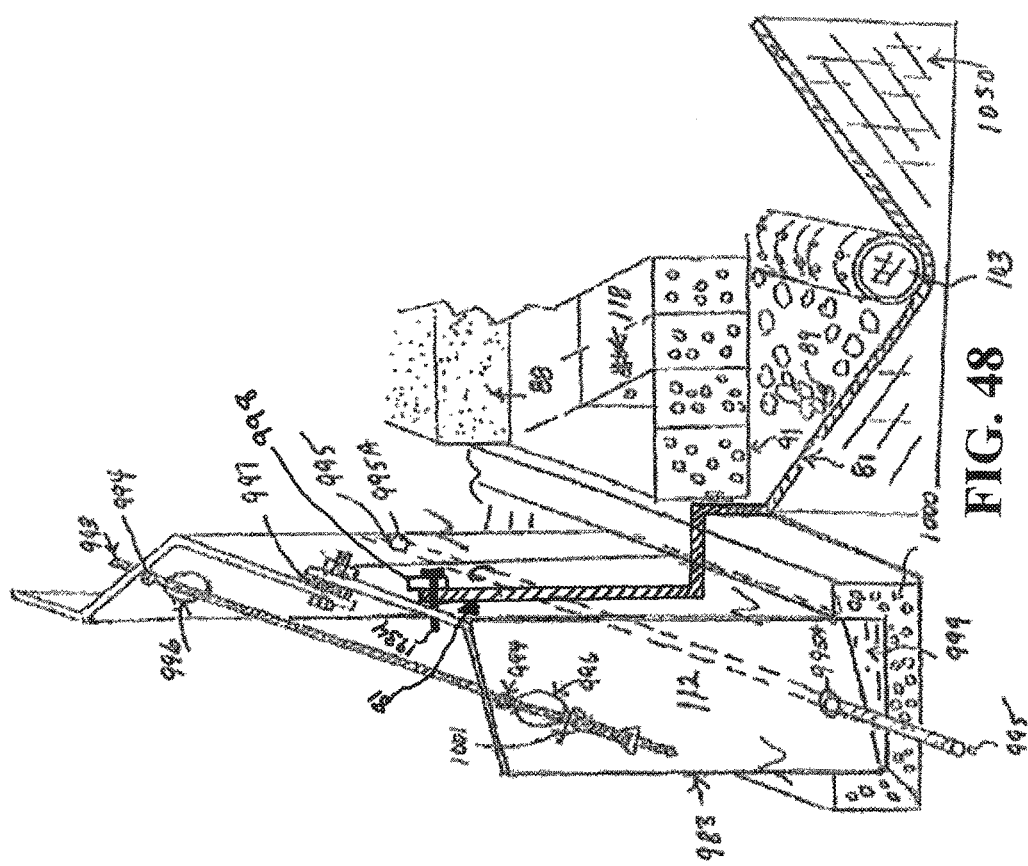

The Upflow Baffle is placed over the vertical sludge distribution line to form a common discharge port. The interior vertical sludge line (1945) and the vertical riser (1947) of the Upflow Baffle are sealed at the top to the vertical inlet sludge line by a rigid but pliable material such as epoxy rubber, or any water tight mixture, compound or coupler (1946) (FIG. 47A). Illustratively, the interior vertical sludge line and the horizontal sludge line are sealed above the liner by a flexible boot (1957) of some compound such as rubber, epoxy or other suitable material to make this connection a watertight joint. The Upflow Baffle and vertical sludge pipe are sealed underneath Upflow Baffle by a flexible boot (1957) of some compound such as rubber, epoxy or any combined material to make this connection a watertight joint.

As shown in the illustrative embodiment of FIG. 45, the sludge drops into a restricting zone located on top of the splash pad (1936). A vertical wall section (1935) is attached to this splash pad and in some embodiments ranges in vertical height from ½" to 48+". The purpose of this restriction wall (1935) is to allow for a mixing energy zone of the cascading sludge with the applied polymer to further maximize the polymer charge sites. The Upflow Baffle also helps to evenly distribute the discharged sludge over the surface of the Filter.

There are openings called discharge ports (1941) located at the bottom portion of the restriction wall formed in any shape or size round, rectangular, triangle, etc. that will allow the flow of flocked sludge from the containment section to the surface of the filter (88). The bottom portion of the vertical wall should have at least one discharge port (1941) or more and is only limited by the available vertical restriction wall space.

In the illustrated embodiment, a slide gate (1943) fabricated from the same material and formed angle as the vertical baffle wall or any compound that offer the rigidity to withstand pressure produced by the delivery of the prepared sludge, should be formed larger than the discharge port. The exterior of the slide gate (1943) should fit directly in front of the discharge port (1941) or directly inside of the wall. The slide gate should have a surface contact around the sides and top of the discharge port (1941) of ⅛+" larger than the discharge port. A horizontal slot (1940) of ¼" to 2+" that extends 60% to 90% of the length of the slide gate (1943). A hole drilled in the restriction wall (1935) and a bolt or rigid fastener (1939) will be passed through the slide gate with a horizontal opening to the exterior of the slide gate and is located in the formed slot. A securing device or nut (1944) will tighten this section in place and will allow for the increase or decrease of the opening size in the discharge port (1941). A portion of the sludge will also flow over the top of restriction wall (1942).

The inlet sludge distribution lines can contain one or more valves (1958) on the interior or exterior of the filter to regulate the distribution of solids volume onto the filter surface. This creates a loading zone on the top surface media (118) which consists of sand, carbon, or any granular media.

In another illustrative embodiment of the present disclosure, the Surface Skimmer (FIG. 46) helps remove freed water from the sludge and relieves some of the overflow of water through the interior overflows of the filter. The Surface Skimmer is located in the sloped wall of the inlet and outlet ramps or any wall or location is an opening of 2" to 24+" which contains a vertical pipe (1961) from 2" to 24+" in size and is connected into the discharge underdrain lines (852) of the filter bed. In the embodiment illustrated in FIG. 46, this opening is located at the same elevation as the overflow weirs (147, 1950) in the interior walls of the filter in line with the adjustable fill line (1949) A removable circular weir for overflow (1948) is placed around this opening and is fabricated from any rigid material such as plastics, steel, fiberglass, etc. In some embodiments, the weir design has notches (1948) allowing for exiting of the water from the surface and restricting solids to be contained in the filter. The openings located for drainage can be capped when not in use with a threaded or non-threaded plate (1959) to prevent any materials or animals from entering into the vertical line.

Also illustrated in FIG. 46, an adjustable flat weir (1950) is provided in a decanter slot (147) in separating wall (77). The separating wall (147) separates two filters (not shown) and helps to control an overflow from one filter to an adjacent filter. The adjustable flat weir (1950) is held in place by anchor bolts (1951). Vertical slots (1952) are provided in the flat weir for horizontal leveling of adjustable flat weir (1952). On the top of the adjustable flat weir (1950) are the V-notches (1953) which help regulate the overflow. In some embodiments, weir (1950) may include a filter (1962, shown in phantom) for allowing water passing over the adjustable flat weir (1950) to be filtered.

The Following is A Description Of Some Of The Improvements Found In Some Illustrative Embodiments of the Present Disclosure:

1. A transportable process of dewatering a composition composed of water and particulate solids utilizing thin portable walls. The wall sections can be made of a rigid structure containing ribs within the section, corrugated configuration such as a sea wall type structure.

2. The wall sections would be comprised of salvaged waste such as polyvinyl chloride or any derivative of any two or more compounds or new composite materials. The wall sections could be made of formed flat steel, aluminum, lightweight aggregate concrete or any other ridged material.

3. The configuration of multiple angular sections when assembled forms a ridged corrugated self-standing wall.

4. The ridged wall panels are fabricated into smaller sections length×width (example of section size: 24" width× 60' height×appropriate thickness of the chosen material to manufacture the wall sections) and connected together with sealing agents to form a water tight joint and a continuous wall section. The wall can be of any height or length. The wall sections can have a joint that can be overlapping fastened together using a sealing material with ridged bolts and nuts or screws. A joint can also be of a male/female configuration sealed with a butyl rope type material, a liquid silicone caulking and held in place with the formation of the male/female shape.

5. A spray on epoxy type coating material after the installation can be sprayed on one or both sides (interior and exterior) of the wall joints and each screw/bolt on top and bottom.

6. The prepared base can be formed of concrete or if concrete is not available any granular hard surface media. The prepared base to receive the fixed wall section can be formed of a variety of materials including crushed rock, stone, lava rock, sand, hardened rubber, reclaimed asphalt or any ground up material that can withstand the vertical load pressure of the wall weight and horizontal load pressure of the contained liquid.

7. A preferred keyway is formed in the prepared base material to allow placing of the vertical wall sections. The sections can be assembled as multiple connected units and placed in keyway or single wall section placement in the keyway. The corrugation design of the wall with the top cable alignment will hold the wall section in an upright position when the preferred concrete or any materials including crushed rock, stone, lava rock, sand, hardened rubber, reclaimed asphalt or any ground up material is placed on both sides to form the base to hold or stabilize the wall sections.

8. Wall sections are fabricated of lightweight materials, which can be shipped in storage containers and erected on-site without the use of heavy machinery.

9. A pre-drilled hole should be inserted on one side of the angular section near the bottom of each wall section. The hole provides the passing of a ridged material (example of ridged material is rebar) through the vertical wall section. When not using a rebar, the void fills with concrete or other surrounding materials within the keyway. This allows the void to be filled with the media and becomes a locking position of the vertical wall sections.

10. A hole is drilled or pre-drilled at the top of the vertical wall sections for the purpose of alignment.

11. Media such as rock, concrete, sand, or stone is housed around the support post for strength and alignment to prevent any movement of the fixed post.

12. A cable with turnbuckle, or chain, rope or any ridged material is passed through the openings at the top of the sections, as described in No. 10, combining all sections as a wall unit and allows for proper horizontal and vertical alignment when the cable has been anchored to a vertical support post at both ends of the walls.

13. A larger intermediate opening is formed in the top portion of the vertical wall section and positioned below the alignment cable openings and above the liquid level in the filter. The openings are aligned to allow the passing of horizontal pipe which can contain flow valves spaced evenly from end to end to deliver sludge to the bed/filter. The lines are connected with couplers (as in Fernco couplers) for ease of installation and dis-assembly of the piping.

14. The non-porous liner material is fastened to the vertical side of the base with sealant, straps and anchors when concrete is used. If there is no concrete the liner is extended to the top of the vertical wall and is anchored with sealant, strapping and anchor bolts. When the non-pours liner material is assembled and anchored to the top of the vertical wall the openings for the alignment cable, transfer pipes are cut in place.

15. Preferably the connecting of the porous underdrain line to the solid discharge pipe should be connected with a coupler (example of a coupler: Fernco coupler).

16. When dis-assembling for transportation the sand, stone is removed and put into shipping containers. The cell media removed vertically and then collapsed, bound and placed in shipping container. The smaller gradation of granular filter media is removed placed in shipping container. The larger granular filter media is removed and placed in shipping containers. The perforated underdrain is disconnected by the use of couplers (Example of couplers: Fernco couplers) and placed in shipping container. The liner is folded, and placed on a shipping container for redeployment. The alignment horizontal cable at the top of the wall section can be loosened, removed and placed in shipping container. The horizontal sludge piping connected by couplers can be dis-assembled and removed. Removing the wall section is accomplished by fastening a strap, rope, chain, cable or bracket to the transfer line opening and is lifted in a vertical motion. if the connecting sections of the vertical wall are bolted together, the bolts need to be removed prior to the vertical lifting. All items of the Dewatering Mobile Process and Apparatus can be redeployed.

17. The process can be used worldwide including natural and/or manmade disasters, polluted water supplies, under developed locations of the world, Dairies, Poultry Farms, or any CAFO (Confined Animal Feed Operation) operations, desalination, collecting rain water, treating fraking water, stagnant water supplies, swamps, coal wash water, heavy metal rinse waters, ship wastewater, water reuse, industrial-municipal-agricultural lagoons, storm water runoff sites, backwash water recovery of water plants and biosolids dewatering of wastewater treatment plants.

Although the invention has been described in detail with reference to certain preferred embodiments, variations and modifications exist within the spirit and scope of the invention as described and defined in the following claims.

LIST AND DESCRIPTION OF PARTS BY THE NUMBERS IN THE DRAWINGS

In connection with the figures, the following list of the names of the parts of the previous Deskins process/scheme are noted:
50 Plant
52 Finished water distribution
51 Raw water source
52 Finished water distribution
53 Water with residual solids from clarifier/blowdown
54 Water with residual solids from filter backwash
55 Water with residual solids reject
56 Equalization (EQ) tank or solids holding tank
57 Deskins backwash recovery system—U.S. Pat. No. 7,691,261
58 Rainwater
59 Flow of treated water from Deskins system to water treatment plant
60 EQ tank pump station
61 Flow meter
62 Suspended solids monitor
63 Potable water line
64 Electronic water conditioner U.S. Pat. No. 7,691,261 B2
65 Electronic (tank less) water heater U.S. Pat. No. 7,691,261
66 Polymer drum
67 Water line
68 Electronic signal to polymer activation system
69 Electronic signal to pre-cleaning valve
70 Flocked composition pipe
71 Granular filter media containers/enclosures
72 Decanter
73 Decanter valve
74 Decanter discharge pipe
75 Surface of filter sand layer
76 Upper operating water level
77 Non-porous (concrete) side dividing wall
78 Water distribution valves
79 Particles
80 Non-porous (concrete) floor
80a Sloped portions of concrete floor
80b Sloped portion of concrete floor
81 Non-porous liner
82 Lower operating water level
83 Water level sensor
84 Sensor beam of level sensor
85 Support for level sensors
86 Auto valve for drain pip
87 Drain pipe (outside of container)
88 Fine filter sand layer
89 Coarse stone layer
90 Cells of cell media section
91 Cell media section
92 Electronic signal system between water level sensor and drain valve
93 Line to drain line
94 Valve for pre-cleaning water line U.S. Pat. No. 7,691,261 B2
95 Line to valve
96a Water plant line
96b Pre-cleaning water line U.S. Pat. No. 7,691,261 B2
97 Drain line
98 Filtrate recovery pump station
99 Recovery water recycle line
100 Treated water line
101 Turbidimeter
102 Treated water line to plant
103 Drain pipe inside of container
104 Front support (concrete) wall
105 Footing supports for walls
106 Upwards-moving pre-cleaning water
107 Up-slope top of front end
108 Down-slope top of front end
109 Attachment of liner to wall
110 Water in the container
111 Plant water being inserted
112 Valves for plant water inset pipe
113 Electronic signal between water level sensor and intake Valve
114 Ribs in drain pipe
115 Holes in valleys of drain pipe
116 Support brackets for water pipe
117 Valley in floor
118 Granular filter media
119 Intersection of floor and side wall
120 Plant water to drain pipe
121 Filtrant
121a Filtrant (first filtration)
121b Filtrant (second filtration)
121c Filtrant (later filtration)
121d Filtrant (last filtration)
122 Up-slope top of back end
123 Down-slope of back end
124 Front end loader
125 Electronics for electronic (tank less) water heater
126 Non-intrusive wingdings
127 Front bucket
128 Heated pipe coil 129 Water supply line
130 Electronic water conditioner
131 Pipe running throughout cell media section
132 Pre-cleaning water (106) passing to the top surface or melted water evaporating off (out)
133 View ports
134 Screens for view ports
135 Metal bars
136 Hydraulic vibrators
137 High pressure hose
138 Metal screens (in place of metal bars)
139 Connection lines
140 Sewage
141 Chemical pH adjustment
142 Sludge retrieval
143 Sludge
144 Backside of bucket
145 Side wall of bucket plate
146 Attachment plate of bucket to front loader (or tractor)
147 Decanter slots in side separating walls
148 Decanter trough
149 Top side v-notches
150 Floats for movable bar
151 Slidable bar
152 Slides
157 Input conduit (influent end of mixer)
158 Flanges
159 Flange
160 Mixing zone 1
161 Polymer or flocculent injection lines
162 Manifold
163 Quick connect
164 Adjustable baffle plate placed at an angle
165 Pivot attachment
166 Electrical unit
167 Threaded adjustable rod
168 Mixing zone 2
169 Fixed vertical baffle
170 Drainage plug
171 Fixed, horizontal baffles
172 Mixing zone 3
173 Walls
174 Flush plug
175 Fixed, vertical baffle
176 Mixing zone 5
177 Recirculation baffles
178 Mixing zone 4
179 Output conduit
780 Deskins Rapid Floc mixer U.S. Pat. No. 5,611,921
781 Input conduit (influent end of mixer)
782 Flanges
783 Mixing zone 1
784 Polymer of flocculation injection lines
785 Manifold
786 Quick connect
787 Adjustable baffle plate placed at an angle
787a Pivot attachment
788 Electrical unit
789 Mixing zone 2
790 Fixed vertical baffles
792 Fixed horizontal baffles
793 Mixing zone 3
794 Walls
796 Fixed vertical baffle
797 Mixing zone 5
798 Recirculation baffles
799 Mixing zone 4
800 Output conduit
801 Mixer-flocculating system
802 Liquid in
805 Downflow segment
806 Bottomflow segment
807 Upflow segment
811 Recycle segment
851 Dividing wall
852 Support upon which dividing wall is positioned
853 Porous layer positioned directly above non-porous layer
857 Layer of sand-underlying sand-cell media section
861 Layer of sand overlaying sand-cell media section
925 Sludge retriever
926 Shaft
927 Multiple 3 inch tines/teeth
928 Rotary
929 Lower pivoted arm attaching sludge retriever to front-end loader
930 Upper pivoted arm attaching sludge retriever to front-end loader
931 Ball pivot
932 Arm
933 2 cubic yard bucket/hopper
934 Dried sludge
935 Rotary drum
936 Air flow grill or filter
937 Lower side
940 Vertical slot
941 Short horizontal slots
965 Polymer activation system—U.S. Pat. No. 5,770,056
966 Tube
967 Inner chamber
968 Vessel
969 Retention chamber
970 Exit tube
972 Tube
973 Water-polymer mixing unit
974 Check valve
975 Hollow shaft
976 Aspirator
977 Motor
978 Seal
979 Check valve
980 Ball valve
981 Flow indicator In connection with the figures, the following list of the names of the parts of the instant invention are noted:

983 Mobile wall section
984 Portable Mounted Generator
985 Male side of joint
986 Female side of joint
987 Round sealant opening
988 Notched sealant opening
989 Extra length of sealant
990 Rope sealant
991 Bolt
991A Nut
992 Overlap joint
993 Alignment cable
994 Opening in wall for alignment cable
995 Bar
995A Opening in wall for bar
996 Opening in wall for pipe
996A Sludge pipe
997 Flat sealant
998 Liner strapping
999 Keyway 1000 Base of walls
1001 Turnbuckle
1002 Cable support
1003 Post support
1004 Spray on sealant
1005 Liquid inlet
1006 Fuel storage tank
1007 Fuel transfer line
1008 Generator motor
1009 Auto or pull start
1010 Control panel
1011 110 volt outlet
1012 220 volt outlet
1013 Transportation hook-up
1014 Wheel on portable generator
1015 Building wall
1016 Roof structure
1017 Roll cover
1018 Hardware assembly for rolled cover
1019 Drop pipe
1019A Flange Connection
1020 Polymer unit and RapidFloc trailer
1021 Transportation hook-up
1022 Crank handle assembly
1023 Support brace
1024 Polymer hose
1025 Bolts and nuts
1026 Polymer solution Line
1027 Wheel on polymer unit and RapidFloc trailer
1028 Fender
1029 Mounting strap
1030 Trench/slope
1931 Joint compound/silicone
1932 Portable wall (overall)
1933 Caulk
1934 Insert concrete lag (CONTINUATION) LIST OF PARTS NUMBERS 1935 Vertical restriction wall
1936 Upflow Baffle Splash pad
1937 Vertical spacer
1938 Bottom plate
1939 Bolt or ridged fastener
1940 Horizontal slot
1941 Discharge port
1942 Top of restriction wall
1943 Slide gate with horizontal opening
1944 Securing device or nut
1945 Vertical sludge line
1946 Coupler
1947 Vertical riser of Upflow Baffle
1948 Circular weir for overflow
1949 Adjustable fill line
1950 Adjustable flat weir
1951 Anchor bolts for adjustment of flat weir
1952 Vertical slot for horizontal leveling of weir
1953 V-notches
1954 Vertical pipe to discharge underdrain
1955 Plate
1956 Valve
1957 Flexible boot

What is claimed is:

1. A modular dewatering system for removing water from a waste water composition comprising water and particulate solids, the dewatering system comprising:

a non-porous container having a watertight wall comprising a plurality of removably coupled wall sections, a plurality of connections for connecting together the plurality of removably coupled wall sections, and a non-porous bottom having a valley and an exit hole therethrough;
a porous filter layer filling the non-porous container;
a first drain pipe communicating with the exit hole, wherein the water is separated from the particulate solids in the composition by passing through the porous filter layer, the separated water being removed from the non-porous container though the first drain pipe, and
a first vertical support post and a second vertical support post at opposite ends of the watertight wall;
a first plurality of holes in the plurality of removably coupled wall sections; and
a connector passing through the plurality of holes and coupled to the first and second vertical support posts, wherein the plurality of removably coupled wall sections are aligned in a first horizontal alignment and a first vertical alignment forming the watertight wall.

2. The dewatering system of claim 1, wherein the non-porous bottom is defined by a non-porous liner positioned on a bottom of the dewatering system and including the exit hole therethrough.

3. The dewatering system of claim 1, wherein the porous filter layer is comprised of porous large filter media layer comprising large filter media positioned in the non-porous container; a porous grid layer positioned on top of the porous layer of large filter media, the porous grid layer comprising a non-porous grid having passageways therethrough; and porous fine filter media positioned in the passageways of the grid; and a porous filter sand layer comprising filter sand positioned on top of the grid layer.

4. The dewatering system of claim 1, wherein the first drain pipe extends through the exit hole, a collection portion of the first drain pipe having a plurality of porous openings in the drain pipe to allow water to pass into the first drain pipe.

5. The dewatering system of claim 4, wherein the collection portion of the first drain pipe is positioned in the valley and at least partially surrounded by the porous layer comprising large filter media.

6. The dewatering system of claim 1, further comprising a wastewater source providing the waste water composition to the non-porous container.

7. The dewatering system of claim 6, wherein the wastewater source further comprises a substantially horizontal pipe positioned through a second plurality of holes and one or more delivery ports connected to the pipe providing the waste water composition to the non-porous container.

8. The dewatering system of claim 1, further comprising a treating unit treating at least one of the composition, the water, and the particulate solids; and a generator providing electrical power to the treating unit.

9. The dewatering system of claim 8, wherein the treating unit is selected from the group consisting of a polymer preparation unit, a sludge transfer pump, a tankless water heater, an electronic water conditioner, and a turbidimeter.

10. The dewatering system of claim 1, wherein the removably coupled wall sections are selected from a group of wall sections having a plurality of heights.

11. The dewatering system of claim 1, wherein the removably coupled wall sections are configured to be coupled together in a first order to form a first watertight wall in a first location, uncoupled from each other, and re-coupled together to a second order to form a second watertight wall in a second location.

12. The dewatering system of claim 1, wherein the removably coupled wall sections are corrugated so as to define ridges and grooves.

13. The dewatering system of claim 1, wherein the removably coupled wall sections are formed from a rigid non-porous material selected from the group consisting of polyvinyl chloride, vinyl covered composite material, steel, fiberglass, light weight concrete, aluminum, wood, and composites thereof.

14. The dewatering system of claim 1, wherein the removably coupled wall sections are formed from at least one of salvage, waste, and recycled material.

15. The dewatering system of claim 1, wherein the watertight wall is self-supporting.

16. The dewatering system of claim 12, wherein the ridges and grooves of the corrugated watertight wall extend substantially vertically.

17. The dewatering system of claim 1, each of said connections includes a flat butyl sealing material between a first wall section of the plurality of removably coupled wall sections and a second wall section of the plurality of removably coupled wall sections adjacent to the first section of the plurality of removably coupled wall sections, wherein the first and second sections are coupled in an overlapping fashion forming a joint, the adjacent wall sections being fastened together with a fastener at said joint, the flat butyl sealing material sealing the fastener and the joint.

18. The dewatering system of claim 17, wherein the fastener comprises at least one of a bolt, a screw, and a nut.

19. The dewatering system of claim 1, wherein the watertight wall further comprises a butyl rope material between a first wall section and a second wall section adjacent to the first section of the plurality of removably coupled wall sections, wherein the first and second sections are coupled in a male/female configuration.

20. The dewatering system of claim 1, wherein the connector is selected from the group consisting of a cable and turnbuckle, a chain, a rope, and combinations thereof.

21. The dewatering system of claim 1, further comprising a base, the watertight wall being positioned on a top surface of the base and a portion of the non-porous liner being positioned on a side surface of the base.

22. The dewatering system of claim 21, wherein the base further comprises a keyway configured to receive the wall sections to form the watertight wall.

23. The dewatering system of claim 22, wherein the keyway is configured to receive the formed watertight wall.

24. The dewatering system of claim 22, wherein the keyway is configured to receive the plurality of wall sections, the wall sections being coupled while positioned in the keyway to form the watertight wall.

25. The dewatering system of claim 22, wherein the keyway further comprises fill material positioned in the keyway, the fill material supporting the watertight wall.

26. The dewatering system of claim 25, wherein the fill material is selected from concrete, crushed rock, stone, lava rock, sand, hardened rubber, reclaimed asphalt, or combinations thereof.

27. The dewatering system of claim 21, wherein the base is non-porous.

28. The dewatering system of claim 27, wherein the non-porous base is formed of concrete.

29. The dewatering system of claim 1, further comprising:
a second plurality of holes in the plurality of removably coupled sections positioned above the first plurality of holes, each of the second plurality of holes being larger than each of the first plurality of holes.

30. The dewatering system of claim 6, wherein the wastewater source further comprises one or more flow valves controlling a flow rate of the waste water composition to the non-porous container.

31. The dewatering system of claim 6, wherein the wastewater source further comprises couplers for ease of installation and disassembly of the dewatering system.

32. The dewatering system of claim 2, wherein the bottom further comprises two complementary portions that slant downward forming the valley, the non-porous liner being coupled to a side surface of a base.

33. The dewatering system of claim 32, wherein the non-porous liner is coupled to the side surface of the base with a fastener selected from one or more sealants, one or more straps, one or more anchors, and combinations thereof.

34. The dewatering system of claim 32, wherein the non-porous liner is further positioned on a side surface of the watertight wall.

35. The dewatering system of claim 33, wherein the non-porous liner is coupled to the watertight wall with a fastener selected from one or more sealants, one or more straps, one or more anchors, and combinations thereof.

36. The dewatering system of claim 32, wherein the non-porous liner extends to a top of the plurality of removably coupled wall sections.

37. The dewatering system of claim 4, wherein the plurality of porous openings are distributed circumferentially around the drain pipe.

38. The dewatering system of claim 3, wherein the grid layer provides surface and subsurface stabilization of the grid layer and the porous layer of filter sand.

39. The dewatering system of claim 3, wherein the large filter media, fine filter media, and filter sand have an effective gradation to allow particulate solids to collect on a top surface of the porous filter sand layer.

40. The dewatering system of claim 2, further comprising:
a supply pipe fluidly connected to a wastewater source providing the waste water composition, the supply pipe extending through the non-porous liner to a wastewater outlet positioned above a porous filter sand layer; and
a baffle positioned on top of the porous filter sand layer, the baffle comprising:
a splash pad positioned to contact at least a portion of the waste water composition exiting the wastewater outlet;
a restriction wall surrounding the splash pad configured to restrict the flow of waste water on to the porous filter sand layer; and
an outlet positioned in the restriction wall configured to allow a portion of the waste water to pass through the restriction wall and on to the porous filter sand layer.

41. The dewatering system of claim 1, further comprising:
a second drain pipe having a first end in fluid communication with the first drain pipe and a second end positioned above the porous filter sand layer, the second end having an elevation above the bottom and comprising a weir for removing water above the elevation, the weir including a filter allowing water at the elevation to enter the second drain pipe but restricting solids from entering the second drain pipe; wherein the water is separated from the particulate solids in the composition by passing through one or more of the porous layers, the separated water being removed from the non-porous container though at least one of the first and second drain pipes.

42. The dewatering system of claim 1, further comprising a weir removably coupled to one of the plurality of removably coupled wall sections and having an elevation above the bottom of the non-porous container for removing water above the elevation from the non-porous container to a second non-porous container, the one of the plurality of removably coupled wall sections being common to the non-porous container and the second non-porous container, wherein the position of the weir above the bottom of the non-porous container is configured to be adjusted between a first position defining a first elevation and a second position defining a second elevation, the second elevation being less than the first elevation.

43. A dewatering system for removing water from a waste water composition comprising water and particulate solids, the dewatering system comprising:
- a non-porous container having a watertight wall comprising a plurality of removably coupled wall sections, a plurality of connections for connecting together the plurality of removably coupled wall sections, and a non-porous bottom having a valley and an exit hole therethrough;
- a porous filter layer filling the non-porous container;
- a drain pipe communicating with the exit hole;
- a baffle positioned on top of the porous filter layer;
- a supply pipe communicating with a source of waste water and the baffle, whereupon the waste water flows through the baffle and over a top surface of said porous filter layer;
- a first vertical support post and a second vertical support post at opposite ends of the watertight wall;
- a first plurality of holes in the plurality of removably coupled wall sections; and a connector passing through the plurality of holes and coupled to the first and second vertical support posts, wherein the plurality of removably coupled wall sections are aligned in a first horizontal alignment and a first vertical alignment forming the watertight wall.

44. The dewatering system of claim 43, wherein the supply pipe extends from a position below the porous filter layer to a position adjacent a top surface of the porous filter layer.

45. The dewatering system of claim 44, wherein the supply pipe is fluidly connected to a wastewater source providing the waste water composition, the supply pipe extending through the non-porous liner to a wastewater outlet positioned above the porous filter sand layer.

46. The dewatering system of claim 43, wherein the baffle further comprises a splash pad positioned to contact at least a portion of the waste water composition exiting the wastewater outlet; a restriction wall surrounding the splash pad configured to restrict the flow of waste water on to the porous filter sand layer; and an outlet positioned in the restriction wall configured to allow a portion of the waste water to pass through the restriction wall and on to the porous filter layer, wherein the water is separated from the particulate solids in the composition by passing through the porous filter layer, the separated water being removed from the non-porous container though the drain pipe.

47. The dewatering system of claim 43, further comprising a chemical injection system incorporating a treating agent into the waste water composition.

48. The dewatering system of claim 47, wherein the treating agent is a coagulant or flocculant.

49. The dewatering system of claim 47, wherein the treating agent is preferably selected from activated polymer, alum, ferric sulfate, ferric chloride, lime, and combinations thereof.

50. The dewatering system of claim 43, further comprising an inline mixing flocculator to enhance the chemically induced liquids-solids separation of the waste water composition after the chemical injection system.

51. The dewatering system of claim 43, wherein the porous filter layer is comprised of porous large filter media layer comprising large filter media positioned in the non-porous container; a porous grid layer positioned on top of the porous layer of large filter media, the porous grid layer comprising a non-porous grid having passageways therethrough; and porous fine filter media positioned in the passageways of the grid; and a porous filter sand layer comprising filter sand positioned on top of the grid layer.

52. The dewatering system of claim 51, wherein the baffle further comprises a bottom plate in contact with the porous filter sand layer and a vertical spacer positioned between the bottom plate and the splash pad.

53. The dewatering system of claim 51, wherein the baffle further comprises an adjustable gate, the adjustable gate configured to control the amount of waste water passing through the outlet.

54. The dewatering system of claim 53, wherein the adjustable gate is a slide gate.

55. The dewatering system of claim 43, wherein the supply pipe is connected to the wastewater source with a flexible boot.

56. The dewatering system of claim 43, wherein the wastewater source further comprises one or more flow valves controlling a flow rate of the waste water composition to the supply pipe.

57. A dewatering system for removing water from a waste water composition comprising water and particulate solids, the dewatering system comprising:
- a non-porous container having a watertight wall comprising a plurality of removably coupled wall sections, a plurality of connections for connecting together the plurality of removably coupled wall sections, and a non-porous bottom having a valley and an exit hole;
- a porous filter layer in the non-porous container;
- a first drain pipe extending through the exit hole; and
- a second drain pipe having a first end in fluid communication with the first drain pipe and a second end positioned above the porous filter layer, the second end having an elevation above the bottom and comprising a weir for removing water above the elevation, the weir including a filter allowing water at the elevation to enter the second drain pipe but restricting solids from entering the second drain pipe;
- wherein the water is separated from the particulate solids in the composition by passing through one or more of the porous layers, the separated water being removed from the non-porous container though at least one of the first and second drain pipes;
- a first vertical support post and a second vertical support post at opposite ends of the watertight wall;
- a first plurality of holes in the plurality of removably coupled wall sections; and
- a connector passing through the plurality of holes and coupled to the first and second vertical support posts, wherein the plurality of removably coupled wall sections are aligned in a first horizontal alignment and a first vertical alignment forming the watertight wall.

58. The dewatering system of claim 57, wherein the porous filter layer is comprised of porous large filter media layer comprising large filter media positioned in the non-porous container; a porous grid layer positioned on top of the porous layer of large filter media, the porous grid layer comprising a non-porous grid having passageways therethrough; and porous fine filter media positioned in the passageways of the grid; and a porous filter sand layer comprising filter sand positioned on top of the grid layer.

59. The dewatering system of claim 58, wherein a collection portion of the first drain pipe has a plurality of porous openings in the first drain pipe to allow water to pass into the first drain pipe, the collection portion of the first drain pipe being positioned in the valley and at least partially surrounded by the porous layer of large filter media.

60. The dewatering system of claim 58, wherein the non-porous bottom is defined by a non-porous liner positioned on the bottom and including said exit hole therethrough.

61. The dewatering system of claim 57, wherein the bottom further comprises two complementary portions that slant downward forming the valley, the second drain pipe extending through one of the complementary portions.

62. The dewatering system of claim 57, wherein the wier comprises a plurality of vertical notches around the second end of the second drain pipe.

63. The dewatering system of claim 57, further comprising a cap covering the second end of the second drain pipe.

64. A dewatering system for removing water from a waste water composition comprising water and particulate solids, the dewatering system comprising:
   a first non-porous container having a watertight wall comprising a plurality of removably coupled wall sections, a plurality of connections for connecting together the plurality of removably coupled wall sections, and a non-porous bottom having a valley and an exit hole; a porous filter layer positioned in the non-porous container;
   a first drain pipe extending through the exit hole and a weir removably coupled to one of the plurality of removably coupled wall sections and having an elevation above the bottom of the first non-porous container for removing water above the elevation from the first non-porous container to a second non-porous container, the one of the plurality of removably coupled wall sections being common to the first non-porous container and the second non-porous container, wherein the position of the weir above the bottom of the first non-porous container is configured to be adjusted between a first position defining a first elevation and a second position defining a second elevation, the second elevation being less than the first elevation, wherein the water is separated from the particulate solids in the composition by passing through one or more of the porous layers, the separated water being removed from the non-porous container though at least one of the first and second drain pipes;
   a first vertical support post and a second vertical support post at opposite ends of the watertight wall;
   a first plurality of holes in the plurality of removably coupled wall sections; and
   a connector passing through the plurality of holes and coupled to the first and second vertical support posts, wherein the plurality of removably coupled wall sections are aligned in a first horizontal alignment and a first vertical alignment forming the watertight wall.

65. The dewatering system of claim 64, wherein the porous filter layer is comprised of porous large filter media layer comprising large filter media positioned in the non-porous container; a porous grid layer positioned on top of the porous layer of large filter media, the porous grid layer comprising a non-porous grid having passageways therethrough; and porous fine filter media positioned in the passageways of the grid; and a porous filter sand layer comprising filter sand positioned on top of the grid layer.

66. The dewatering system of claim 65, wherein a collection portion of the first drain pipe has a plurality of porous openings in the first drain pipe to allow water to pass into the first drain pipe, the collection portion of the first drain pipe being positioned in the valley and at least partially surrounded by the porous layer of large filter media.

67. The dewatering system of claim 65, wherein the non-porous bottom is comprised of a non-porous liner positioned on the bottom and including the exit hole therethrough.

68. The dewatering system of claim 64, wherein the weir includes a filter allowing water at the elevation to enter the second non-porous container but restricting solids from entering the second non-porous container.

69. The dewatering system of claim 64, wherein the weir further comprises a vertical slot and the common removably coupled wall section further includes fastener extending through the vertical slot, wherein the fastener is tightened in a first position in the vertical slot to position the weir in the first position and the fastener is tightened in a second position in the vertical slot to position the weir in the second position.

70. A method of erecting a modular dewatering system for removing water from a waste water composition comprising water and particulate solids, the method comprising the steps of providing a plurality of removable wall sections and coupling them together to define a non-porous container having a watertight wall; providing a non-porous bottom having a valley and an exit hole therethrough; filling the non-porous container with a porous filter layer; and providing a drain pipe communicating with the exit hole, wherein the water may be separated from the particulate solids in the composition by passing through the porous filter layer, the separated water being removed from the non-porous container though the drain pipe a first vertical support post and a second vertical support post at opposite ends of the watertight wall; a first plurality of holes in the plurality of removably coupled sections; and a connector passing through the plurality of holes and coupled to the first and second vertical support posts, wherein the plurality of removably coupled sections are aligned in a first horizontal alignment and a first vertical alignment forming the watertight wall.

\* \* \* \* \*

UNITED STATES PATENT AND TRADEMARK OFFICE
CERTIFICATE OF CORRECTION

| | | |
|---|---|---|
| PATENT NO. | : 9,675,907 B2 | Page 1 of 1 |
| APPLICATION NO. | : 14/354509 | |
| DATED | : June 13, 2017 | |
| INVENTOR(S) | : Franklin David Deskins | |

It is certified that error appears in the above-identified patent and that said Letters Patent is hereby corrected as shown below:

On the Title Page

Item (71) Applicant should read – Franklin David Deskins, Fishers, IN (US)

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*